(12) United States Patent
Tagami et al.

(10) Patent No.: US 7,158,340 B2
(45) Date of Patent: Jan. 2, 2007

(54) MAGNETIC RECORDING AND REPRODUCING APPARATUS AND MAGNETIC RECORDING MEDIUM

(75) Inventors: Katsumichi Tagami, Tokyo (JP); Yoshikazu Soeno, Tokyo (JP); Kazuya Shimakawa, Tokyo (JP); Hiroki Matsukuma, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/111,943

(22) Filed: Apr. 22, 2005

(65) Prior Publication Data

US 2005/0286155 A1 Dec. 29, 2005

(30) Foreign Application Priority Data

Jun. 25, 2004 (JP) ............................. 2004-188121

(51) Int. Cl.
*G11B 5/596* (2006.01)
(52) U.S. Cl. .................................... 360/78.08
(58) Field of Classification Search ............ 360/77.08, 360/77.07, 48, 77.03; 428/848.5
See application file for complete search history.

(56) References Cited

U.S. PATENT DOCUMENTS

| | | | |
|---|---|---|---|
| 5,541,783 A * | 7/1996 | Yamamoto et al. ........... 360/48 |
| 5,590,009 A | 12/1996 | Ishida | |
| 6,051,299 A | 4/2000 | Uchiyama et al. | |
| 6,583,957 B1 | 6/2003 | Takeshita et al. | |
| 6,586,044 B1 | 7/2003 | Takeshita et al. | |
| 2002/0114099 A1 * | 8/2002 | Nakayama ............... 360/77.03 |
| 2004/0265644 A1 * | 12/2004 | Tsujimoto et al. ..... 428/694 BB |
| 2005/0151284 A1 * | 7/2005 | Soeno ........................ 264/1.33 |
| 2005/0191526 A1 * | 9/2005 | Fujita et al. ............. 428/848.5 |
| 2005/0213239 A1 * | 9/2005 | Hibi et al. ..................... 360/48 |
| 2005/0286155 A1 | 12/2005 | Tagami et al. | |
| 2006/0007573 A1 * | 1/2006 | Tagami ........................ 360/48 |

FOREIGN PATENT DOCUMENTS

| | | |
|---|---|---|
| JP | 6-111502 | 4/1994 |
| JP | 8-180350 | 7/1996 |
| JP | 10-222944 | 8/1998 |
| JP | 11-328662 | 11/1999 |
| JP | 2000-195042 | 7/2000 |

OTHER PUBLICATIONS

U. S. Appl. No. 11/333,505, filed Jan. 18, 2006, Tagami et al.

\* cited by examiner

*Primary Examiner*—Fred F. Tzeng
(74) *Attorney, Agent, or Firm*—Oblon, Spivak, McClelland, Maier & Neustadt, P.C.

(57) ABSTRACT

The burst pattern shape in a discrete medium is set to a shape (truncated quadrangular pyramid shape) having substantially trapezoidal shapes in a track width direction and in a track circumferential direction, respectively, and a predetermined relationship is satisfied among W1, W2, Tp, and Wr where W1 represents an upper side corresponding to the surface of a convex magnetic recording layer and W2 a lower side corresponding to the lower surface of the convex magnetic recording layer in the trapezoidal shape in the track width direction, Tp represents a data track pitch of a data information recording portion, and Wr represents a read width of a magnetic head. Therefore, the burst pattern shape makes it possible to largely reduce a production load in processing and still to obtain an accurate position error signal.

27 Claims, 50 Drawing Sheets

MAGNETIC RECORDING AND REPRODUCING APPARATUS AND MAGNETIC RECORDING MEDIUM

BACKGROUND OF THE INVENTION

1. Field of the Invention

The present invention relates to a magnetic recording medium having a magnetic recording layer formed in a predetermined convex-concave pattern on a substrate and thus having so-called servo areas and information data areas (a magnetic recording medium of a discrete type) and further relates to a magnetic recording and reproducing apparatus including such a magnetic recording medium and a magnetic head for detecting servo signals on the medium and recording and reproducing information data on and from the medium.

2. Description of the Related Art

Improvement in areal recording density of magnetic recording mediums such as hard disks has conventionally been achieved by techniques of both (1) improving the linear recording density and (2) improving the track density. In order to achieve further and higher densification in future, it is necessary to improve the areal recording density based on the foregoing both techniques.

With respect to improving the track density, there have been raised problems of processing limitation about magnetic heads, side-fringe or crosstalk caused by expansion of magnetic fields of magnetic heads, and so forth, and therefore, it can be said that the improvement in areal recording density by progressing the track-density increasing technique for magnetic heads, which is merely an extension of the conventional improvement technique, has reached the limit.

On the other hand, as a technique of improving the linear recording density, reduction in layer thickness and higher coercive forces have been achieved in conventional longitudinal magnetic mediums. However, in terms of further and higher densification of the mediums and stability of recording magnetization against thermal fluctuation, attention has been paid to perpendicular magnetic recording mediums.

Under these circumstances, as a technique of improving the areal recording density and supplementing the higher track densification of the magnetic heads, there have been proposed magnetic recording mediums of a discrete track disk type in which a recording layer is formed in a predetermined convex-concave pattern. For example, JP-A-H11-328662 discloses a magnetic recording medium in which predetermined convex and concave portions are formed on a substrate and a perpendicular magnetic layer in the form of a single layer is formed along the convex and concave portions.

A reduction in spacing is necessary for accomplishing an increase in recording density. However, there is a possibility that the convex-concave shape of the recording layer may impede the stable flying characteristic of a magnetic head and thus cause a problem of head crash or the like. From this point of view, JP-A-H10-222944 discloses a recording medium in which the convex-concave shape changes in a track width direction for the purpose of achieving the flying stability of a magnetic head.

Further, JP-A-2000-195042 proposes a discrete type magnetic recording medium in which concave portions in the convex-concave shape are filled with a nonmagnetic material or another material for ensuring the stability in flying characteristic of a magnetic head.

On the other hand, JP-A-H06-111502 discloses a technique that defines a relationship among the width of each of rectangular tracking servo burst patterns formed by a convex-concave structure on a longitudinal recording medium, the track pitch, and the read width of a reproducing head.

In general, on a magnetic recording medium used in a magnetic disk drive, servo areas necessary for a magnetic head to perform tracking are recorded by a servo track writer.

The servo area generally includes an ISG (Initial Signal Gain) portion, an SVAM (SerVo Address Mark) portion, a Gray code portion, a burst portion, and a pad portion which are in the form of various magnetic patterns for exhibiting predetermined functions, respectively.

The magnetic patterns of the burst portion are each normally recorded with a width equal to about one track pitch in a radial direction of the magnetic recording medium. On the other hand, the ISG portion, the SVAM portion, the Gray portion, and the pad portion are each normally recorded continuously in the disk radial direction over several tracks or entirely.

The burst portion is in the form of the patterns for providing precise position information necessary for the magnetic head to perform accurate tracking to the track position. Those patterns of the burst portion are normally (1) composed of a combination of first and second bursts each equally straddling a center line that defines the track pitch between adjacent tracks or (2) composed by adding thereto a combination of third and fourth bursts each located at a position offset from the first and second bursts by half the track pitch.

One example of the tracking operation in the simplest combination of the first and second bursts will be given as follows. Specifically, when a magnetic head has passed through the first burst and the second burst in order, a reproduction signal Sa from the pattern of the first burst and a reproduction signal Sb from the pattern of the second burst are compared therebetween by the use of a differential amplifier to derive a value of a position error signal PES= (Sa−Sb). The value of the position error signal PES=(Sa−Sb) is input into a servo control circuit to thereby drive a tracking servo actuator according to the magnitude of the position error signal to operate the magnetic head such that the center of the magnetic head follows the center of a data track.

However, the burst patterns of the conventional discrete medium are each a rectangular pattern. Although the rectangular patterns are ideal for obtaining an accurate position error signal, a very high accuracy is required in terms of shape and dimensions when forming the rectangular shape.

Accordingly, it can be said that a production load in processing is extremely large in terms of the required very high formation accuracy.

The present invention has been made under these circumstances and has an object to provide a magnetic recording medium having a burst pattern shape that can largely reduce a production load in processing and still can obtain an accurate position error signal and further to provide a magnetic recording and reproducing apparatus using such a magnetic recording medium.

SUMMARY OF THE INVENTION

For accomplishing the foregoing object, according to one aspect of the present invention, there is obtained a magnetic recording and reproducing apparatus comprising a magnetic recording medium having a data information recording portion and a servo information portion for tracking, and a magnetic head for detecting servo information of the servo information portion and recording and reproducing data information on and from the data information recording portion, wherein the servo information portion is composed of a magnetic recording layer formed in a predetermined convex-concave pattern, the servo information portion comprises a burst portion where burst signals for tracking are recorded, the burst portion comprises a first burst, a second burst, a third burst, and a fourth burst each composed of a plurality of convex-portion magnetic recording layers where the burst signals are recorded, the first and second bursts are arranged such that the convex-portion magnetic recording layers are formed so as to have their center lines at positions that are offset from each other by one track pitch in a track width direction, while, the third and fourth bursts are arranged such that the convex-portion magnetic recording layers are formed so as to have their center lines at positions that are offset from the center lines of the first and second bursts by half the track pitch in the track width direction, the convex-portion magnetic recording layer has substantially trapezoidal shapes in the track width direction and in a track circumferential direction, respectively, (truncated quadrangular pyramid shape) and a condition of $Tp \geq Wr > W2 > W1$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, $Tp$ represents a data track pitch of the data information recording portion, and $Wr$ represents a read width of the magnetic head.

According to another aspect of the present invention, there is obtained a magnetic recording and reproducing apparatus comprising a magnetic recording medium having a data information recording portion and a servo information portion for tracking, and a magnetic head for detecting servo information of the servo information portion and recording and reproducing data information on and from the data information recording portion, wherein the servo information portion is composed of a magnetic recording layer formed in a predetermined convex-concave pattern, the servo information portion comprises a burst-portion where burst signals for tracking are recorded, the burst portion comprises a first burst, a second burst, a third burst, and a fourth burst each composed of a plurality of convex-portion magnetic recording layers where the burst signals are recorded, the first and second bursts are arranged such that the convex-portion magnetic recording layers are formed so as to have their center lines at positions that are offset from each other by one track pitch in a track width direction, while, the third and fourth bursts are arranged such that the convex-portion magnetic recording layers are formed so as to have their center lines at positions that are offset from the center lines of the first and second bursts by half the track pitch in the track width direction, the convex-portion magnetic recording layer has substantially trapezoidal shapes in the track width direction and in a track circumferential direction, respectively, (truncated quadrangular pyramid shape) and a condition of $W2=Tp$ and $2W2-W1 \geq Wr \geq W1$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, $Tp$ represents a data track pitch of the data information recording portion, and $Wr$ represents a read width of the magnetic head.

According to another aspect of the present invention, there is obtained a magnetic recording and reproducing apparatus comprising a magnetic recording medium having a data information recording portion and a servo information portion for tracking, and a magnetic head for detecting servo information of the servo information portion and recording and reproducing data information on and from the data information recording portion, wherein the servo information portion is composed of a magnetic recording layer formed in a predetermined convex-concave pattern, the servo information portion comprises a burst portion where burst signals for tracking are recorded, the burst portion comprises a first burst, a second burst, a third burst, and a fourth burst each composed of a plurality of convex-portion magnetic recording layers where the burst signals are recorded, the first and second bursts are arranged such that the convex-portion magnetic recording layers are formed so as to have their center lines at positions that are offset from each other by one track pitch in a track width direction, while, the third and fourth bursts are arranged such that the convex-portion magnetic recording layers are formed so as to have their center lines at positions that are offset from the center lines of the first and second bursts by half the track pitch in the track width direction, the convex-portion magnetic recording layer has substantially trapezoidal shapes in the track width direction and in a track circumferential direction, respectively, (truncated quadrangular pyramid shape) and a condition of $W1=Tp$ and $2W2-W1 \geq Wr \geq W1/2$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, $Tp$ represents a data track pitch of the data information recording portion, and $Wr$ represents a read width of the magnetic head.

According to another aspect of the present invention, there is obtained a magnetic recording and reproducing apparatus comprising a magnetic recording medium having a data information recording portion and a servo information portion for tracking, and a magnetic head for detecting servo information of the servo information portion and recording and reproducing data information on and from the data information recording portion, wherein the servo information portion is composed of a magnetic recording layer formed in a predetermined convex-concave pattern, the servo information portion comprises a burst portion where burst signals for tracking are recorded, the burst portion comprises a first burst, a second burst, a third burst, and a fourth burst each composed of a plurality of convex-portion magnetic recording layers where the burst signals are recorded, the first and second bursts are arranged such that the convex-portion magnetic recording layers are formed so as to have their center lines at positions that are offset from each other by one track pitch in a track width direction, while, the third and fourth bursts are arranged such that the convex-portion magnetic recording layers are formed so as to have their center lines at positions that are offset from the center lines of the first and second bursts by half the track pitch in the track width direction, the convex-portion magnetic recording layer has substantially trapezoidal shapes in the track width direction and in a track circumferential direction, respectively, (truncated quadrangular pyramid shape) and a condition of $W1 > Tp$ and $W2 \geq Wr \geq Tp$ is satisfied where W1 represents an upper side corresponding to an upper surface of the convex-portion magnetic recording layer and W2 a lower side corresponding to a lower surface of the convex-portion magnetic recording layer in the trapezoidal shape in the track width direction, Tp represents a data track pitch of the data information recording portion, and Wr represents a read width of the magnetic head.

According to another aspect of the present invention, there is obtained a magnetic recording and reproducing apparatus comprising a magnetic recording medium having a data information recording portion and a servo information portion for tracking, and a magnetic head for detecting servo information of the servo information portion and recording and reproducing data information on and from the data information recording portion, wherein the servo information portion is composed of a magnetic recording layer formed in a predetermined convex-concave pattern, the servo information portion comprises a burst portion where burst signals for tracking are recorded, the burst portion comprises a first burst and a second burst each composed of a plurality of convex-portion magnetic recording layers where the burst signals are recorded, the first and second bursts are arranged such that the convex-portion magnetic recording layers are formed so as to have their center lines at positions that are offset from each other by one track pitch in a track width direction, the convex-portion magnetic recording layer has substantially trapezoidal shapes in the track width direction and in a track circumferential direction, respectively, (truncated quadrangular pyramid shape) and a condition of $W2 \geq Tp \geq W1$ and $W2 \geq Wr \geq W1$ is satisfied where W1 represents an upper side corresponding to an upper surface of the convex-portion magnetic recording layer and W2 a lower side corresponding to a lower surface of the convex-portion magnetic recording layer in the trapezoidal shape in the track width direction, Tp represents a data track pitch of the data information recording portion, and Wr represents a read width of the magnetic head.

As a preferred mode of the present invention, it is configured such that when the height from W2 being the lower side to W1 being the upper side of the convex-portion magnetic recording layer is given as h, a condition of $\tan 85° \geq 2h/(W2-W1) \geq \tan 50°$ is satisfied.

According to another aspect of the present invention, there is obtained a magnetic recording medium having a data information recording portion and a servo information portion for tracking, wherein the servo information portion is composed of a magnetic recording layer formed in a predetermined convex-concave pattern, the servo information portion comprises a burst portion where burst signals for tracking are recorded, the burst portion comprises a first burst, a second burst, a third burst, and a fourth burst each composed of a plurality of convex-portion magnetic recording layers where the burst signals are recorded, the first and second bursts are arranged such that the convex-portion magnetic recording layers are formed so as to have their center lines at positions that are offset from each other by one track pitch in a track width direction, while, the third and fourth bursts are arranged such that the convex-portion magnetic recording layers are formed so as to have their center lines at positions that are offset from the center lines of the first and second bursts by half the track pitch in the track width direction, the convex-portion magnetic recording layer has substantially trapezoidal shapes in the track width direction and in a track circumferential direction, respectively, (truncated quadrangular pyramid shape) and a condition of $Tp > W2 > W1$ is satisfied where W1 represents an upper side corresponding to an upper surface of the convex-portion magnetic recording layer and W2 a lower side corresponding to a lower surface of the convex-portion magnetic recording layer in the trapezoidal shape in the track width direction, and Tp represents a data track pitch of the data information recording portion.

As a preferred using mode of the magnetic recording medium, it is configured such that when a read width of a magnetic head is given as Wr, the magnetic head satisfying the range of $Tp \geq Wr > W2 > W1$ is used as a recording and reproducing head for the magnetic recording medium.

According to another aspect of the present invention, there is obtained a magnetic recording medium having a data information recording portion and a servo information portion for tracking, wherein the servo information portion is composed of a magnetic recording layer formed in a predetermined convex-concave pattern, the servo information portion comprises a burst portion where burst signals for tracking are recorded, the burst portion comprises a first burst, a second burst, a third burst, and a fourth burst each composed of a plurality of convex-portion magnetic recording layers where the burst signals are recorded, the first and second bursts are arranged such that the convex-portion magnetic recording layers are formed so as to have their center lines at positions that are offset from each other by one track pitch in a track width direction, while, the third and fourth bursts are arranged such that the convex-portion magnetic recording layers are formed so as to have their center line s at positions that are offset from the center lines of the first and second bursts by half the track pitch in the track width direction, the convex-portion magnetic recording layer has substantially trapezoidal shapes in the track width direction and in a track circumferential direction, respectively, (truncated quadrangular pyramid shape) and a condition of $W2=Tp$ and $2W2-W1>W1$ is satisfied where W1 represents an upper side corresponding to an upper surface of the convex-portion magnetic recording layer and W2 a lower side corresponding to a lower surface of the convex-portion magnetic recording layer in the trapezoidal shape in the track width direction, and Tp represents a data track pitch of the data information recording portion.

As a preferred using mode of the magnetic recording medium, it is configured such that when a read width of a magnetic head is given as Wr, the magnetic head satisfying the range of $W2=Tp$ and $2W2-W1 \geq Wr \geq W1$ is used as a recording and reproducing head for the magnetic recording medium.

According to another aspect of the present invention, there is obtained a magnetic recording medium having a data information recording portion and a servo information portion for tracking, wherein the servo information portion is composed of a magnetic recording layer formed in a predetermined convex-concave pattern, the servo information portion comprises a burst portion where burst signals for tracking are recorded, the burst portion comprises a first burst, a second burst, a third burst, and a fourth burst each composed of a plurality of convex-portion magnetic recording layers where the burst signals are recorded, the first and second bursts are arranged such that the convex-portion magnetic recording layers are formed so as to have their center lines at positions that are offset from each other by one track pitch in a track width direction, while, the third and fourth bursts are arranged such that the convex-portion magnetic recording layers are formed so as to have their center lines at positions that are offset from the center lines of the first and second bursts by half the track pitch in the track width direction, the convex-portion magnetic recording layer has substantially trapezoidal shapes in the track width direction and in a track circumferential direction, respectively, (truncated quadrangular pyramid shape) and a condition of W1=Tp and 2W2−W1>W1/2 is satisfied where W1 represents an upper side corresponding to an upper surface of the convex-portion magnetic recording layer and W2 a lower side corresponding to a lower surface of the convex-portion magnetic recording layer in the trapezoidal shape in the track width direction, and Tp represents a data track pitch of the data information recording portion.

As a preferred using mode of the magnetic recording medium, it is configured such that when a read width of a magnetic head is given as Wr, the magnetic head satisfying the range of W1=Tp and 2W2−W1≧Wr≧W1/2 is used as a recording and reproducing head for the magnetic recording medium.

According to another aspect of the present invention, there is obtained a magnetic recording medium having a data information recording portion and a servo information portion for tracking, wherein the servo information portion is composed of a magnetic recording layer formed in a predetermined convex-concave pattern, the servo information portion comprises a burst portion where burst signals for tracking are recorded, the burst portion comprises a first burst, a second burst, a third burst, and a fourth burst each composed of a plurality of convex-portion magnetic recording layers where the burst signals are recorded, the first and second bursts are arranged such that the convex-portion magnetic recording layers are formed so as to have their center lines at positions that are offset from each other by one track pitch in a track width direction, while, the third and fourth bursts are arranged such that the convex-portion magnetic recording layers are formed so as to have their center lines at positions that are offset from the center lines of the first and second bursts by half the track pitch in the track width direction, the convex-portion magnetic recording layer has substantially trapezoidal shapes in the track width direction and in a track circumferential direction, respectively, (truncated quadrangular pyramid shape) and a condition of W1>Tp and W2>Tp is satisfied where W1 represents an upper side corresponding to an upper surface of the convex-portion magnetic recording layer and W2 a lower side corresponding to a lower surface of the convex-portion magnetic recording layer in the trapezoidal shape in the track width direction, and Tp represents a data track pitch of the data information recording portion.

As a preferred using mode of the magnetic recording medium, it is configured such that when a read width of a magnetic head is given as Wr, the magnetic head satisfying the range of W1>Tp and W2≧Wr≧Tp is used as a recording and reproducing head for the magnetic recording medium.

According to another aspect of the present invention, there is obtained a magnetic recording medium having a data information recording portion and a servo information portion for tracking, wherein the servo information portion is composed of a magnetic recording layer formed in a predetermined convex-concave pattern, the servo information portion comprises a burst portion where burst signals for tracking are recorded, the burst portion comprises a first burst and a second burst each composed of a plurality of convex-portion magnetic recording layers where the burst signals are recorded, the first and second bursts are arranged such that the convex-portion magnetic recording layers are formed so as to have their center lines at positions that are offset from each other by one track pitch in a track width direction, the convex-portion magnetic recording layer has substantially trapezoidal shapes in the track width direction and in a track circumferential direction, respectively, (truncated quadrangular pyramid shape) and a condition of W2≧Tp≧W1 is satisfied where W1 represents an upper side corresponding to an upper surface of the convex-portion magnetic recording layer and W2 a lower side corresponding to a lower surface of the convex-portion magnetic recording layer in the trapezoidal shape in the track width direction, and Tp represents a data track pitch of the data information recording portion.

As a preferred using mode of the magnetic recording medium, it is configured such that when a read width of a magnetic head is given as Wr, the magnetic head satisfying the range of W2≧Tp≧W1 and W2≧Wr≧W1 is used as a recording and reproducing head for the magnetic recording medium.

As a preferred mode of the present invention, it is configured such that when the height from W2 being the lower side to W1 being the upper side of the convex-portion magnetic recording layer is given as h, a condition of tan 85°≧2 h/(W2−W1)≧tan 50° is satisfied.

DETAILED DESCRIPTION OF THE INVENTION

Hereinbelow, the best mode for carrying out the present invention will be described in detail.

A magnetic recording and reproducing apparatus of the present invention comprises a magnetic recording medium having data information recording portions and servo information portions for tracking, and a magnetic head for detecting servo information of the servo information portions and recording and reproducing data information on and from the data information recording portions.

At the outset, an example of a schematic structure of the magnetic recording and reproducing apparatus will be described with reference to FIG. 6 in order to understand the overall structure of the apparatus.

Figure 6:
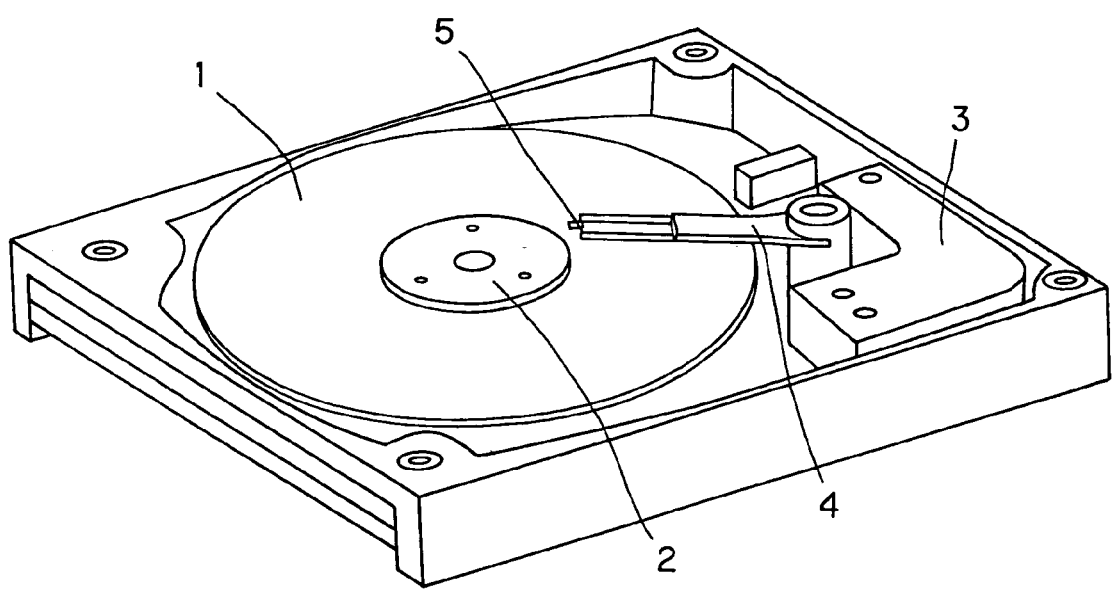
FIG. 6 is a schematic perspective view of a magnetic recording and reproducing apparatus.

Description of Example of Schematic Structure of Magnetic Recording and Reproducing Apparatus FIG. 6 is a perspective view showing a schematic structure of the magnetic recording and reproducing apparatus being one preferred example of the present invention. In this figure, a magnetic recording medium 1 is a disk-shaped perpendicular magnetic recording medium (discrete medium) and is rotationally driven by a spindle motor 2.

Further, in order to read and write data relative to the magnetic recording medium, a recording and reproducing magnetic head 5 is provided at the tip of a swing arm 4 extending radially inward toward the center of the medium from its outer peripheral side. The swing arm 4 is swung by a voice coil motor 3 so that, for example, the magnetic head 5 can be positioned at a given track based on servo signals detected by the magnetic head 5.

The magnetic head 5 has a recording element and a reproducing element. A single-pole head of a main-pole excitation type, for example, is used as the recording element, while, a GMR (Giant MagnetoResistance effect) head, for example, is used as the reproducing element. A TMR (Tunneling MagnetoResistance effect) head or the like may be used instead of the GMR head.

Although the perpendicular magnetic recording medium has been described as the preferred example of the magnetic recording medium in the present invention, the present invention is also applicable to a so-called longitudinal magnetic recording medium.

Description of Magnetic Recording Medium

Now, the structure of the magnetic recording medium will be described.

Figure 1:
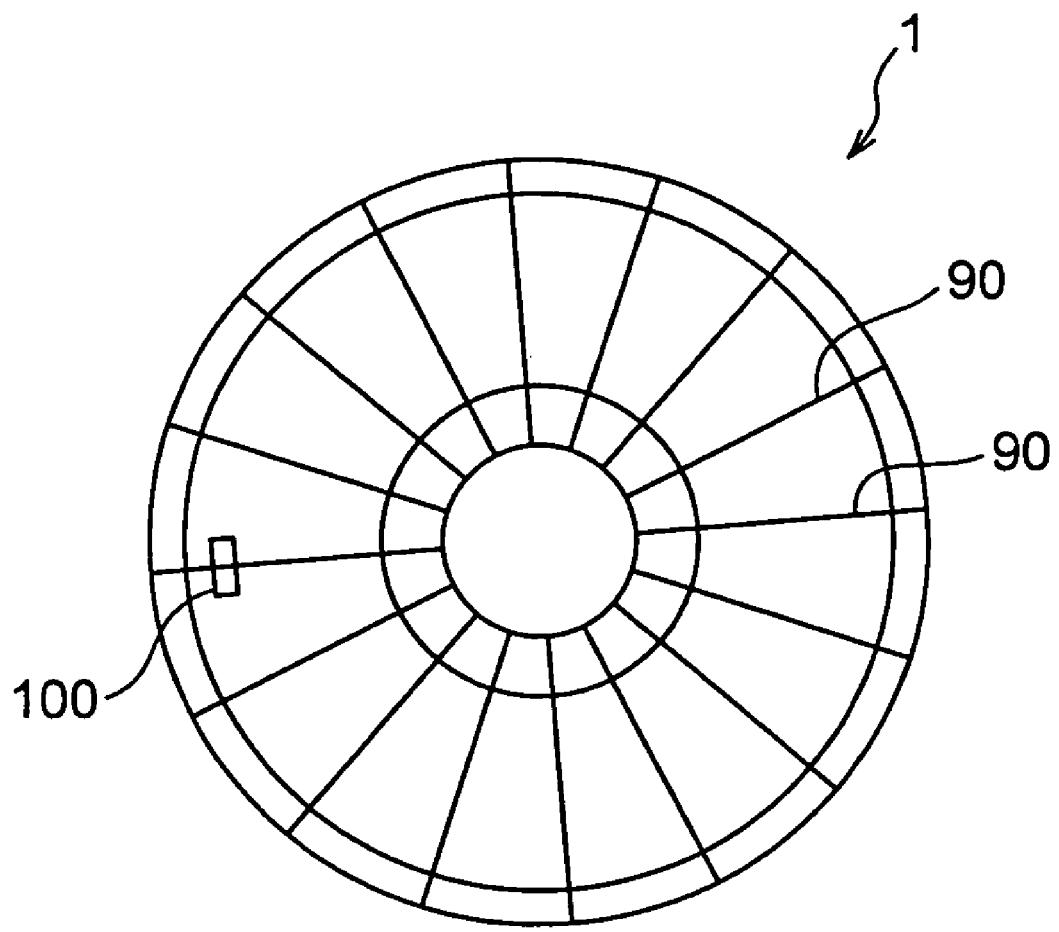
FIG. 1 is a schematic plan view showing an overall shape of a disk-shaped magnetic recording medium of the present invention.
Figure 2:
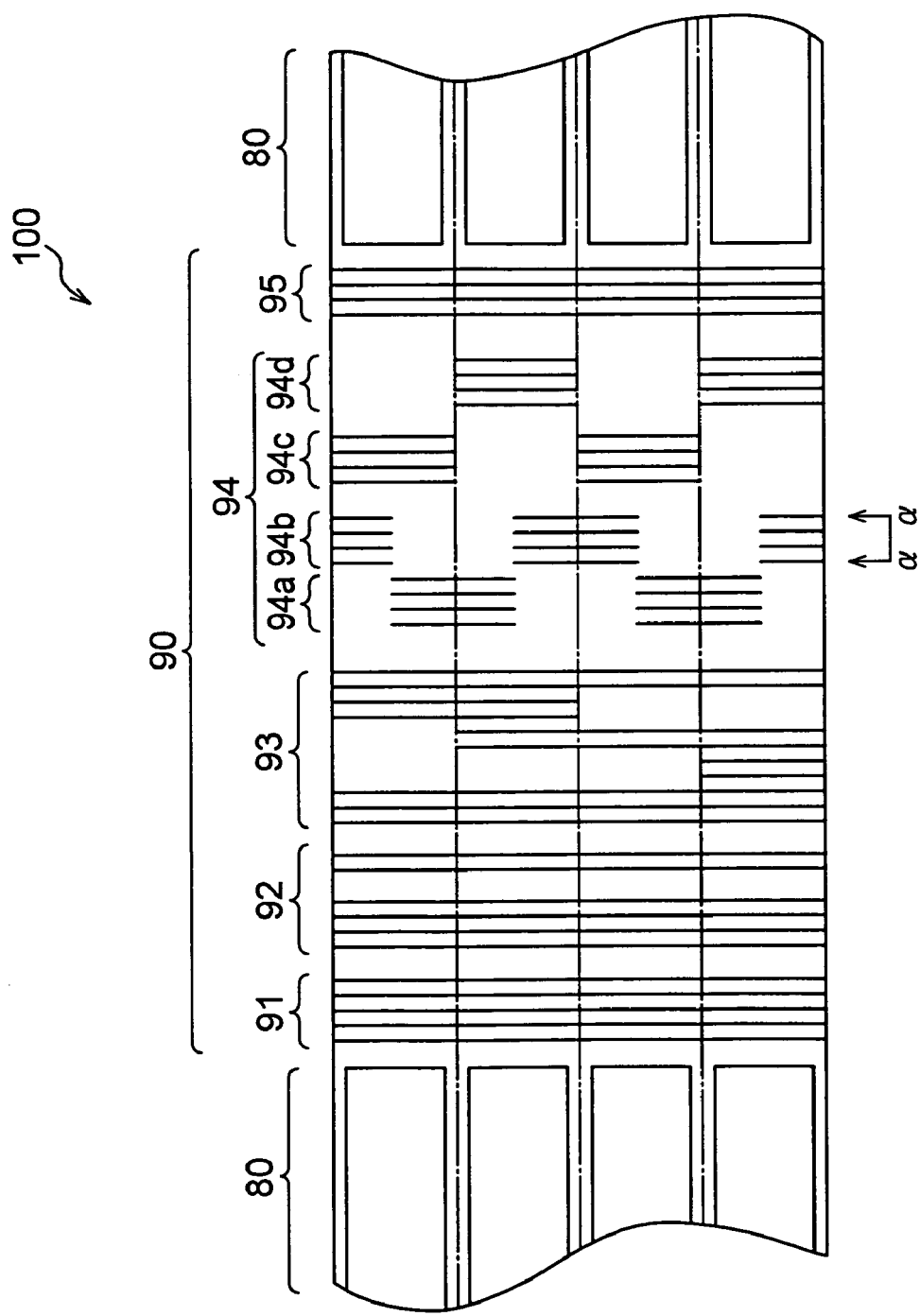
FIG. 2 is an enlarged schematic view of a small portion surrounded by a rectangle in FIG. 1.

FIG. 1 is a schematic plan view showing the overall shape of the disk-shaped magnetic recording medium 1 used in the present invention, and FIG. 2 is an enlarged schematic view of a small portion 100 surrounded by a rectangle in FIG. 1. FIG. 2 conceptually illustrates mainly a servo information portion 90 being an area where servo signals are recorded, and data information recording portions 80 each in the form of a group of data tracks for recording and reproduction.

Figure 3:
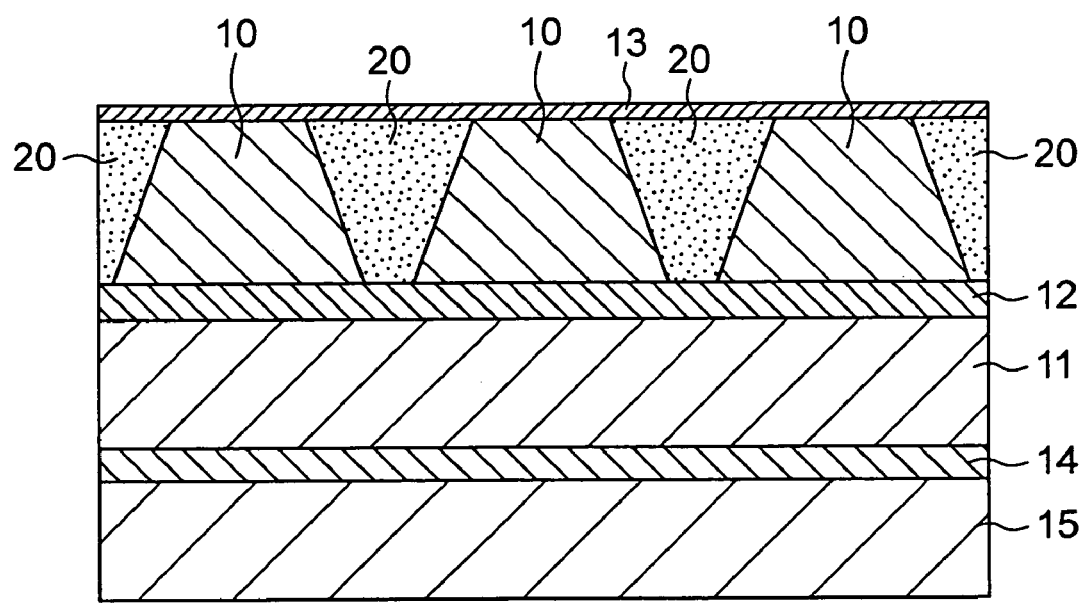
FIG. 3 is a sectional view conceptually showing a preferred embodiment of the magnetic recording medium of the present invention.

FIG. 3 is a sectional view conceptually illustrating a preferred embodiment of the magnetic recording medium in the present invention. FIG. 3 substantially corresponds to a sectional view taken along line α—α in FIG. 2.

In FIG. 1, although not illustrated, a plurality of data track groups for recording and reproduction are concentrically disposed/formed on a disk substrate.

Further, servo signal regions (servo information portions 90: those portions drawn as radial lines in FIG. 1) are radially formed extending outward from the center of the disk. That is, a so-called sector servo system is employed wherein the disk surface is divided into sectors. Servo information is recorded in each of the servo information portions 90 of the magnetic recording medium.

The structure of the servo information portion 90 will be described in detail. As shown in FIG. 2, the servo information portion 90 (so-called servo area) comprises an ISG (Initial Signal Gain) portion 91, an SVAM (SerVo Address Mark) portion 92, a Gray code portion 93, a burst portion 94, and a pad portion 95.

The ISG portion 91 is in the form of a continuous pattern provided for excluding influences of unevenness in magnetic property of a magnetic film (magnetic layer) of the magnetic recording medium and in flying amount of the magnetic head and is continuously formed in the track radial direction. While reproducing the ISG portion 91 by the magnetic head, the gain of a servo demodulation circuit is determined by an automatic gain control (AGC) so as to correct variation in output caused by the magnetic recording medium or the magnetic head. The automatic gain control (AGC) that performs such an operation is turned off when the SVAM portion 92 existing in the servo area is detected, and standardizes the reproduction amplitude existing in the later burst portion 94 by the amplitude of the ISG portion 91.

The Gray code portion 93 is recorded with information about respective track numbers and a sector number.

The burst portion 94 is in the form of patterns for providing precise position information necessary for the magnetic head to perform accurate tracking to the track position. These patterns are normally composed of a combination of first bursts 94a and second bursts 94b each equally straddling a center line that defines the track pitch between the adjacent tracks and a combination of third bursts 94c and fourth bursts 94d each located at a position offset from the first and second bursts by half the track pitch.

In other words, the first burst 94a and the second burst 94b are arranged such that convex-portion magnetic recording layers are formed so as to have their center lines at positions that are offset from each other by one track pitch in the track width direction, while, the third burst 94c and the fourth burst 94d are arranged such that convex-portion magnetic recording layers are formed so as to have their center lines at positions that are offset from the center lines of the first and second bursts 94a and 94b by half the track pitch in the track width direction.

Further, the third burst 94c and the fourth burst 94d are arranged such that the convex-portion magnetic recording layers are formed so as to have their center lines at the positions that are offset from each other by one track pitch in the track width direction. As illustrated, the first bursts 94a to the fourth bursts 94d are arranged in pattern in the order named toward the downstream side.

In this specification, the first bursts 94a to the fourth bursts 94d will also be referred to as first burst tracks (VTRs1) to fourth burst tracks (VTRs4), thus both expressions having the same meaning.

The pad portion 95 is in the form of a pattern provided for absorbing a delay of a demodulation circuit system so that clock generation can be maintained while the servo demodulation circuit reproduces the servo area.

The ISG portion 91, the SVAM portion 92, and the pad portion 95 are each recorded continuously in the disk radial direction, while the Gray code portion 93 is recorded over several tracks or more in the disk radial direction.

Referring now to FIG. 3, description will be given about one example of a preferred section structure of the magnetic recording medium. FIG. 3 can be understood as, for example, the sectional view taken along line α—α in FIG. 2.

As shown in FIG. 3, the magnetic recording medium comprises a substrate 15, an orientation layer 14 formed on the substrate 15, a soft magnetic layer 11 formed on the orientation layer 14, an intermediate layer 12 formed on the soft magnetic layer 11, perpendicular magnetic recording layers 10 and nonmagnetic layers 20 corresponding to convex portions and concave portions, respectively, of the convex-concave shape formed on the intermediate layer 12, and a protective layer 13 formed on the layers 10 and 20.

As the substrate 15, use is preferably made of a glass substrate, an NiP-coated aluminum alloy substrate, an Si substrate, or the like. As the orientation layer 14, use can be made of, for example, an antiferromagnetic material such as PtMn for applying an anisotropic magnetic field to the soft magnetic layer 11 in the track width direction. Alternatively, use may be made of a nonmagnetic alloy for controlling the orientation.

As the soft magnetic layer 11, there can be cited a CoZrNb alloy, an Fe-based alloy, a Co-based amorphous alloy, a soft magnetic/nonmagnetic multilayer film, soft magnetic ferrite, or the like.

The intermediate layer 12 is provided for controlling a perpendicular magnetic anisotropy and a crystal grain size of the perpendicular magnetic recording layers 10 formed on the intermediate layer 12, and a CoTi nonmagnetic alloy, for example, is used therefor. Alternatively, use may be made of a nonmagnetic metal, an alloy, or a low-permeability alloy that works similarly.

As the convex-portion perpendicular magnetic recording layer 10, use is preferably made of a medium in which ferromagnetic grains of CoPt or the like are contained in a matrix in an $SiO_2$ oxide-based material, a CoCr-based alloy, an FePt alloy, a Co/Pd-based artificial lattice type multilayer alloy, or the like. As will be described later, in the present invention, each of the recording layers 10 serving to produce a servo signal is formed into a truncated quadrangular pyramid shape.

As a material of the concave-portion nonmagnetic layer 20, use is made of a nonmagnetic oxide such as $SiO_2$, $Al_2O_3$, $TiO_2$, or ferrite, a nitride such as AlN, or a carbide such as SiC.

Normally, the protective layer 13 in the form of a carbon thin film or the like is formed on the surfaces of the convex-portion perpendicular magnetic recording layers 10 and the concave-portion nonmagnetic layers 20 by the use of the CVD method or the like.

The formation of the perpendicular magnetic recording layers 10 and the nonmagnetic layers 20 based on the convex-concave pattern (the formation of the so-called discrete type medium) is carried out by, for example, etching a perpendicular magnetic recording layer, formed in a constant thickness, into a predetermined convex-concave shape, then sputtering $SiO_2$ corresponding to an etching depth to fill etched concave portions. Thereafter, $SiO_2$ excessively deposited on the perpendicular magnetic recording layer is removed by applying oblique ion-beam etching or the like while rotating the medium, thereby flattening the whole surface of the medium.

In FIG. 3, the etching for the formation of the perpendicular magnetic recording layers 10 and the nonmagnetic layers 20 based on the convex-concave pattern (the formation of the so-called discrete type medium) is performed until it reaches the surface of the soft magnetic layer 11. On the other hand, the etching may be carried out into a certain depth of the soft magnetic layer 11 to thereby form a convex-concave pattern.

Figure 4:
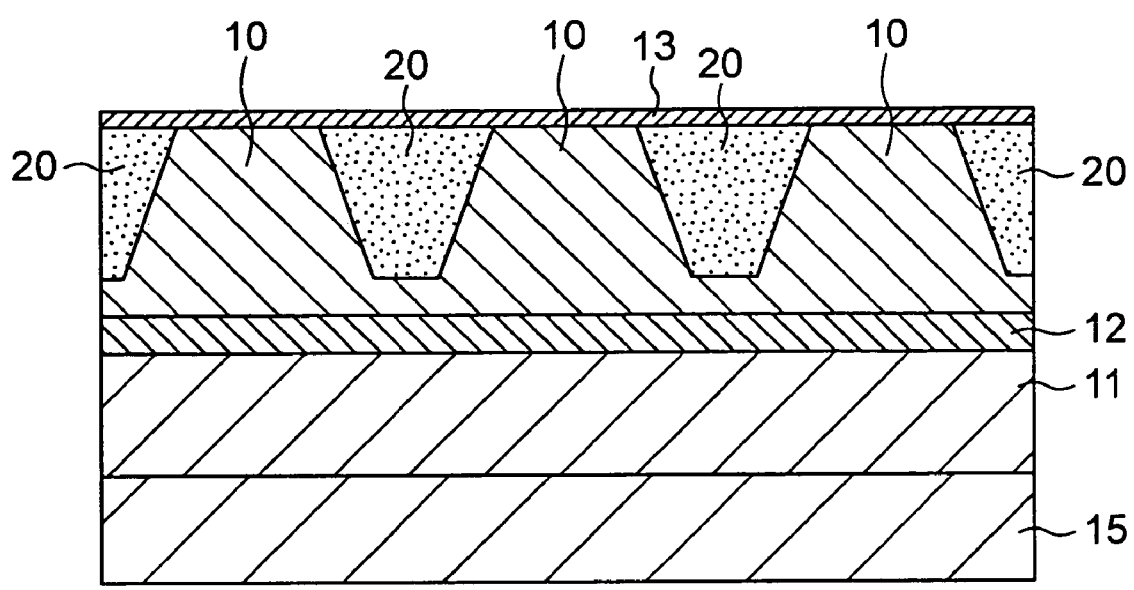
FIG. 4 is a sectional view conceptually showing another preferred embodiment of the magnetic recording medium of the present invention.

FIG. 4 shows a modification of FIG. 3. The embodiment of FIG. 4 differs from that of FIG. 3 in that when etching a perpendicular magnetic recording layer, formed in a constant thickness, into a predetermined convex-concave shape, the magnetic layer is left thin at positions of concave portions within a range that does not affect the magnetic property. The embodiments of FIGS. 3 and 4 are both the embodiments of the present invention, and the same symbols assigned in FIGS. 3 and 4 denote the same components.

Setting of Specification of Servo Area (Servo Information Portion)

The main part of the present invention resides in that, for the purpose of reducing the production load in terms of accuracy by allowing a margin for dimensional accuracy in processing and obtaining an accurate position error signal for tracking, the structure of the medium is set such that the burst pattern shape of the burst portion in the servo area of the discrete medium is set to a shape (truncated quadrangular pyramid shape) having substantially trapezoidal shapes in the track width direction and in the track circumferential direction, respectively, and a predetermined relationship is satisfied among W1, W2, Tp, and Wr where W1 represents an upper side corresponding to the surface (upper surface) of the convex magnetic recording layer and W2 a lower side corresponding to the lower surface of the convex magnetic recording layer in the trapezoidal shape in the track width direction, Tp represents a data track pitch of the data information recording portion, and Wr represents a read width of the magnetic head. Note that the upper-side corners may be slightly rounded in the perpendicular magnetic recording layer of the truncated quadrangular pyramid shape.

The read width Wr of the magnetic head (a reproduction track width of the magnetic head) in the present invention is defined as follows, which differs from a so-called optical width dimension actually measured by an SEM or the like.

Figure 50:
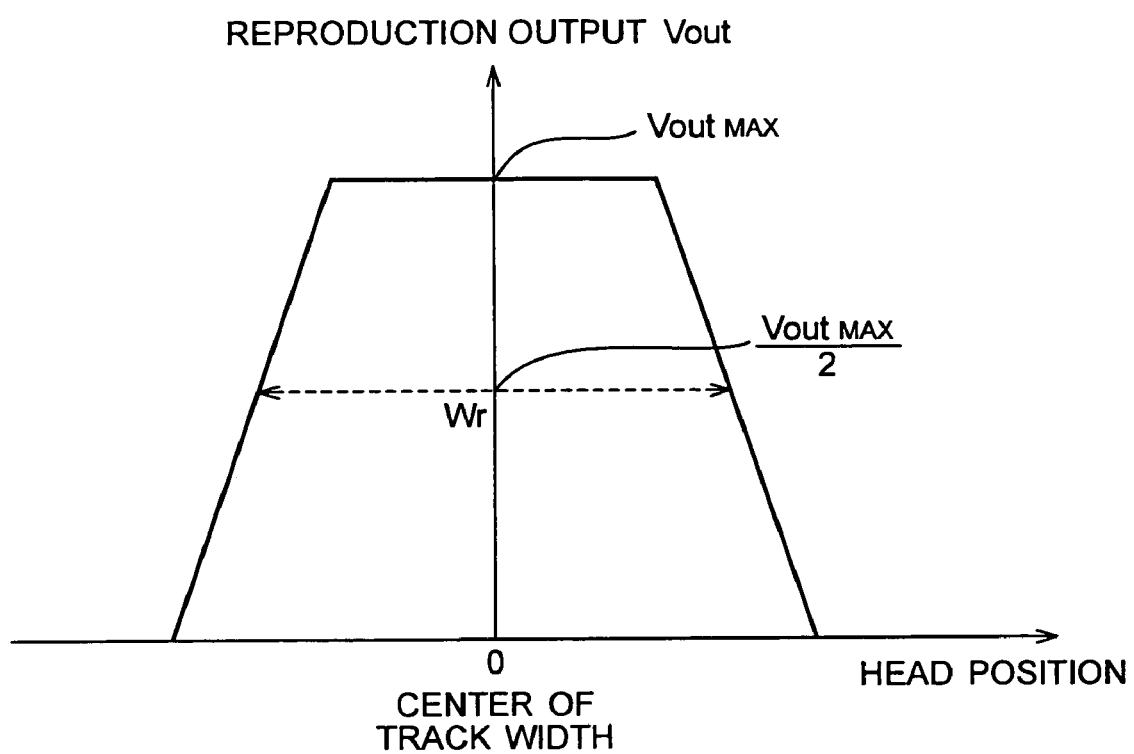
FIG. 50 is a diagram for explaining a definition of "read width Wr".

Specifically, a microtrack having a width sufficiently smaller than a write track width is formed, then the magnetic head is gradually moved in the track width direction to measure an off-track profile of a reproduction output Vout of the magnetic head, and a width (so-called full width at half maximum) at an output value (Vout MAX/2) half a maximum value (Vout MAX) of Vout is defined as "read width Wr". FIG. 50 shows a state-diagram for the definition of "read width Wr".

Burst patterns of the burst portion are classified into (1) a type that is composed of a combination of first bursts and second bursts each equally straddling a center line that defines the track pitch between adjacent tracks or (2) a type that is composed by adding thereto a combination of third bursts and fourth bursts each located at a position offset from the first and second bursts by half the track pitch. Description will be separately given about these two types. Considering that description about setting of specifications of the burst patterns and so forth can be more easily understood through examination referring to test results of specific examples, the present invention will be described hereinbelow with reference to various test examples including inventive examples and comparative examples.

[I] TEST EXAMPLES 1

With respect to burst signal arrangement composed of a combination of first bursts (VTRs1) and second bursts (VTRs2) each equally straddling a center line that defines the track pitch between adjacent tracks and a combination of third bursts (VTRs3) and fourth bursts (VTRs4) each located at a position offset from the first and second bursts by half the track pitch (Structure of Magnetic Recording Medium)

As shown in FIG. 1, the disk surface was divided into sectors and, for applying the sector servo system, servo areas 90 each as shown in FIG. 2 were formed. That is, an ISG portion 91, an SVAM portion 92, a Gray code portion 93, a burst portion 94, and a pad portion 95 were formed according to respective servo signal patterns.

Figure 5:
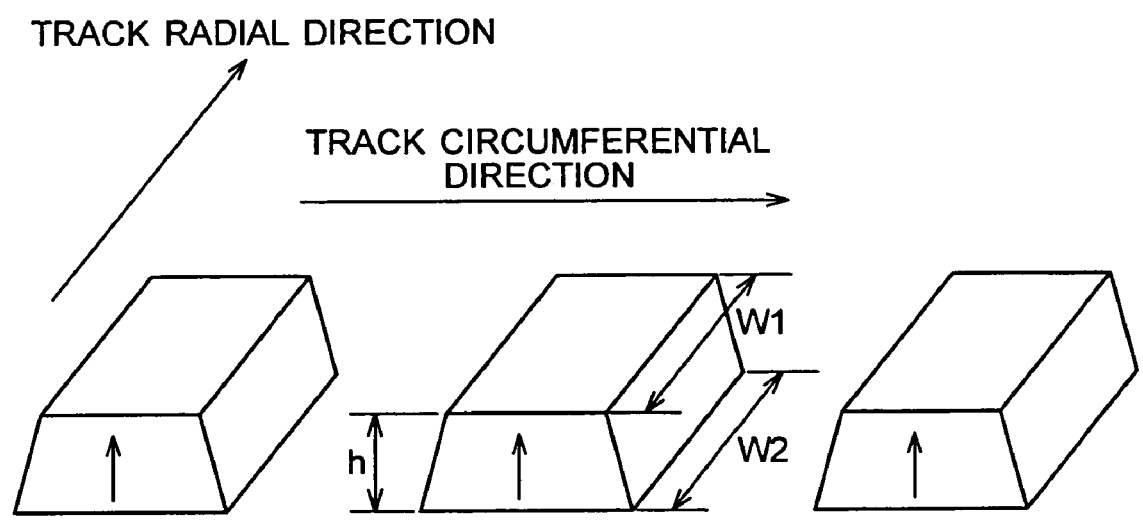
FIG. 5 is a schematic perspective view showing a structure of a perpendicular magnetic recording layer having a truncated quadrangular pyramid shape.

Each of convex-portion magnetic recording layers (convex magnetic recording layers) of the burst portion 94 for recording burst signals was formed as a perpendicular magnetic recording layer having a truncated quadrangular pyramid shape as shown in FIG. 5. The dimension of an upper side corresponding to the surface (upper surface) of the convex magnetic recording layer is W1, the dimension of a lower side corresponding to the lower surface of the convex magnetic recording layer is W2, and the height from W2 being the lower side to W1 being the upper side is h, wherein W2>W1.

Convex portions in the ISG portion 91, the SVAM portion 92, the Gray code portion 93, and the pad portion 95 other than the burst portion 94 were, although not illustrated, each formed as a belt-shaped convex-portion perpendicular magnetic recording layer having a truncated quadrangular pyramid shape elongate in the disk radial direction and were arranged at intervals of one bit.

As shown in FIG. 3, the section shape of the medium was such that a PtMn layer as an orientation layer 14 (underlayer 14) was formed to a thickness of 15 nm on a mirror-polished glass substrate 15, a soft magnetic layer 11 made of CoZrNb was formed to a thickness of 200 nm on the layer 14, and an intermediate layer 12 made of a nonmagnetic alloy CoTi was further formed to a thickness of 8 nm on the layer 11. Subsequently, a perpendicular magnetic recording layer was formed to a thickness of 15 nm on the layer 12, then etching with a predetermined pattern was carried out for forming a predetermined convex-concave shape to thereby obtain convex perpendicular magnetic recording layers 10. Then, $SiO_2$ was sputtered to fill etched concave portions. Thereafter, oblique ion-beam etching was carried out while rotating the medium filled with $SiO_2$, thereby removing excessive $SiO_2$ formed on the perpendicular magnetic recording layers 10 to flatten the surface of the medium. A protective layer 13 in the form of a carbon thin film was formed to a thickness of 1 nm on the flattened surface of the medium by the CVD method, and a Fomblin lubricant was further applied to a thickness of 1 nm onto the protective layer 13, thereby completing a medium sample. For the perpendicular magnetic recording layer, use was made of a material in which CoPt ferromagnetic grains were contained in a matrix in $SiO_2$.

The magnetic property of the perpendicular magnetic recording layer was measured using a vibrating sample magnetometer (VSM), resulting in that a saturation magnetization Ms was 350 emu/cc and a residual saturation magnetization Mr was 340 emu/cc. As described above, the thickness (height) h of the perpendicular magnetic recording layer was set to 15 nm.

The recording density of a servo signal was set to 130K·FRPI (Flux Reversal Per Inch). Further, the track pitch Tp of a data area was set to 100 nm corresponding to 254K·TPI (Track Per Inch). The width of a track (data track (DTR)) in the data area was set to 70 nm.

By changing the etching conditions in the formation of the convex-concave structure, the lengths W1 and W2 of the upper and lower sides of the perpendicular magnetic recording layer of the truncated quadrangular pyramid shape corresponding to the burst pattern shown in FIG. 5 were increased and decreased with respect to a value of the track pitch Tp of the data tracks used as a reference, thereby forming test bursts of various shapes as shown in Table 1 below. In all test examples, the angle formed between a trapezoidal oblique surface and a base (lower surface) of the truncated quadrangular pyramid shape was set to 50°. That is, tan 50°=2 h/(W2−W1) was satisfied.

In the formation of the test bursts, as shown in FIG. 2, first burst tracks (VTRs1) 94a, second burst tracks (VTRs2) 94b, third burst tracks (VTRs3) 94c, and fourth burst tracks (VTRs4) 94d were arranged relative to a pattern of data tracks (DTRs) 80. Accordingly, by combining together a difference signal between outputs from VTR1 and VTR2 relative to the respective positions of a magnetic head and a difference signal between outputs from VTR3 and VTR4 relative to the respective positions of the magnetic head, it was possible to produce a more accurate PES signal as compared with a later-described structure composed of only two kinds of burst tracks.

On the other hand, a thin-film inductive head having a magnetic write width of 80 nm was used as a recording magnetic head, while a giant magnetoresistance effect (GMR) head was used as a reproducing magnetic head. A magnetic read width Wr of the reproducing magnetic head was set to various values in relation to other parameters (W1, W2, Tp) as shown in Table 1.

The perpendicular magnetic recording medium subjected to the convex-concave processing for the servo areas and data areas was further subjected to processing for magnetizing the convex-portion perpendicular magnetic recording layers to thereby produce servo signal magnetic fields. Specifically, the perpendicular magnetic recording medium was placed between magnetic poles of an electromagnet where a DC magnetic field of 15 kOe was generated so that the disk surfaces were set parallel to the magnetic pole surfaces, and then the perpendicular magnetic recording layers of the truncated quadrangular pyramid shapes in the servo areas and data areas were magnetized at a time to thereby record servo signals.

Using the magnetic recording mediums for Test Examples 1 thus prepared, tracking control tests were performed in the following manner.

Specifically, concerning the discrete track disks and the read magnetic heads shown in Table 1 below, position error signals PES in all combinations of magnitude relationships of W1, W2, and Wr with respect to the track pitch Tp were derived, and a judgment about whether or not the linearity of the PES signal is usable as a tracking property is shown in Table 1 as Yes or No about "Usable Level", taking into account that track position fluctuation between tracks is allowed to some degree.

Figure 7:
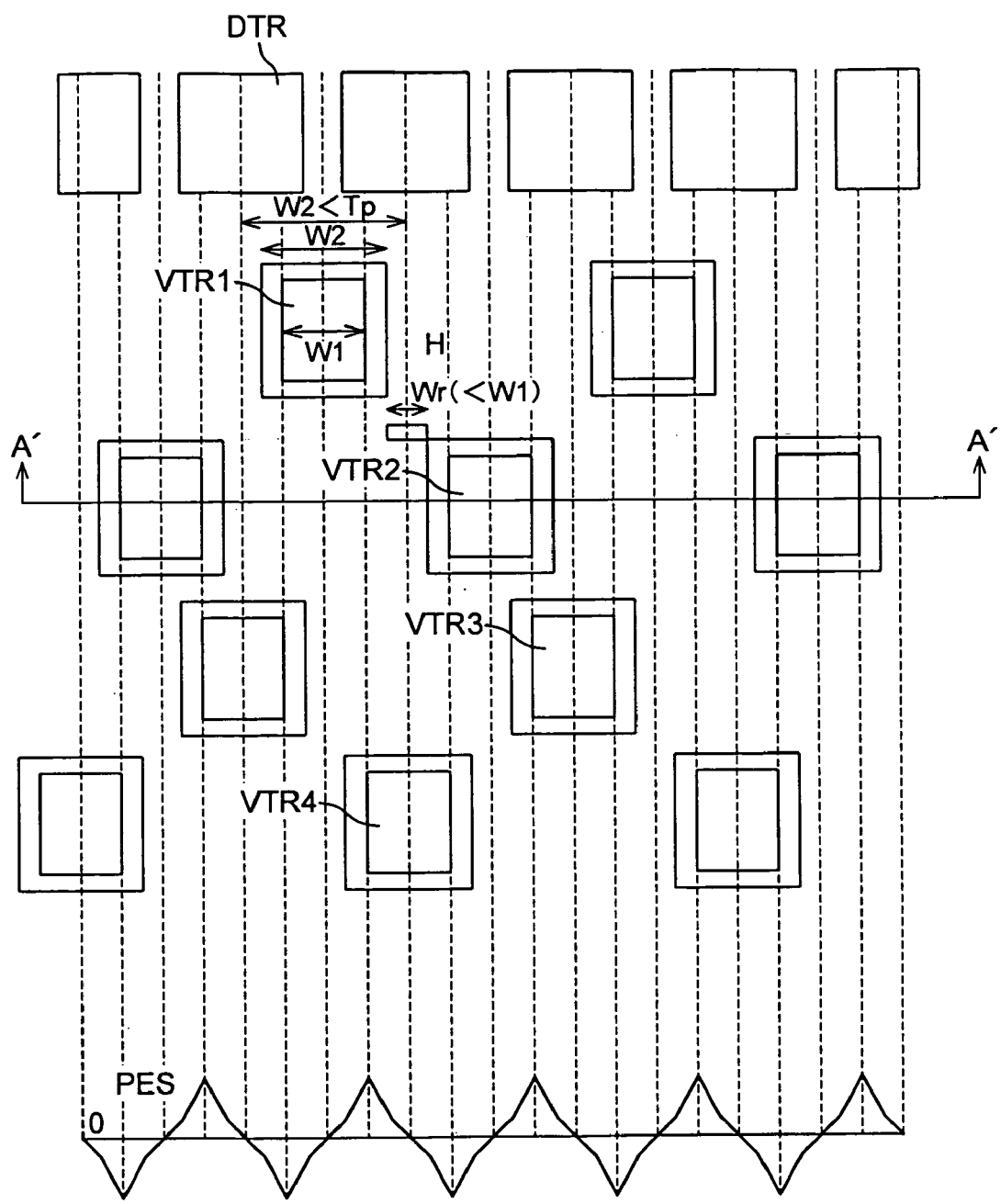
FIG. 7 is a diagram of a specific test mode, exemplarily showing a relationship of W1 and W2 of a burst pattern and a track pitch Tp with respect to a magnetic read width Wr and simultaneously showing a position error signal PES.

Further, corresponding figures identified in Table 1 exemplarily illustrate relationships among W1, W2, Tp, and Wr which were tested (see the corresponding figures). In each of the figures, the PES signal is also shown. Although each burst track actually includes a plurality of burst patterns arranged in parallel to each other, only one burst pattern is shown in the figure for facilitating understanding thereof.

tional view taken along line A'—A' in FIG. 7. The same symbols assigned in FIGS. 3 and 7 denote the same components.

(2) In Embodiment I-2 shown in Table 1, an examination was made as to how the position error signal PES changed when a relationship of W1 and W2 of the burst pattern

TABLE 1

Figure 8:
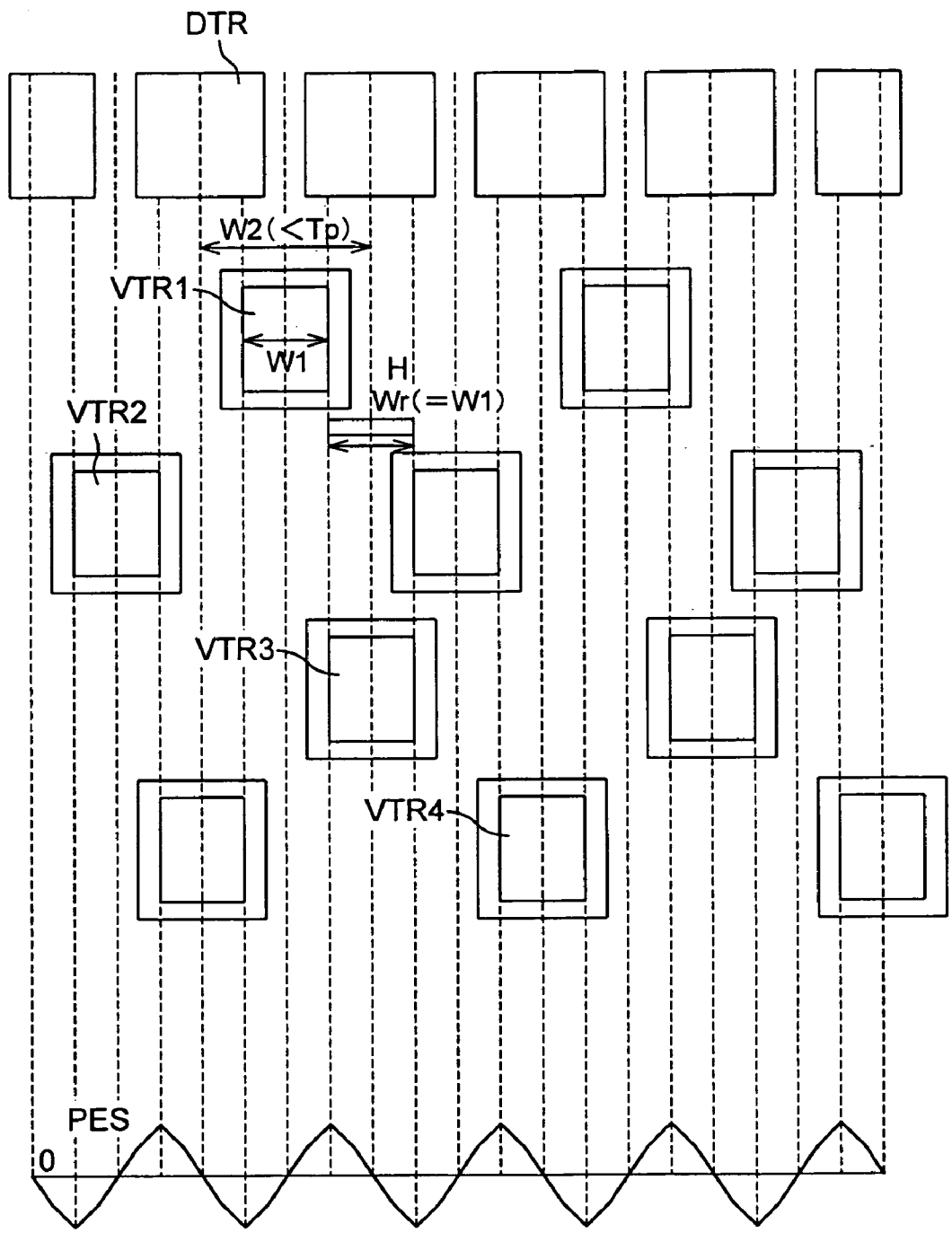
FIG. 8 is a diagram of a specific test mode, exemplarily showing a relationship of W1 and W2 of a burst pattern and a track pitch Tp with respect to a magnetic read width Wr and simultaneously showing a position error signal PES.
Figure 9:
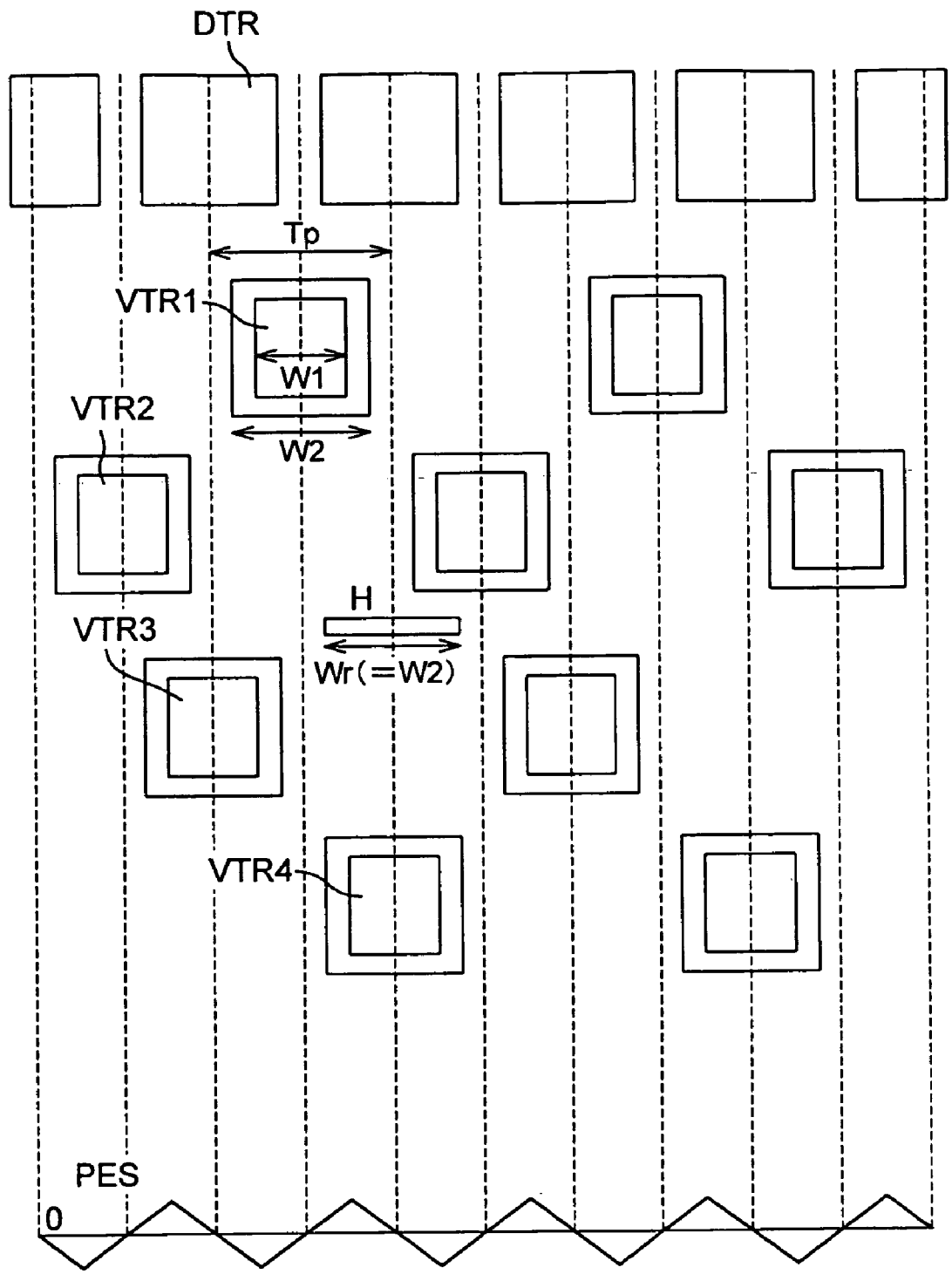
FIG. 9 is a diagram of a specific test mode, exemplarily showing a relationship of W1 and W2 of a burst pattern and a track pitch Tp with respect to a magnetic read width Wr and simultaneously showing a position error signal PES.
Figure 10:
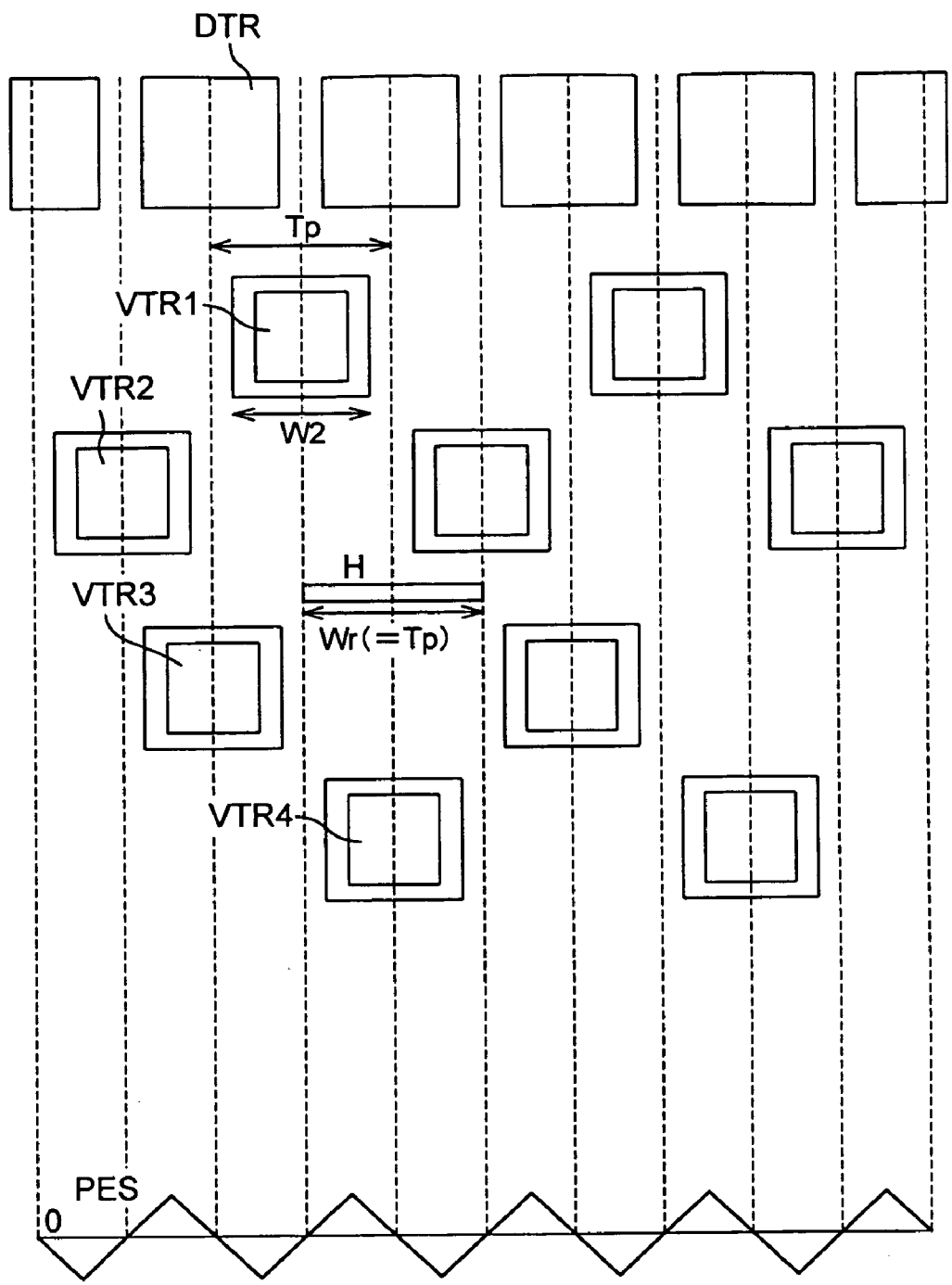
FIG. 10 is a diagram of a specific test mode, exemplarily showing a relationship of W1 and W2 of a burst pattern and a track pitch Tp with respect to a magnetic read width Wr and simultaneously showing a position error signal PES.
Figure 11:
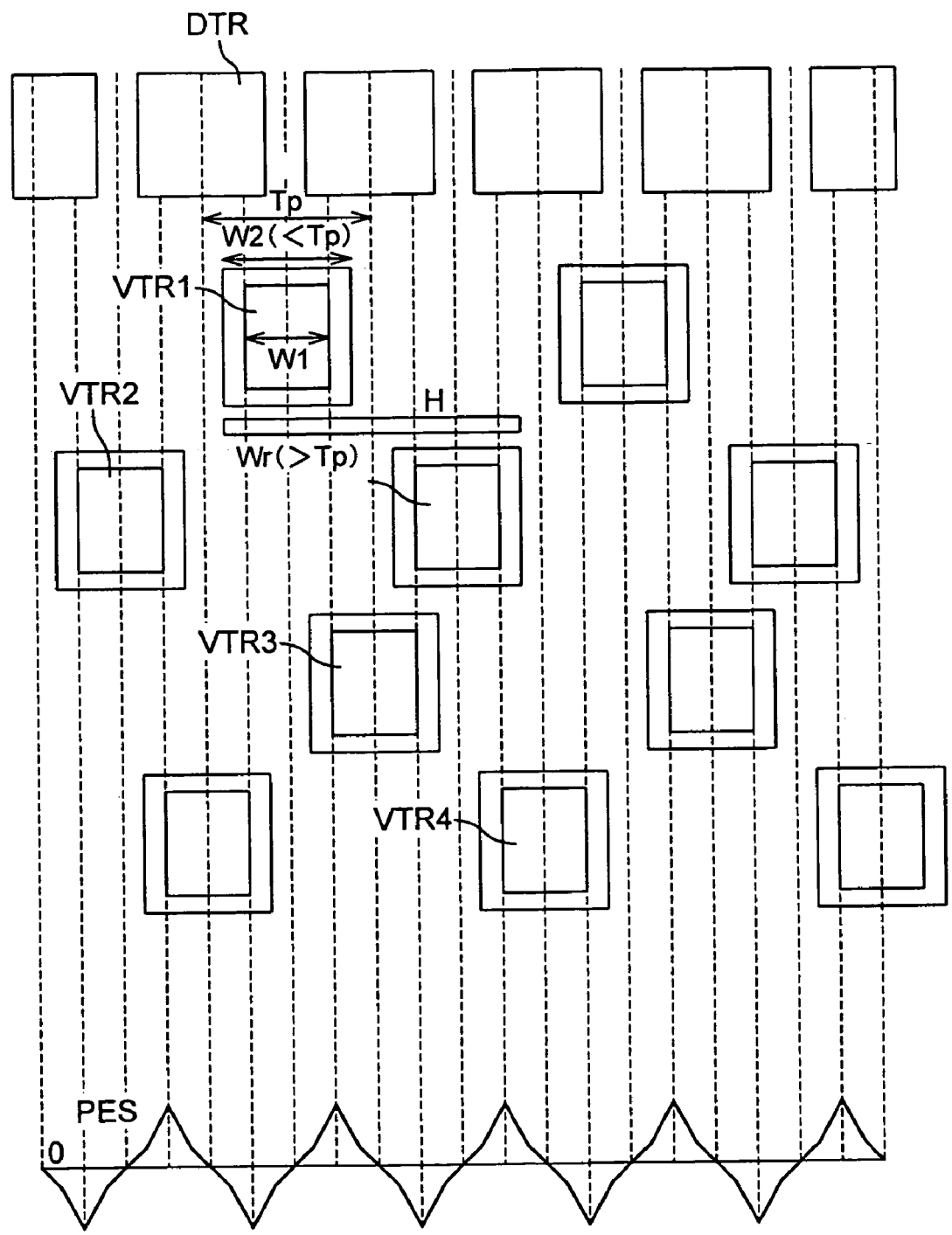
FIG. 11 is a diagram of a specific test mode, exemplarily showing a relationship of W1 and W2 of a burst pattern and a track pitch Tp with respect to a magnetic read width Wr and simultaneously showing a position error signal PES.
Figure 12:
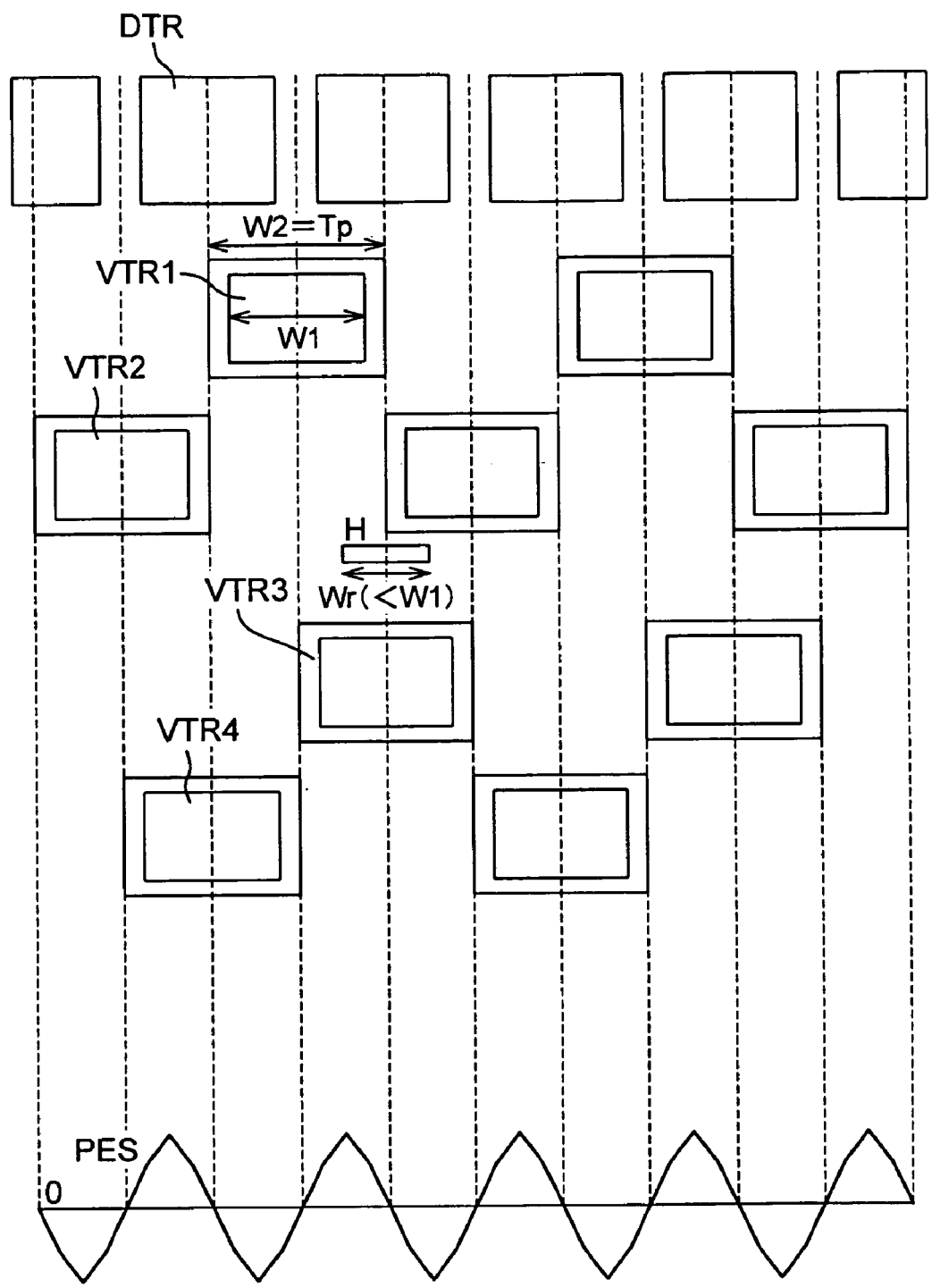
FIG. 12 is a diagram of a specific test mode, exemplarily showing a relationship of W1 and W2 of a burst pattern and a track pitch Tp with respect to a magnetic read width Wr and simultaneously showing a position error signal PES.
Figure 13:
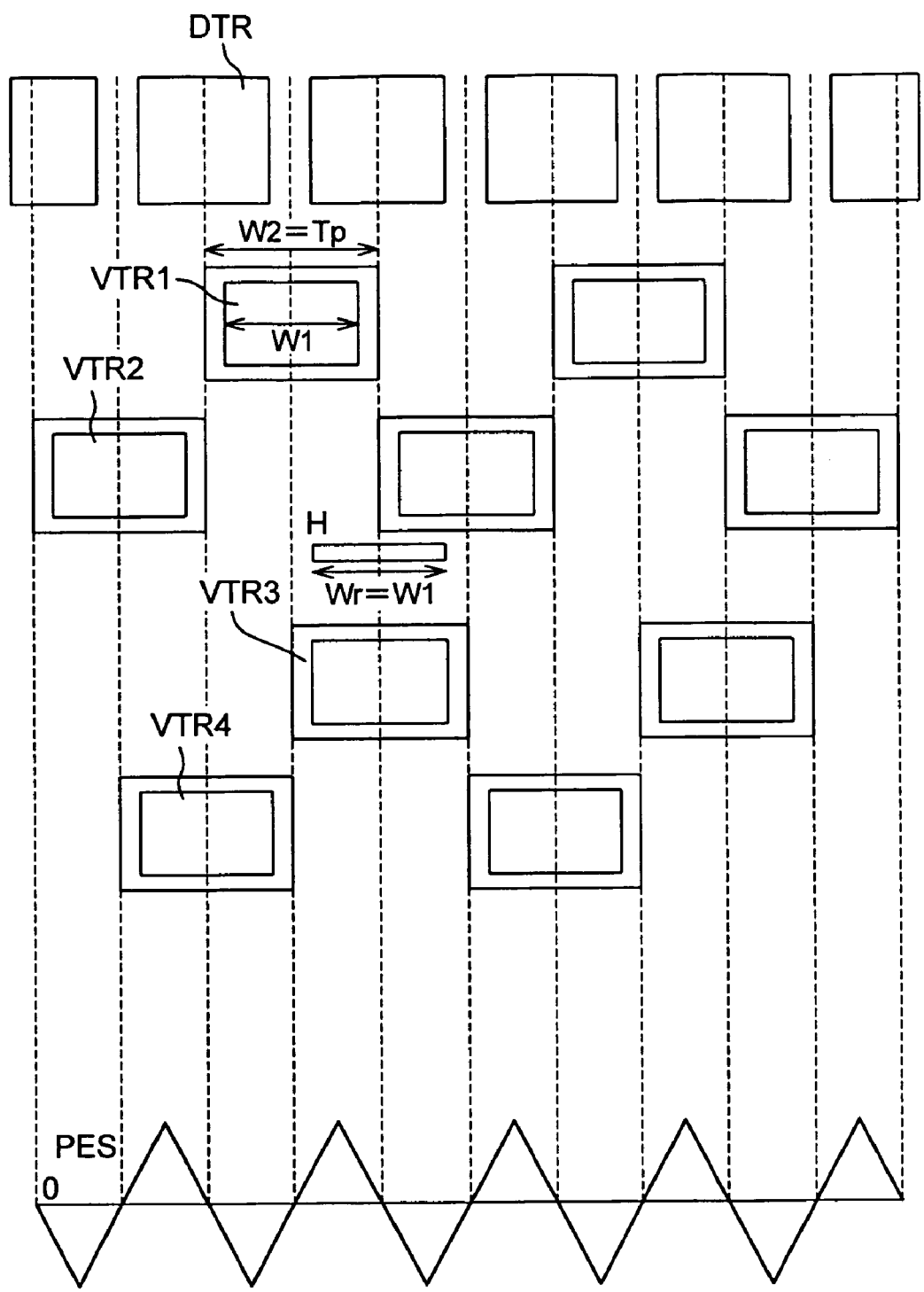
FIG. 13 is a diagram of a specific test mode, exemplarily showing a relationship of W1 and W2 of a burst pattern and a track pitch Tp with respect to a magnetic read/width Wr and simultaneously showing a position error signal PES.
Figure 14:
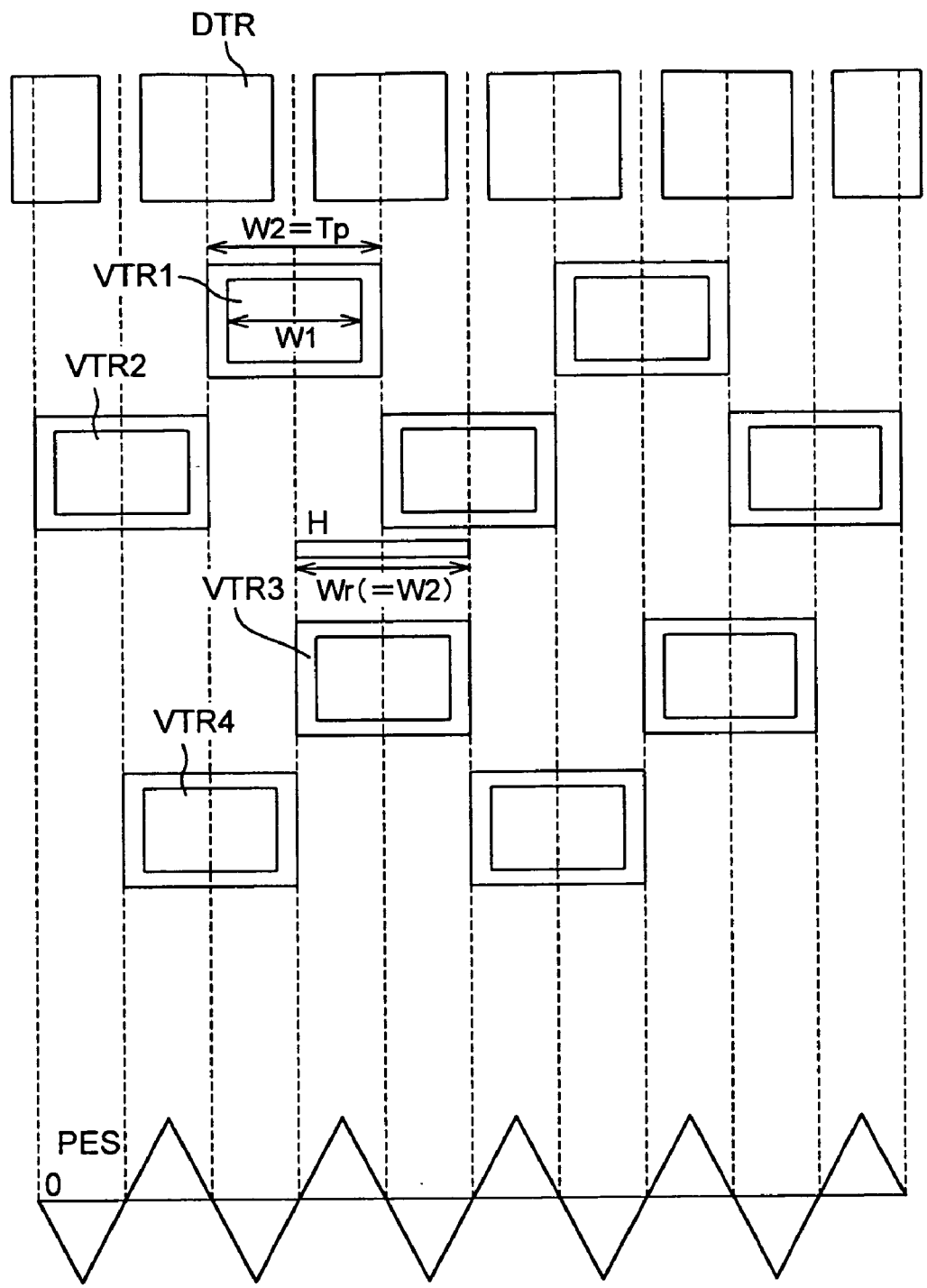
FIG. 14 is a diagram of a specific test mode, exemplarily showing a relationship of W1 and W2 of a burst pattern and a track pitch Tp with respect to a magnetic read width Wr and simultaneously showing a position error signal PES.
Figure 15:
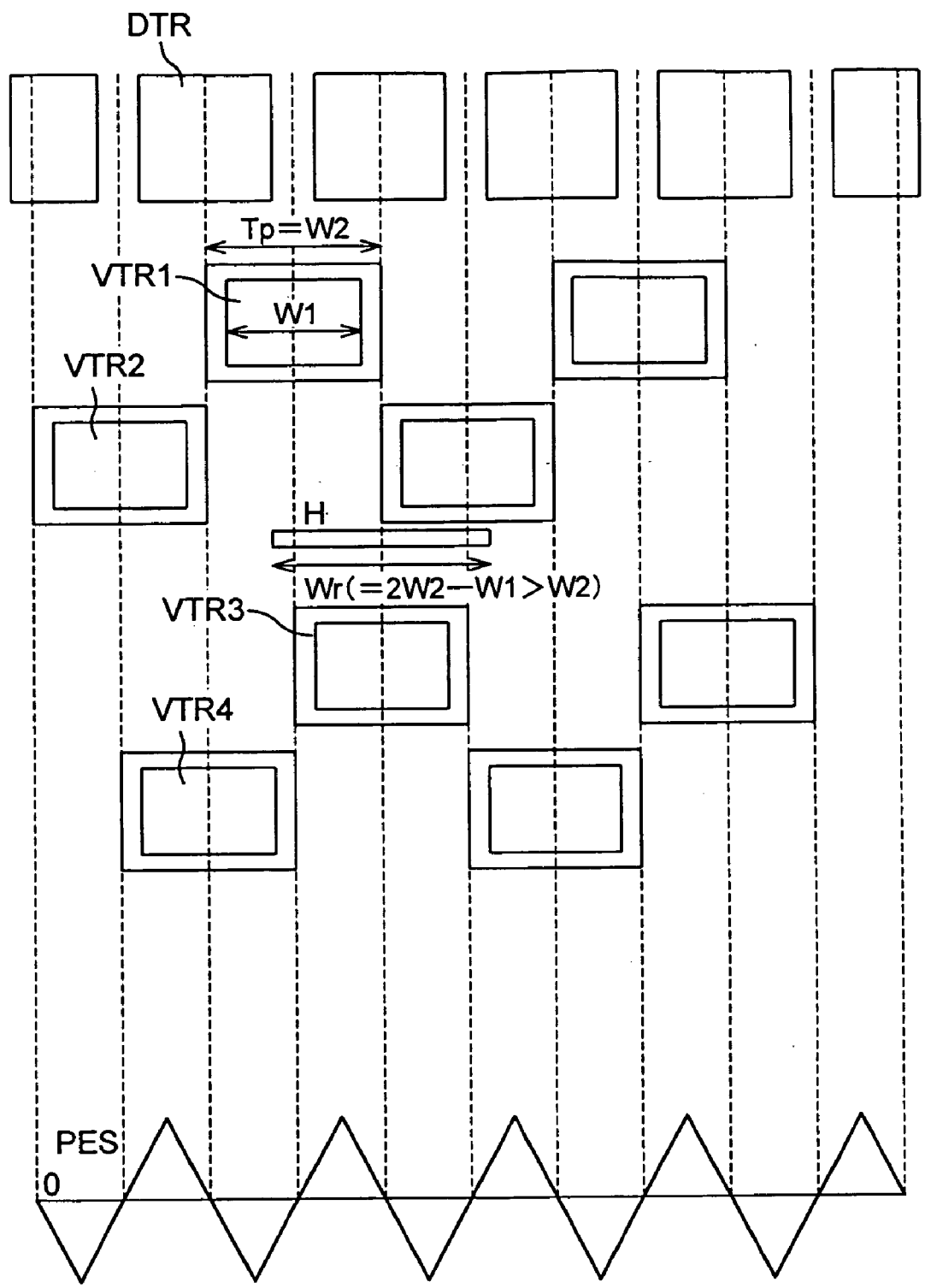
FIG. 15 is a diagram of a specific test mode, exemplarily showing a relationship of W1 and W2 of a burst pattern and a track pitch Tp with respect to a magnetic read width Wr and simultaneously showing a position error signal PES.
Figure 16:
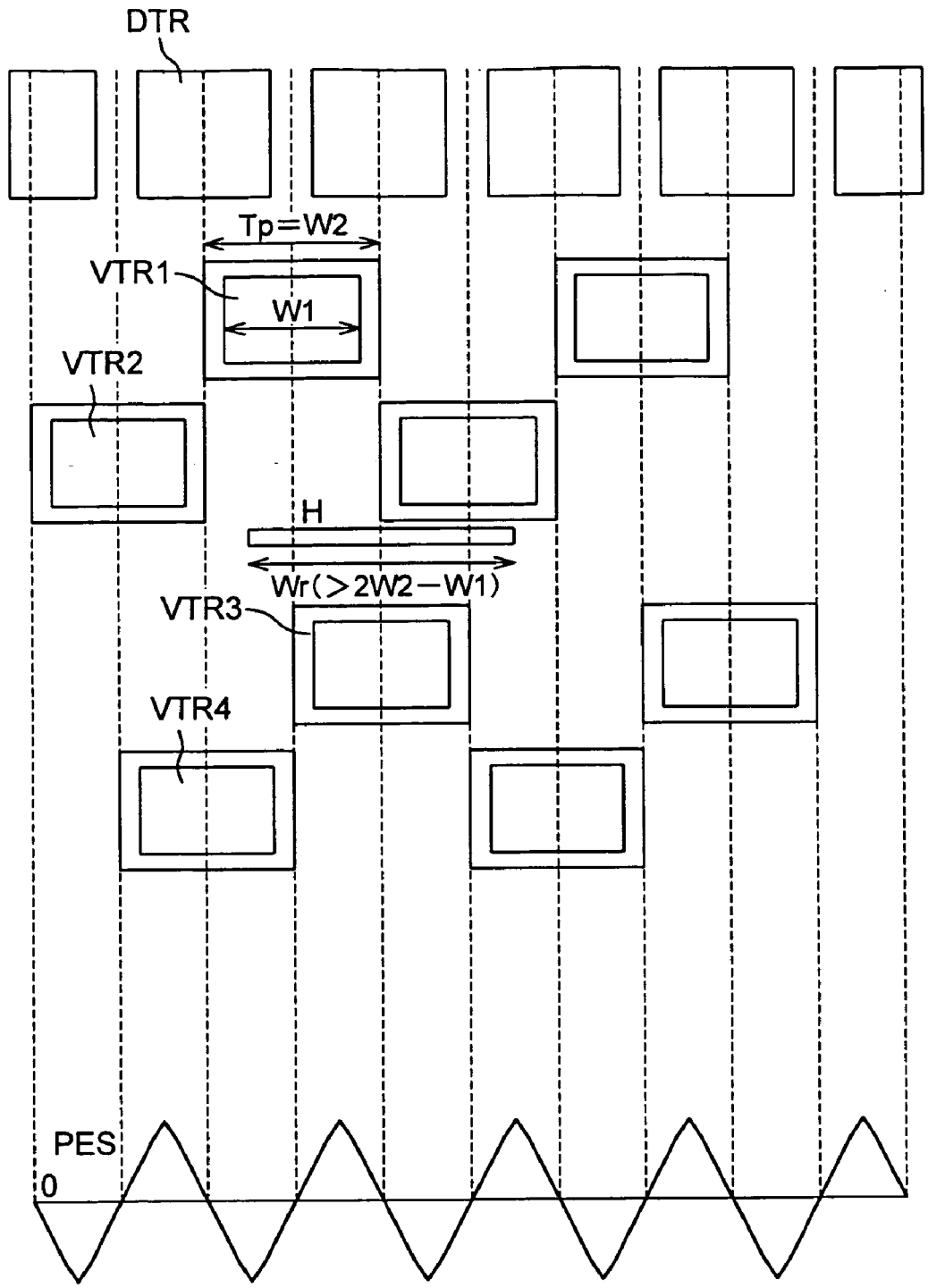
FIG. 16 is a diagram of a specific test mode, exemplarily showing a relationship of W1 and W2 of a burst pattern and a track pitch Tp with respect to a magnetic read width Wr and simultaneously showing a position error signal PES.
Figure 17:
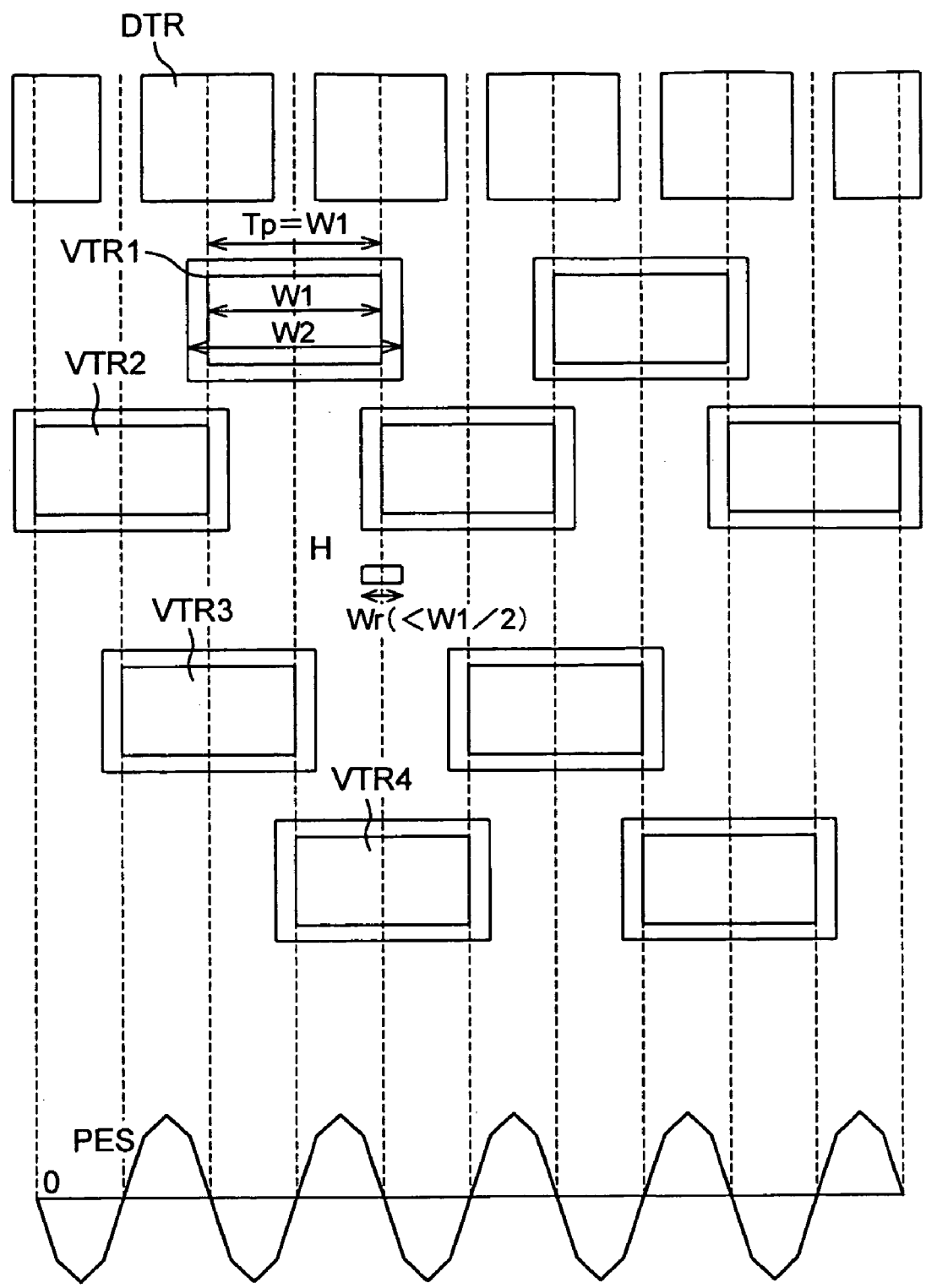
FIG. 17 is a diagram of a specific test mode, exemplarily showing a relationship of W1 and W2 of a burst pattern and a track pitch Tp with respect to a magnetic read width Wr and simultaneously showing a position error signal PES.
Figure 18:
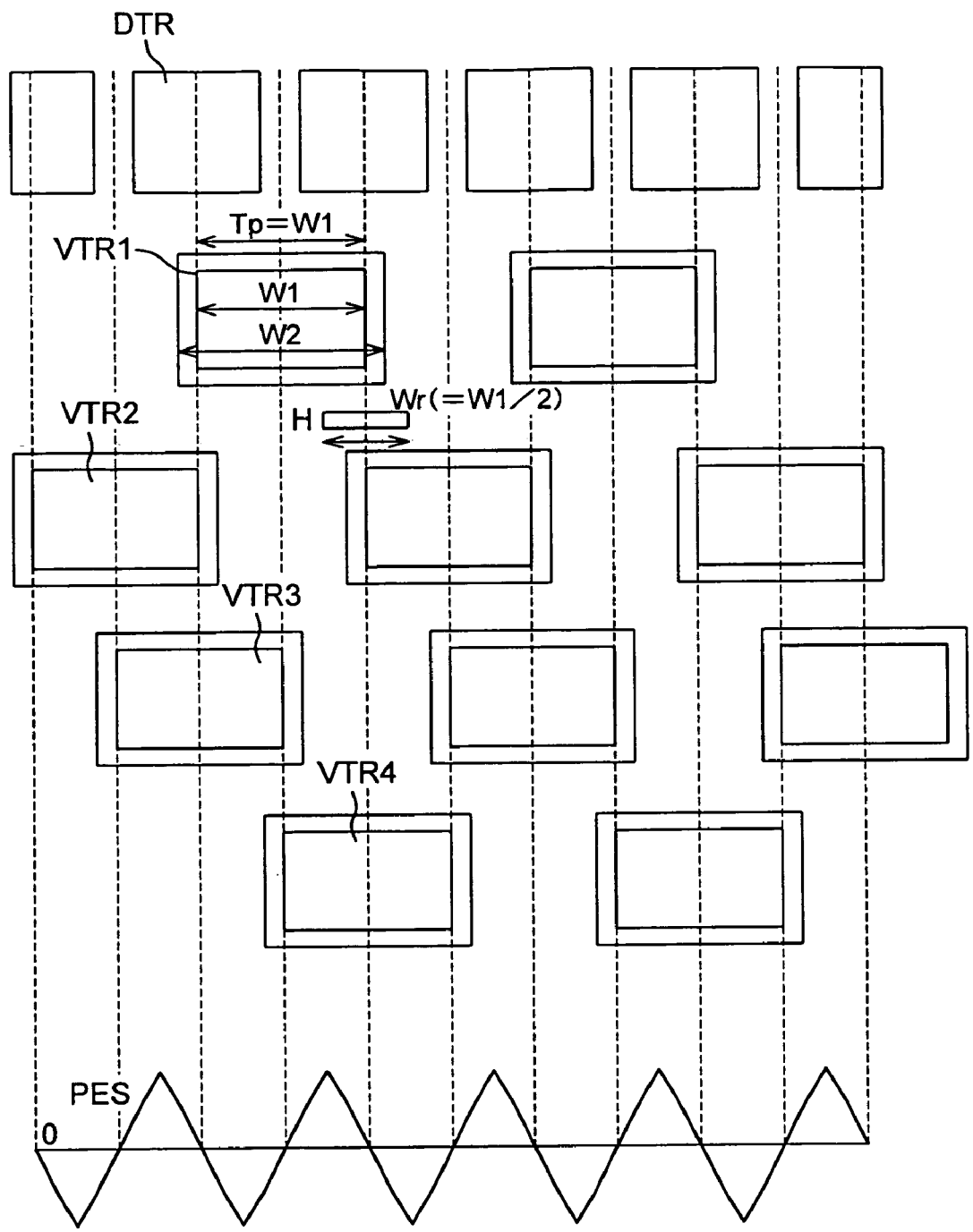
FIG. 18 is a diagram of a specific test mode, exemplarily showing a relationship of W1 and W2 of a burst pattern and a track pitch Tp with respect to a magnetic read width Wr and simultaneously showing a position error signal PES.
Figure 19:
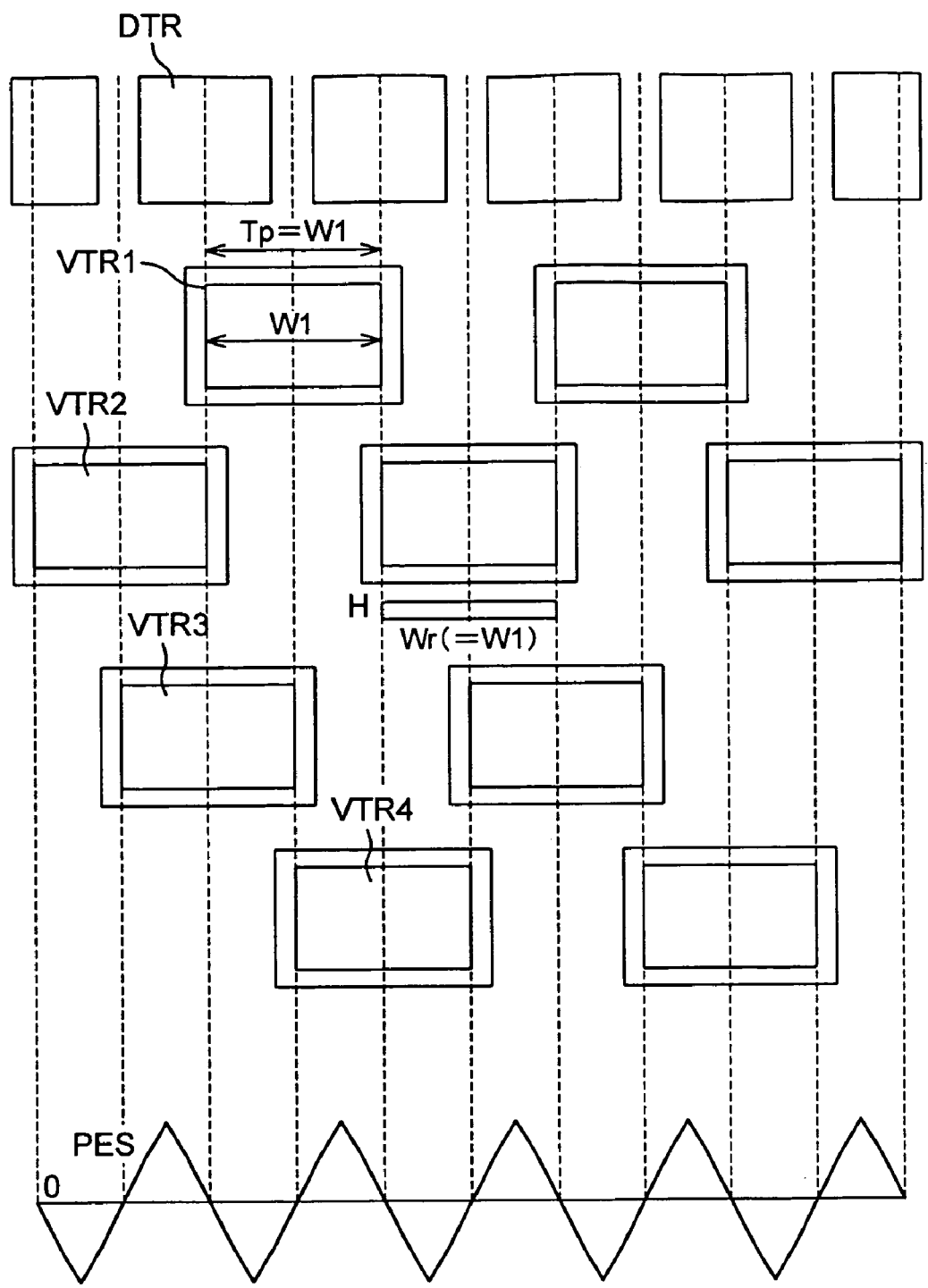
FIG. 19 is a diagram of a specific test mode, exemplarily showing a relationship of W1 and W2 of a burst pattern and a track pitch Tp with respect to a magnetic read width Wr and simultaneously showing a position error signal PES.
Figure 20:
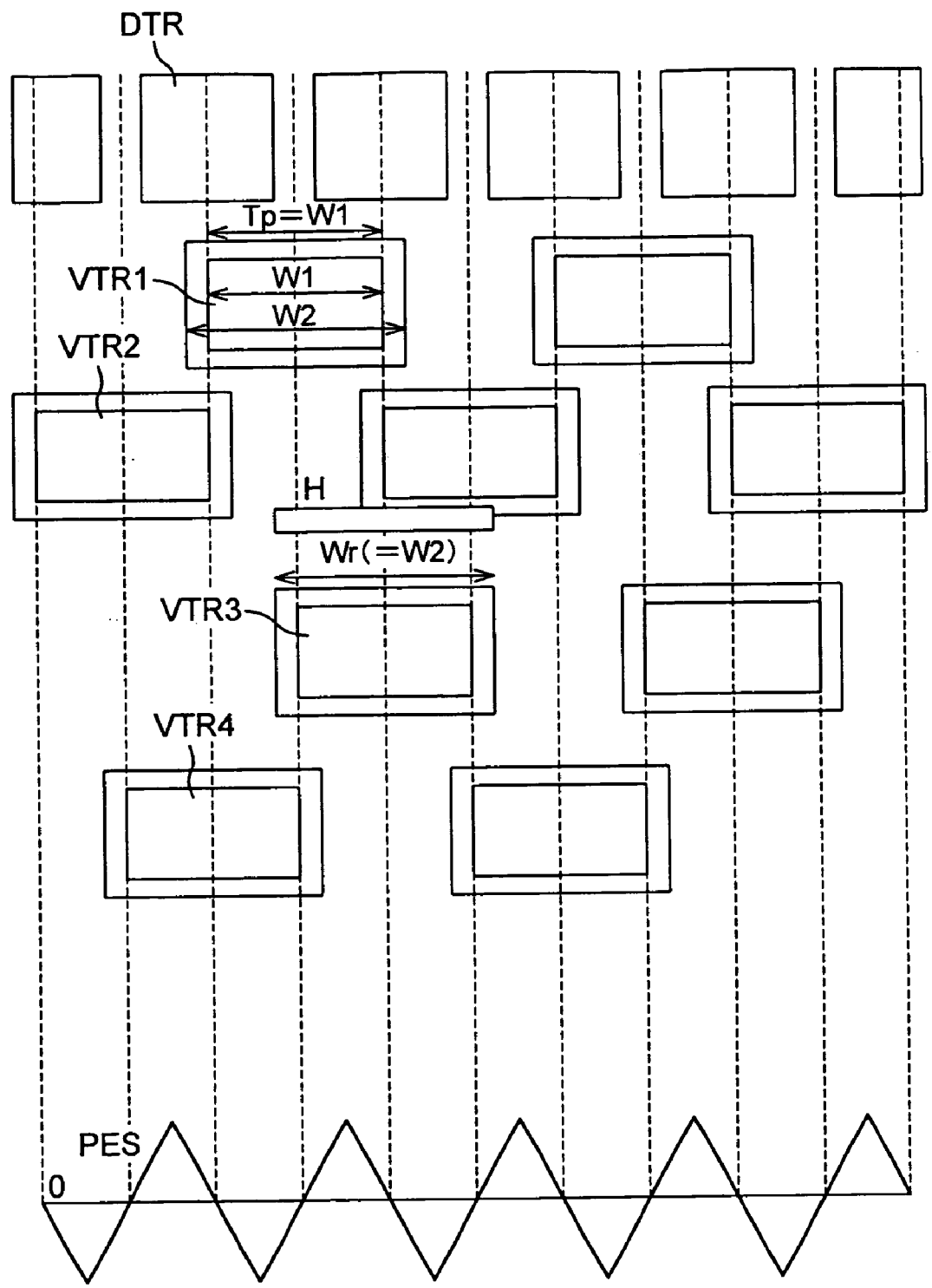
FIG. 20 is a diagram of a specific test mode, exemplarily showing a relationship of W1 and W2 of a burst pattern and a track pitch Tp with respect to a magnetic read width Wr and simultaneously showing a position error signal PES.
Figure 21:
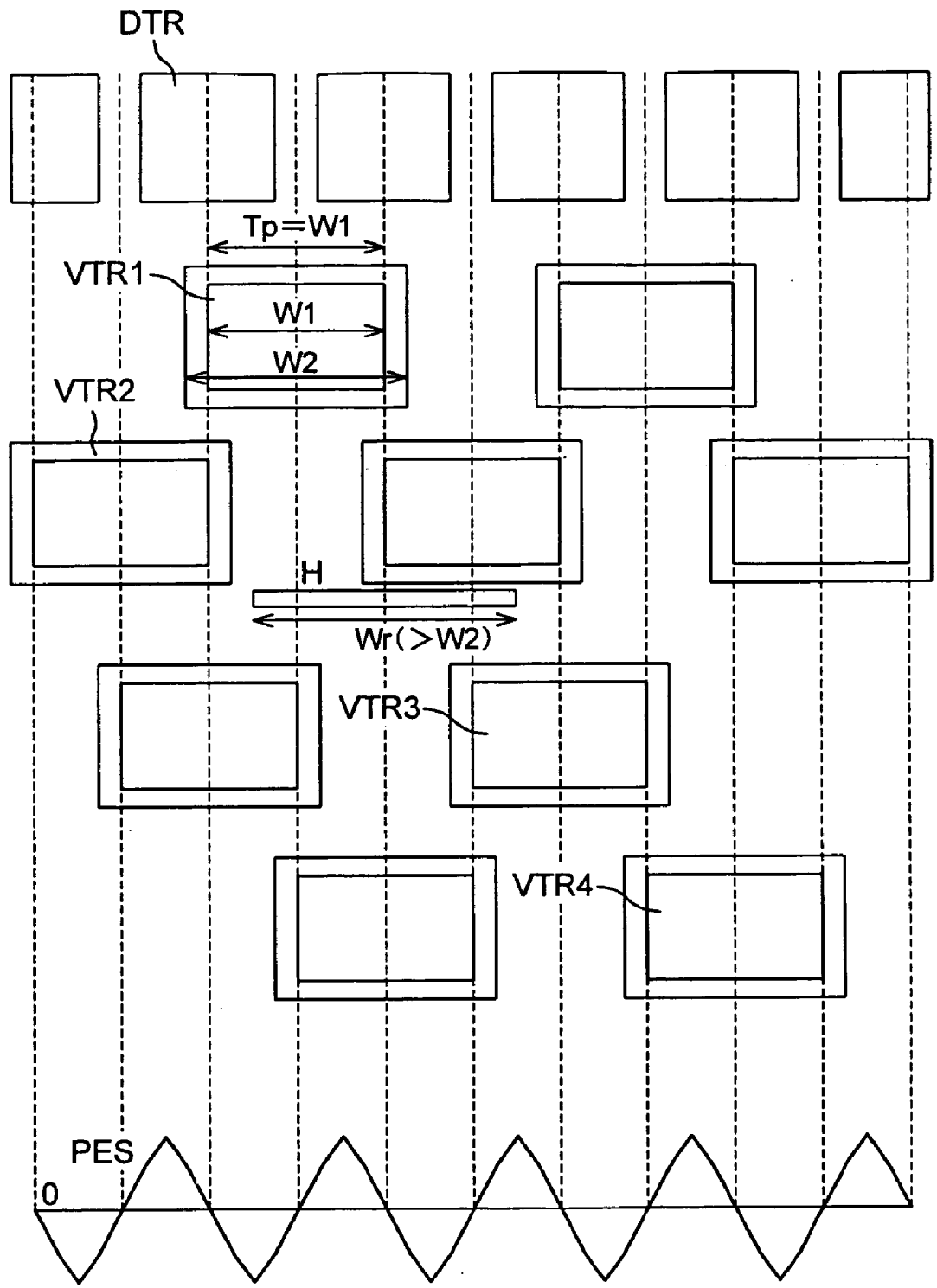
FIG. 21 is a diagram of a specific test mode, exemplarily showing a relationship of W1 and W2 of a burst pattern and a track pitch Tp with respect to a magnetic read width Wr and simultaneously showing a position error signal PES.
Figure 22:
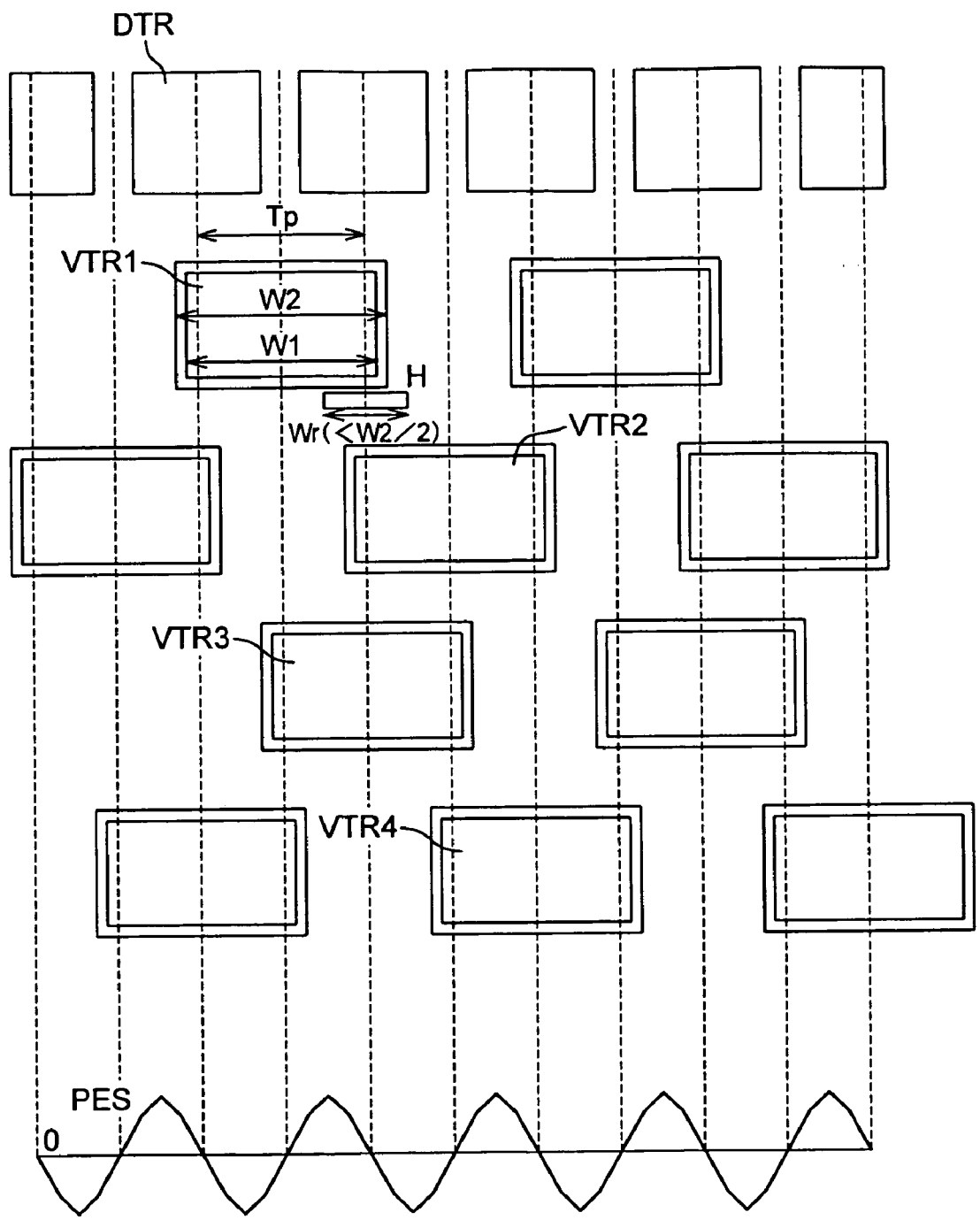
FIG. 22 is a diagram of a specific test mode, exemplarily showing a relationship of W1 and W2 of a burst pattern and a track pitch Tp with respect to a magnetic read width Wr and simultaneously showing a position error signal PES.
Figure 23:
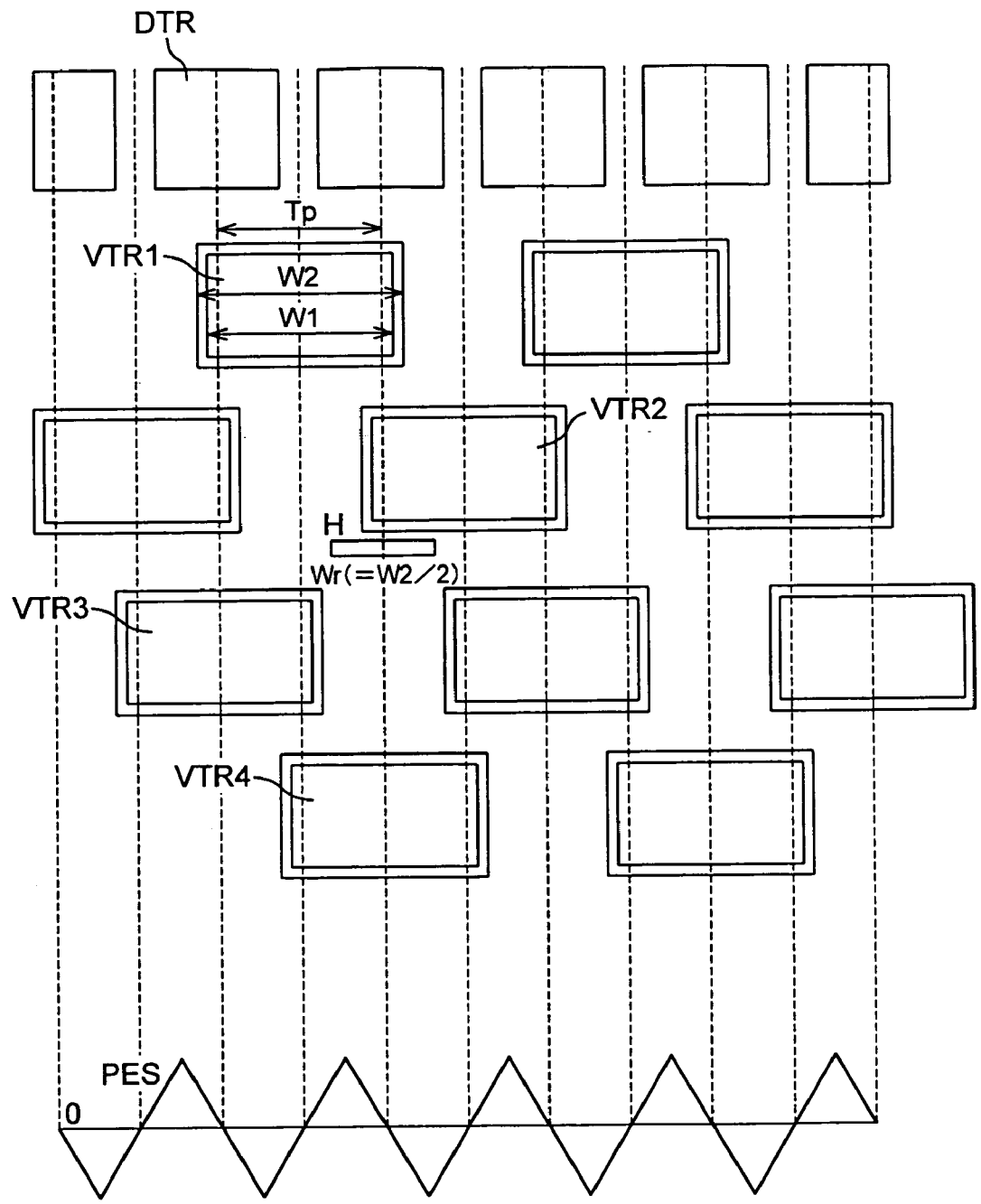
FIG. 23 is a diagram of a specific test mode, exemplarily showing a relationship of W1 and W2 of a burst pattern and a track pitch Tp with respect to a magnetic read width Wr and simultaneously showing a position error signal PES.
Figure 24:
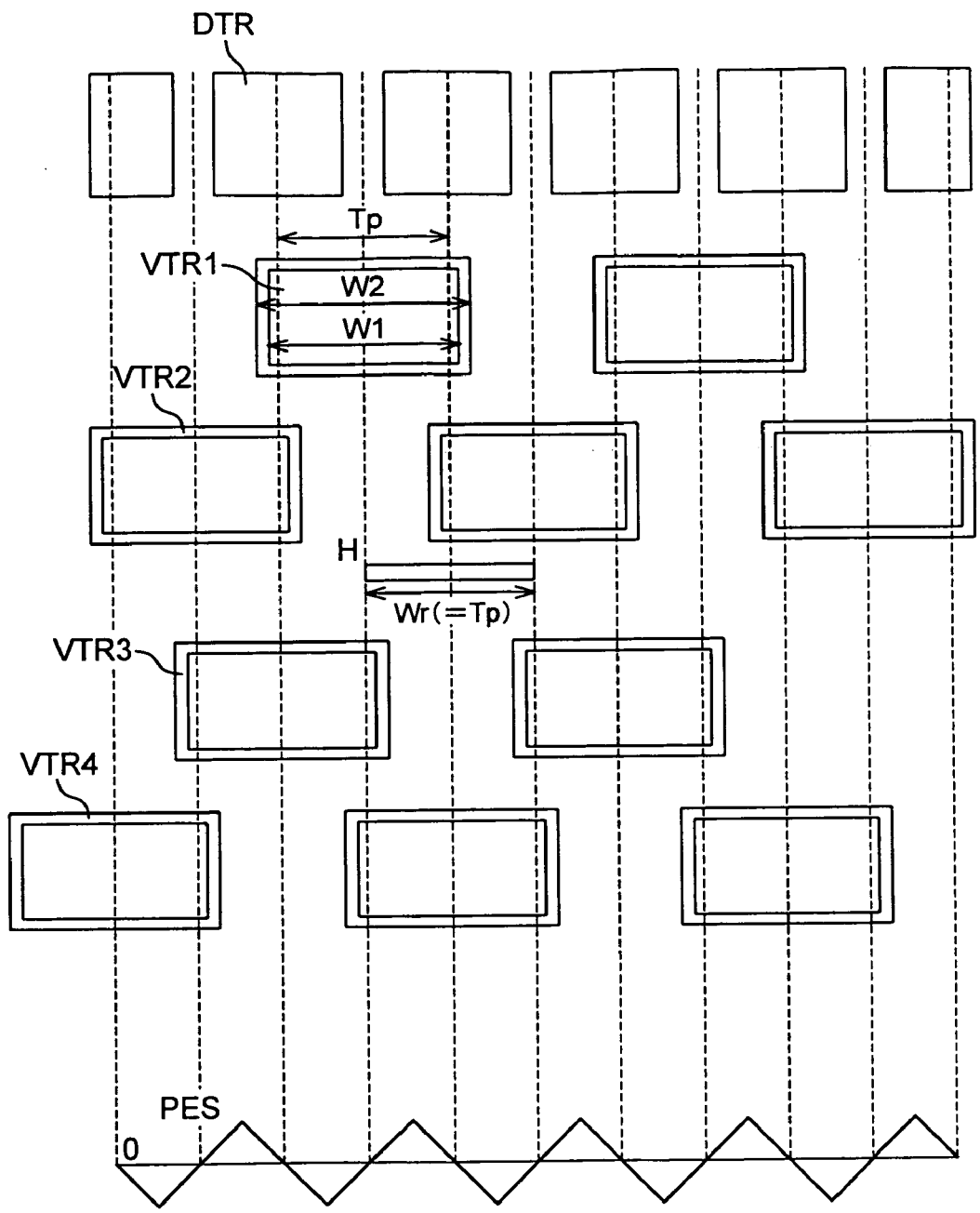
FIG. 24 is a diagram of a specific test mode, exemplarily showing a relationship of W1 and W2 of a burst pattern and a track pitch Tp with respect to a magnetic read width Wr and simultaneously showing a position error signal PES.
Figure 25:
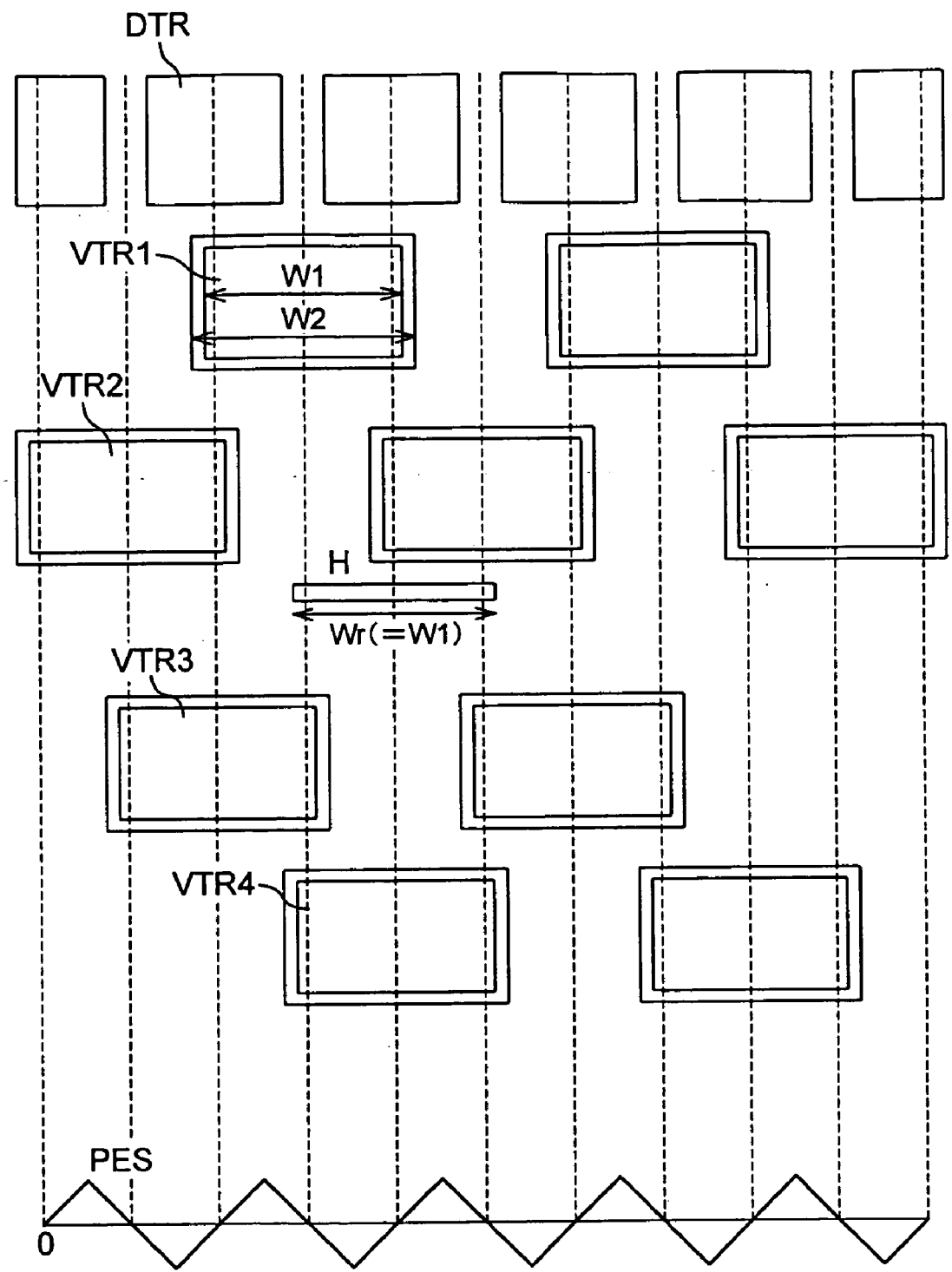
FIG. 25 is a diagram of a specific test mode, exemplarily showing a relationship of W1 and W2 of a burst pattern and a track pitch Tp with respect to a magnetic read width Wr and simultaneously showing a position error signal PES.
Figure 26:
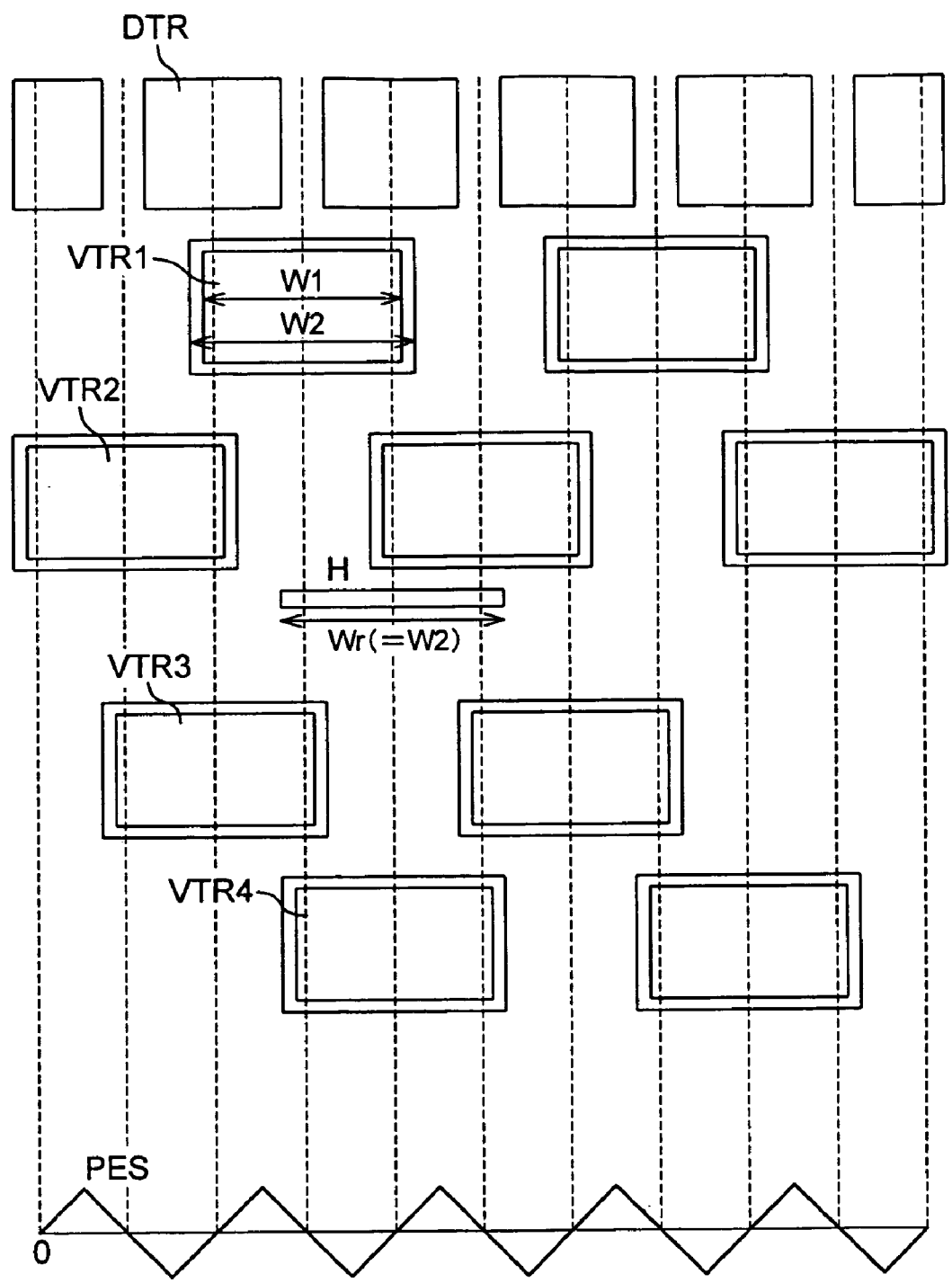
FIG. 26 is a diagram of a specific test mode, exemplarily showing a relationship of W1 and W2 of a burst pattern and a track pitch Tp with respect to a magnetic read width Wr and simultaneously showing a position error signal PES.
Figure 27:
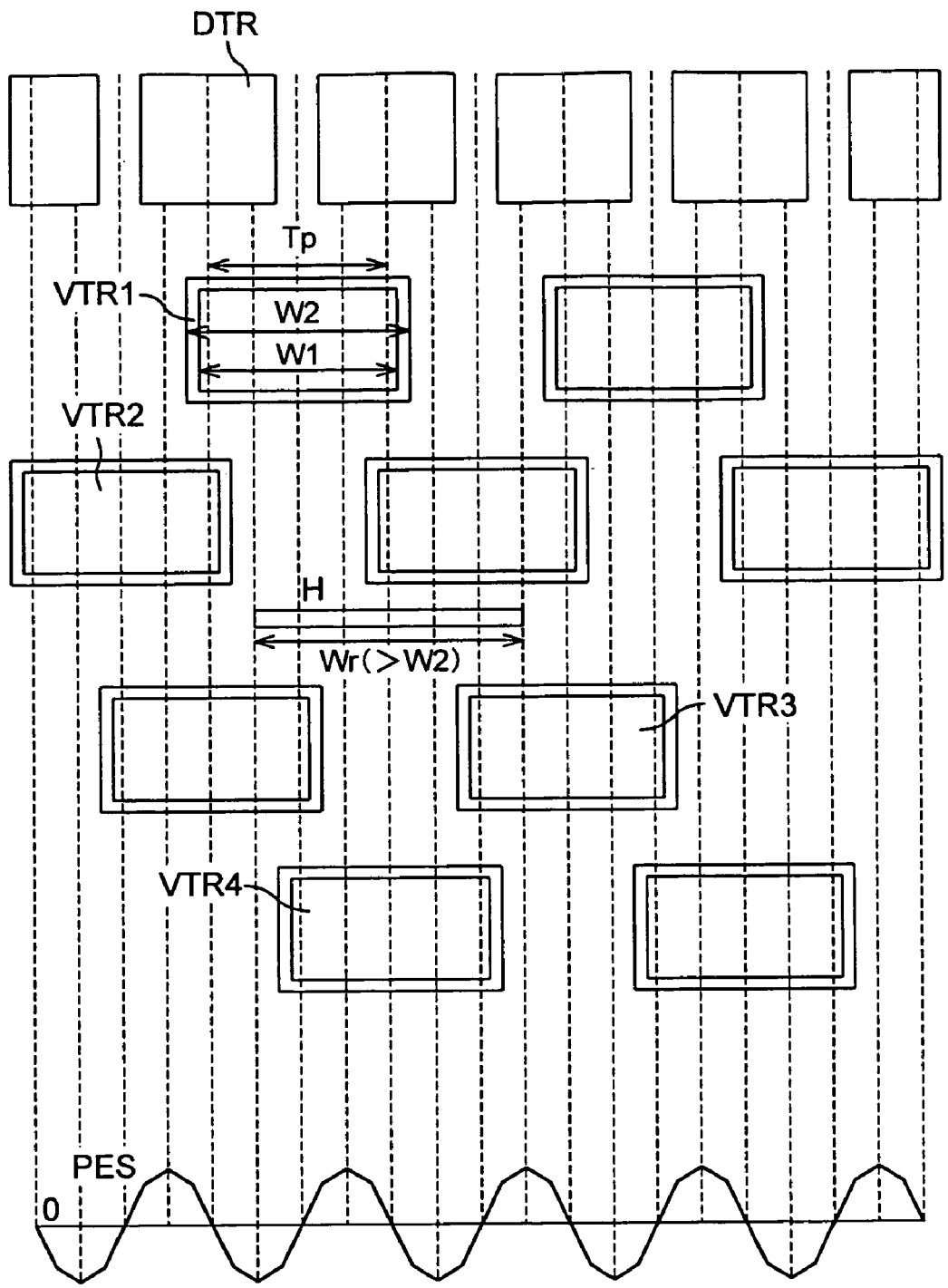
FIG. 27 is a diagram of a specific test mode, exemplarily showing a relationship of W1 and W2 of a burst pattern and a track pitch Tp with respect to a magnetic read width Wr and simultaneously showing a position error signal PES.

| Embodiment | Relation between Tp and W1 or W2 | Relation between Wr and W1, W2, or Tp | Usable Level | Linearity of PES | Corresponding Figure |
|---|---|---|---|---|---|
| I-1 | W2 < Tp | Wr < W1 | No(X) | Linearity Degraded | FIG. 7 |
|  |  | Wr = W1 | Yes(O) | Linearity on Usable Level | FIG. 8 |
|  |  | Wr = W2 | Yes(O) | Linearity Excellent | FIG. 9 |
|  |  | Wr = Tp | Yes(O) | Linearity Excellent | FIG. 10 |
|  |  | Wr > Tp | No(X) | Linearity Degraded | FIG. 11 |
|  |  | Wr < W1 | No(X) | Linearity Degraded | FIG. 12 |
|  |  | Wr = W1 | Yes(O) | Linearity Excellent | FIG. 13 |
| I-2 | W2 = Tp | Wr = W2 | Yes(O) | Linearity Excellent | FIG. 14 |
|  |  | Wr = 2W2 − W1 > W2 | Yes(O) | Linearity Excellent | FIG. 15 |
|  |  | Wr > 2W2 −W1 | No(X) | Linearity Degraded | FIG. 16 |
|  |  | Wr < W1/2 | No(X) | Linearity Degraded | FIG. 17 |
|  |  | Wr = W1/2 | Yes(O) | Linearity on Usable Level | FIG. 18 |
| I-3 | W1 = Tp | Wr = W1 | Yes(O) | Linearity Excellent | FIG. 19 |
|  |  | Wr = W2 | Yes(O) | Linearity Excellent | FIG. 20 |
|  |  | Wr > W2 | No(X) | Linearity Degraded | FIG. 21 |
|  |  | Wr < W2/2 | No(X) | Linearity Degraded | FIG. 22 |
|  |  | Wr = W2/2 | Yes(O) | Linearity on Usable Level | FIG. 23 |
|  |  | Wr = Tp | Yes(O) | Linearity Excellent | FIG. 24 |
| I-4 | W1 > Tp | Wr = W1 | Yes(O) | Linearity Excellent | FIG. 25 |
|  |  | Wr = W2 | Yes(O) | Linearity Excellent | FIG. 26 |
|  |  | Wr > W2 | No(X) | Linearity Degraded | FIG. 27 |

(1) In Embodiment I-1 shown in Table 1, an examination was made as to how the position error signal PES changed when a relationship of W1 and W2 of the burst pattern and the track pitch Tp with respect to the magnetic read width Wr was changed under the condition of Tp>W2. FIGS. 7 to 11 correspond to the cases, respectively.

Figure 49:
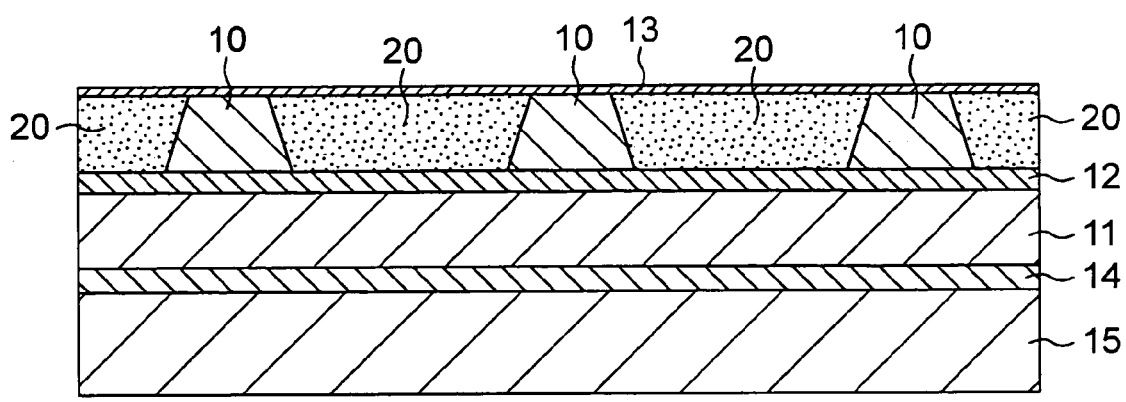
FIG. 49 is an exemplary sectional view taken along line A'—A' in FIG. 7.

As seen from FIGS. 7 to 11, it is understood that the linearity of the position error detection signal is obtained and is on a usable level as the position error signal in the range of "Tp≧Wr>W2>W1". FIG. 49 shows an exemplary secwith respect to the magnetic read width Wr was changed under the condition of W2=Tp. FIGS. 12 to 16 correspond to the cases, respectively.

As seen from FIGS. 12 to 16, it is understood that the linearity of the position error detection signal is obtained and is on a usable level as the position error signal in the range of "W2=Tp and 2W2−W1≧Wr≧W1".

(3) In Embodiment I-3 shown in Table 1, an examination was made as to how the position error signal PES changed when a relationship of W1 and W2 of the burst pattern with respect to the magnetic read width Wr was changed under the condition of W1=Tp. FIGS. 17 to 21 correspond to the cases, respectively.

As seen from FIGS. 17 to 21, it is understood that the linearity of the position error detection signal is obtained and is on a usable level as the position error signal in the range of "W1=Tp and 2W2−W1≧Wr≧W1/2". Particularly, the range of "W1=Tp and 2W2−W1≧Wr≧W1" is preferable.

(4) In Embodiment I-4 shown in Table 1, an examination was made as to how the position error signal PES changed when a relationship of W1 and W2 of the burst pattern and Tp with respect to the magnetic read width Wr was changed under the condition of W1>Tp. FIGS. 22 to 27 correspond to the cases, respectively.

As seen from FIGS. 22 to 27, it is understood that the linearity of the position error detection signal is obtained and is on a usable level as the position error signal in the range of "W1>Tp and W2≧Wr≧Tp".

[II] TEST EXAMPLES 2

With respect to burst signal arrangement composed of a combination of first bursts (VTRs1) and second bursts (VTRs2) each equally straddling a center line that defines the track pitch between adjacent tracks (Structure of Magnetic Recording Medium)

The structure of each burst portion of the magnetic recording medium in Test Examples 1 was changed to a structure composed only of the first bursts (VTRs1) and the second bursts (VTRs2). That is, the combination of the third and fourth bursts was not provided. In the same manner as Test Examples 1 except that, magnetic recording mediums for use in Test Examples 2 were produced. Using these magnetic recording mediums for Test Examples 2, tracking control tests were performed following Test Examples 1.

Specifically, concerning the discrete track disks and the read magnetic heads shown in Table 2 below, position error signals PES in all combinations of magnitude relationships of W1, W2, and Wr with respect to the track pitch Tp were derived, and a judgment about whether or not the linearity of the PES signal is usable as a tracking property is shown in Table 2 as Yes or No about "Usable Level".

Further, corresponding figures identified in Table 2 exemplarily illustrate relationships among W1, W2, Tp, and Wr which were tested (see the corresponding figures). In each of the figures, the PES signal is also shown. Although each burst track actually includes a plurality of burst patterns arranged in parallel to each other, only one burst pattern is shown in the figure for facilitating understanding thereof.

TABLE 2

Figure 28:
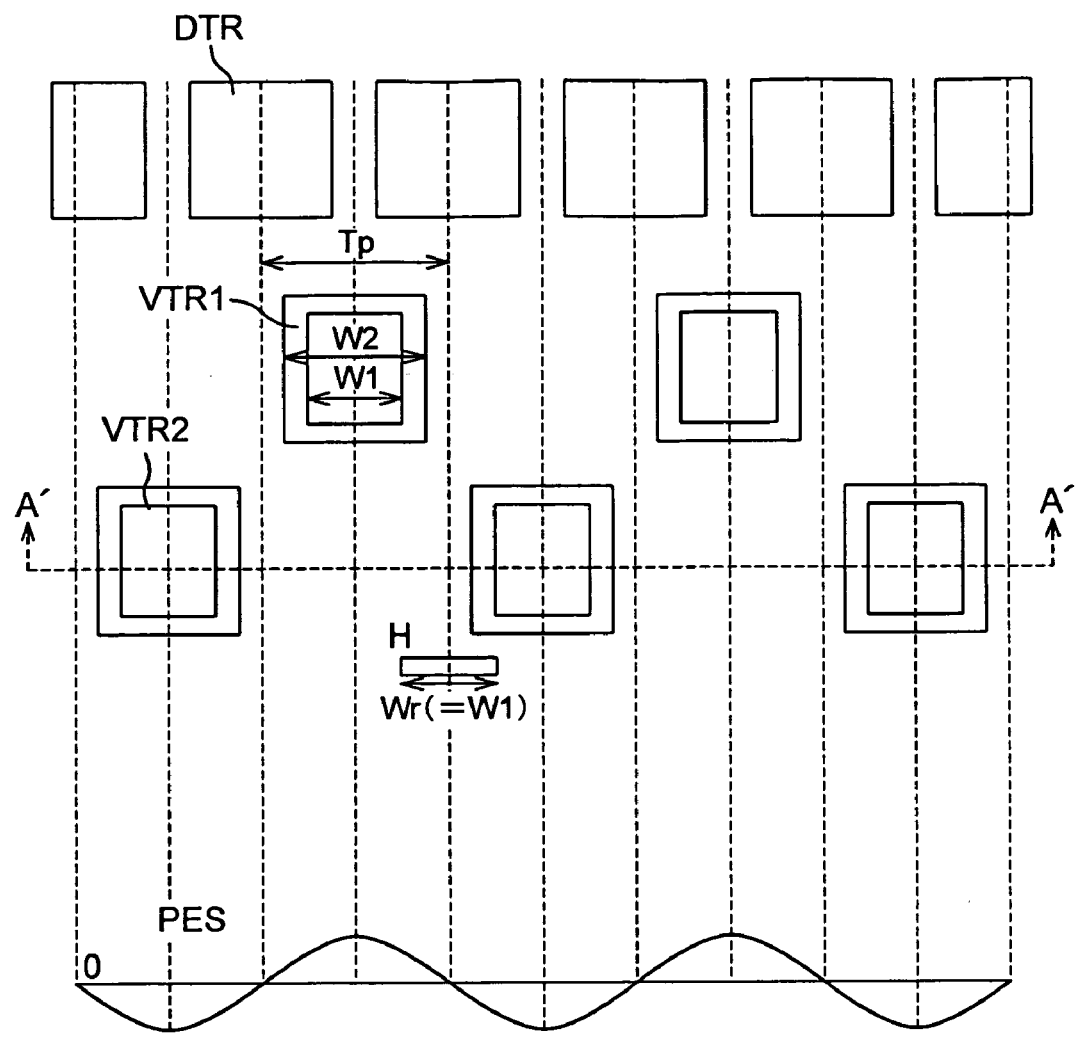
FIG. 28 is a diagram of a specific test mode, exemplarily showing a relationship of W1 and W2 of a burst pattern and a track pitch Tp with respect to a magnetic read width Wr and simultaneously showing a position error signal PES.
Figure 29:
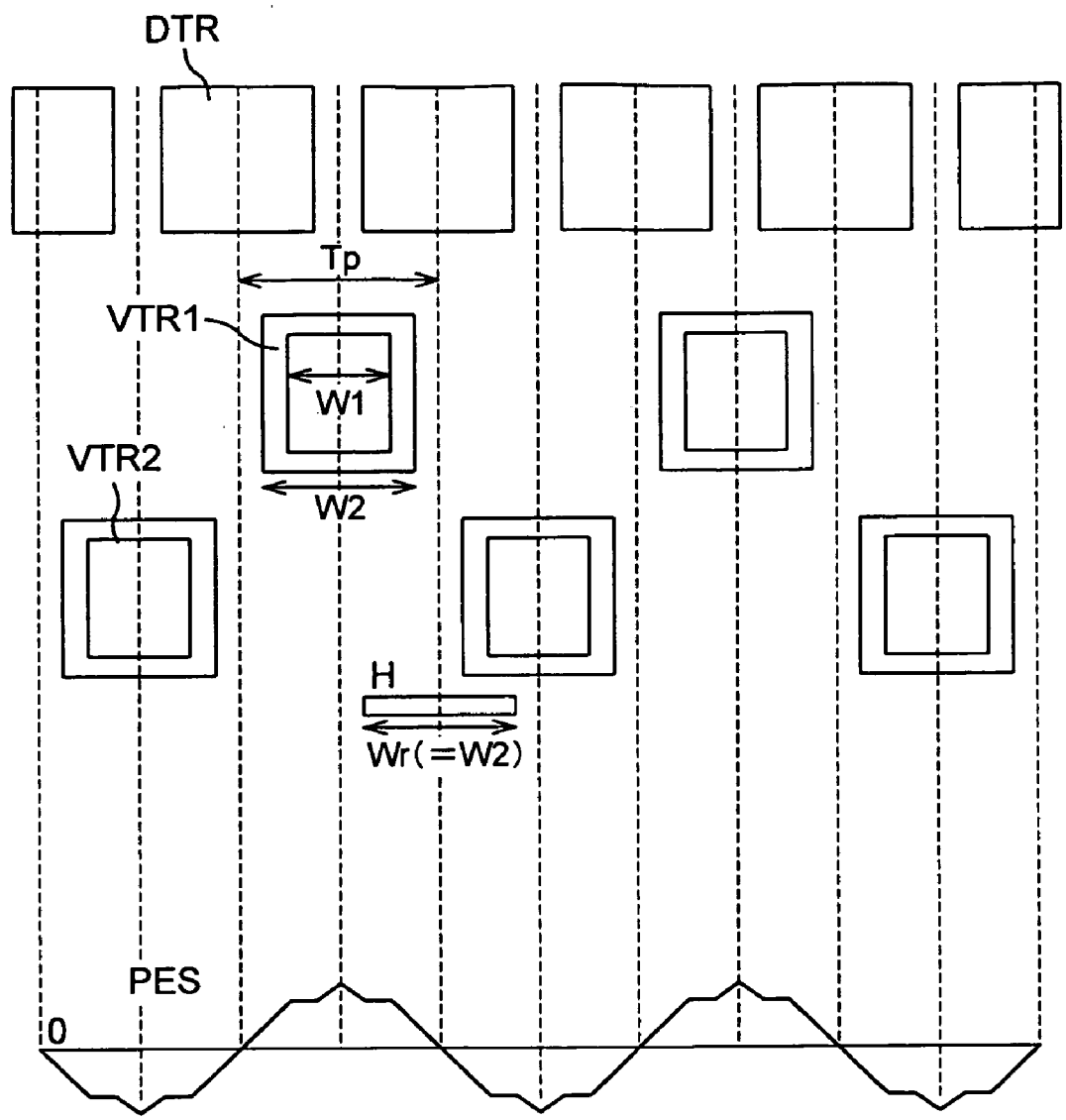
FIG. 29 is a diagram of a specific test mode, exemplarily showing a relationship of W1 and W2 of a burst pattern and a track pitch Tp with respect to a magnetic read width Wr and simultaneously showing a position error signal PES.
Figure 30:
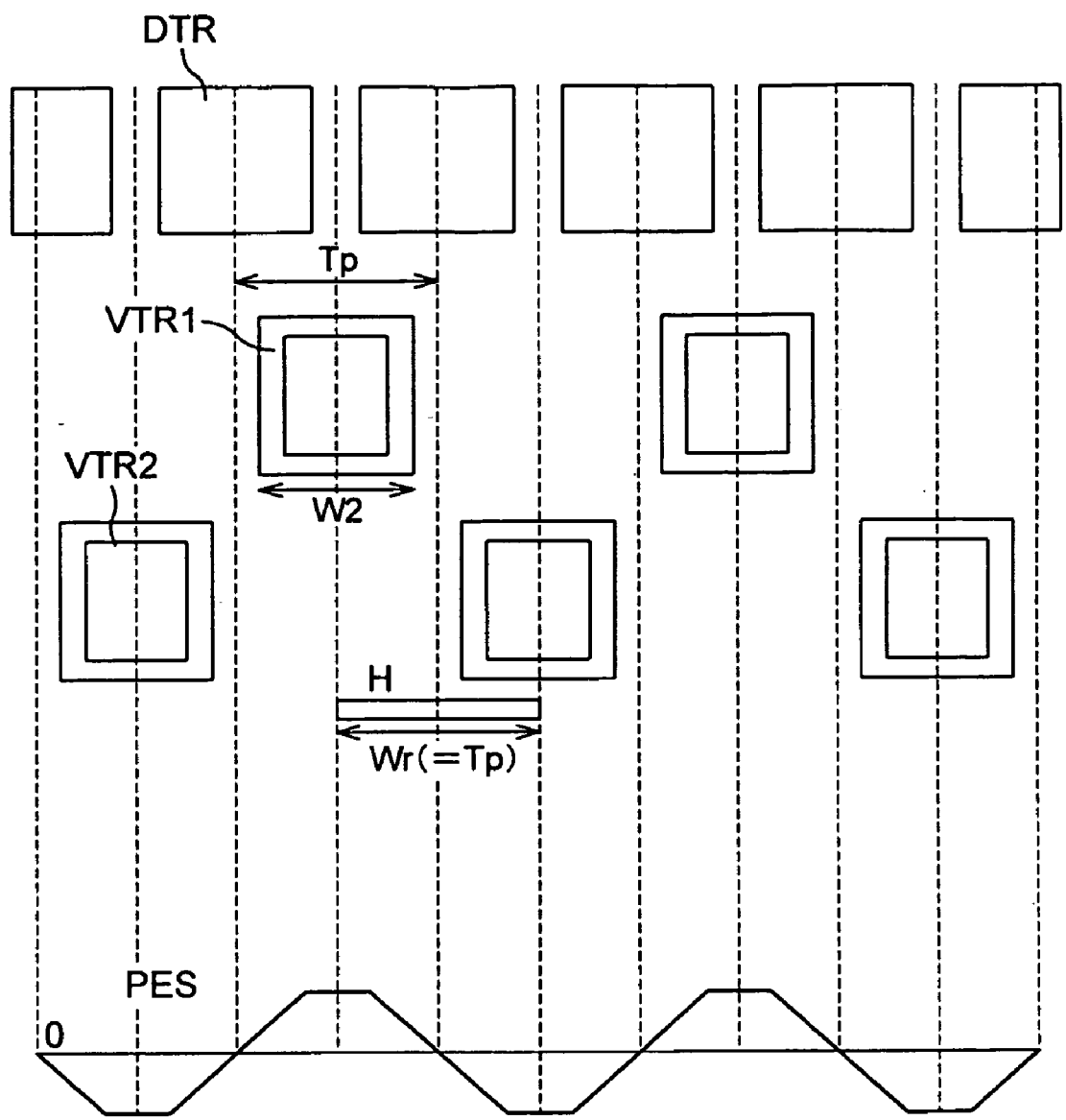
FIG. 30 is a diagram of a specific test mode, exemplarily showing a relationship of W1 and W2 of a burst pattern and a track pitch Tp with respect to a magnetic read width Wr and simultaneously showing a position error signal PES.
Figure 31:
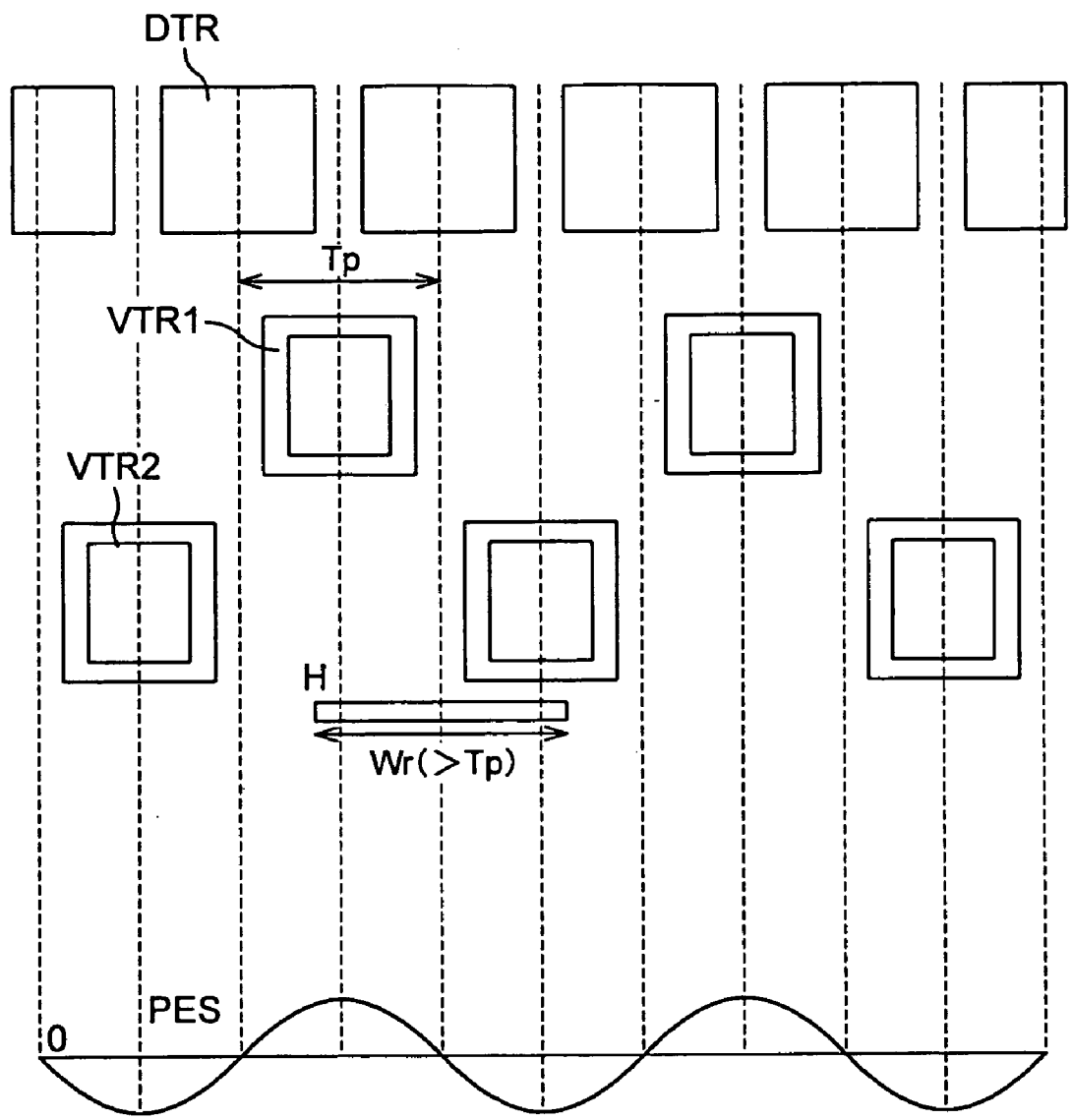
FIG. 31 is a diagram of a specific test mode, exemplarily showing a relationship of W1 and W2 of a burst pattern and a track pitch Tp with respect to a magnetic read width Wr and simultaneously showing a position error signal PES.
Figure 32:
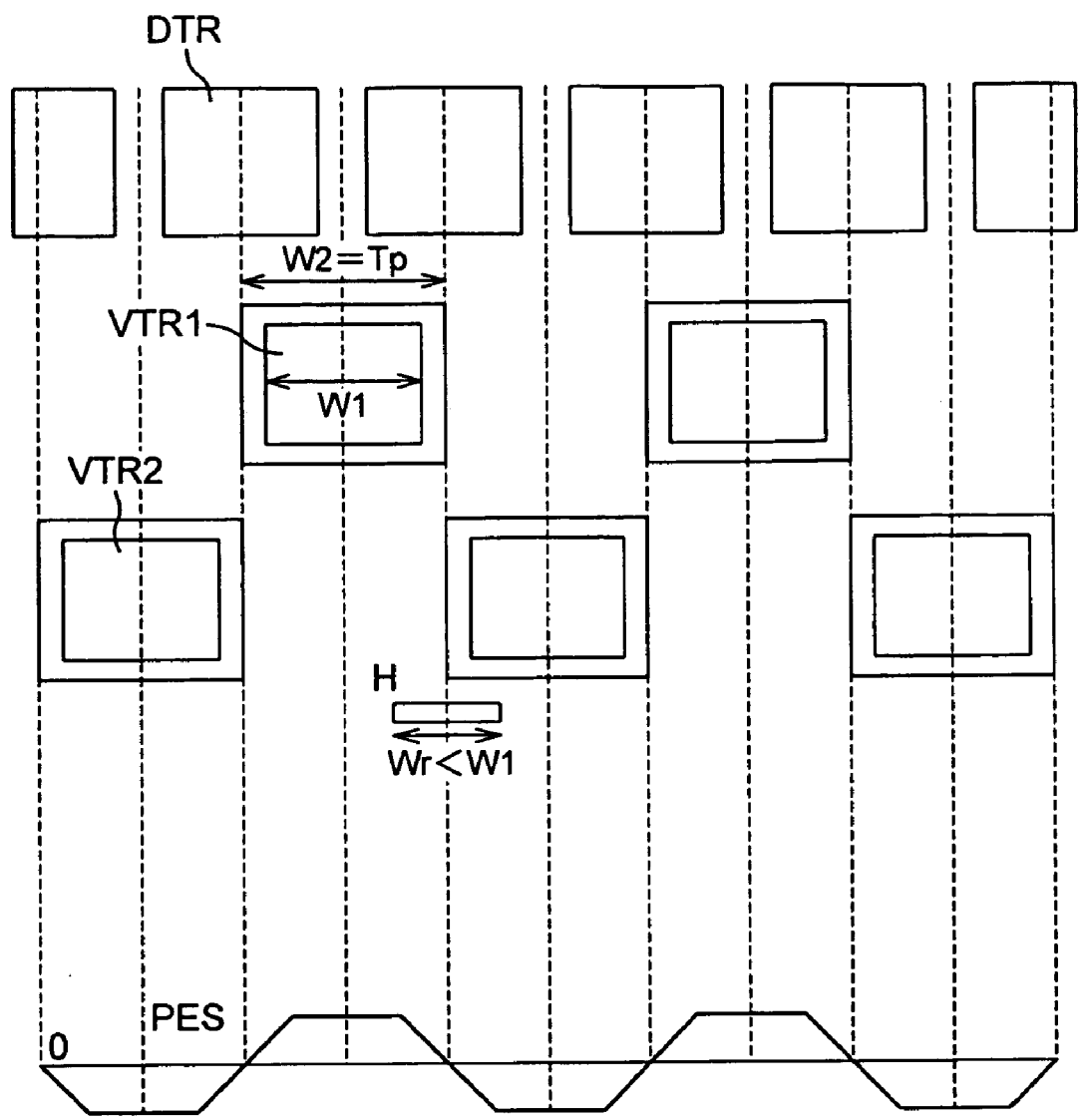
FIG. 32 is a diagram of a specific test mode, exemplarily showing a relationship of W1 and W2 of a burst pattern and a track pitch Tp with respect to a magnetic read width Wr and simultaneously showing a position error signal PES.
Figure 33:
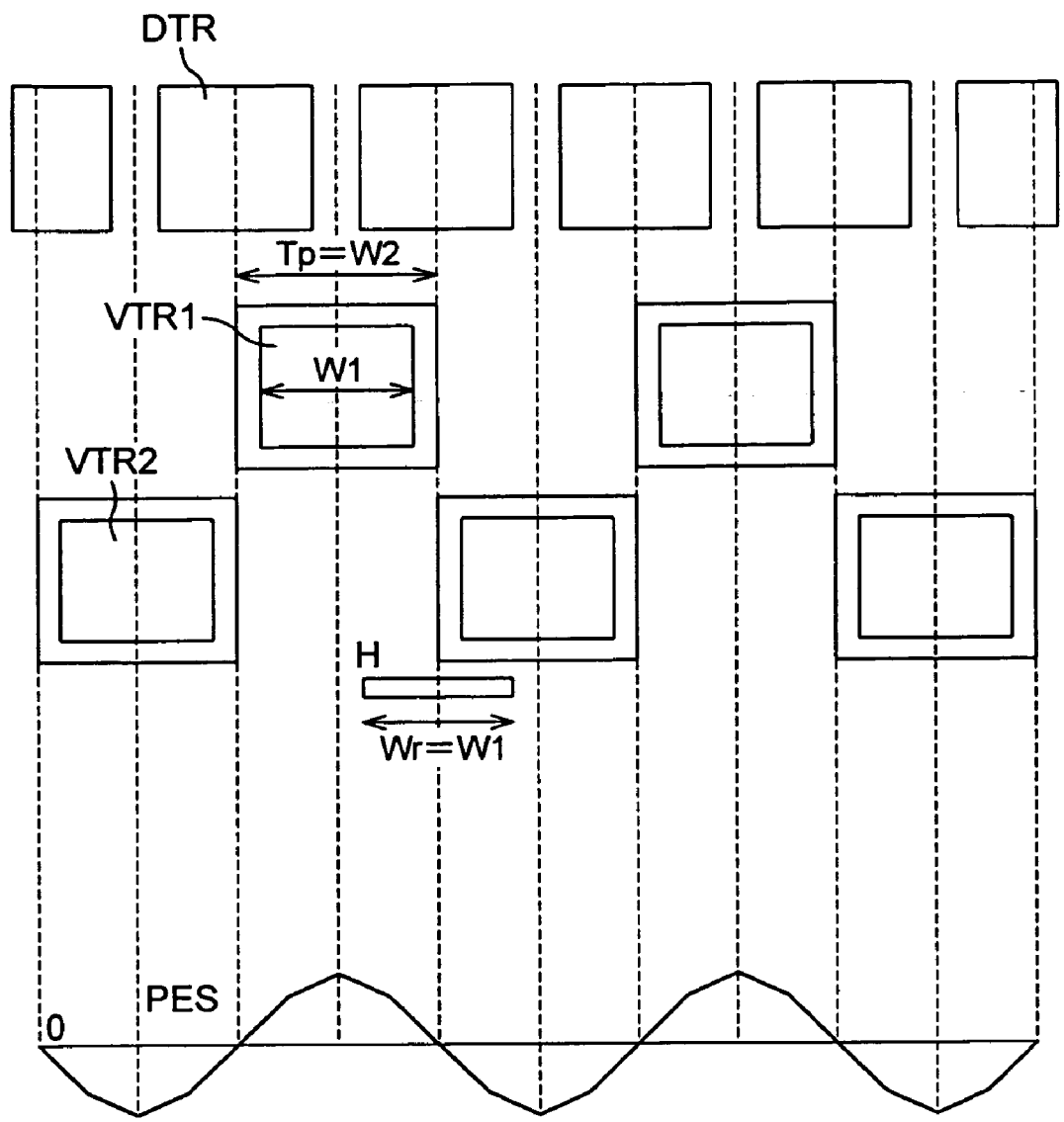
FIG. 33 is a diagram of a specific test mode, exemplarily showing a relationship of W1 and W2 of a burst pattern and a track pitch Tp with respect to a magnetic read width Wr and simultaneously showing a position error signal PES.
Figure 34:
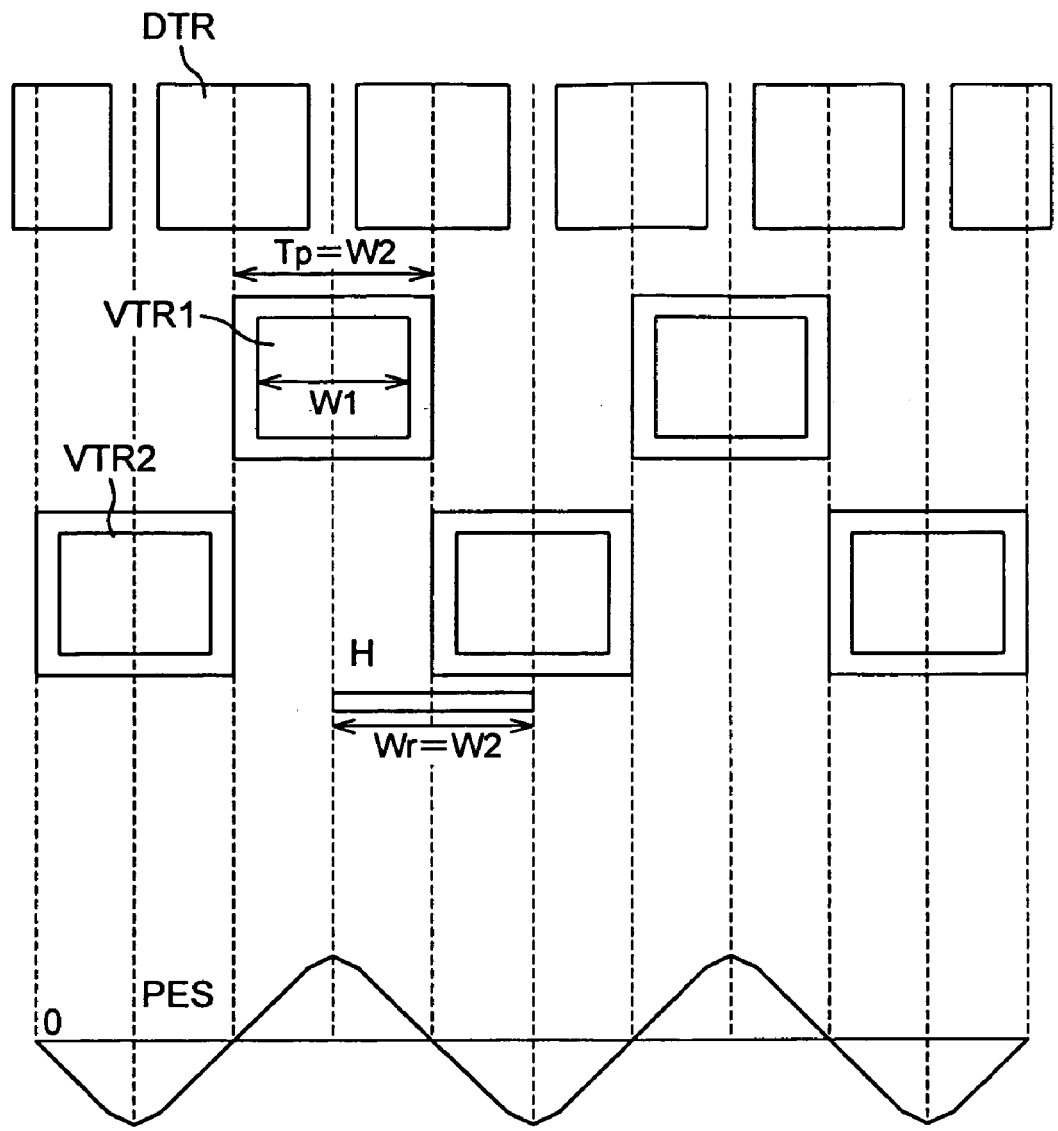
FIG. 34 is a diagram of a specific test mode, exemplarily showing a relationship of W1 and W2 of a burst pattern and a track pitch Tp with respect to a magnetic read width Wr and simultaneously showing a position error signal PES.
Figure 35:
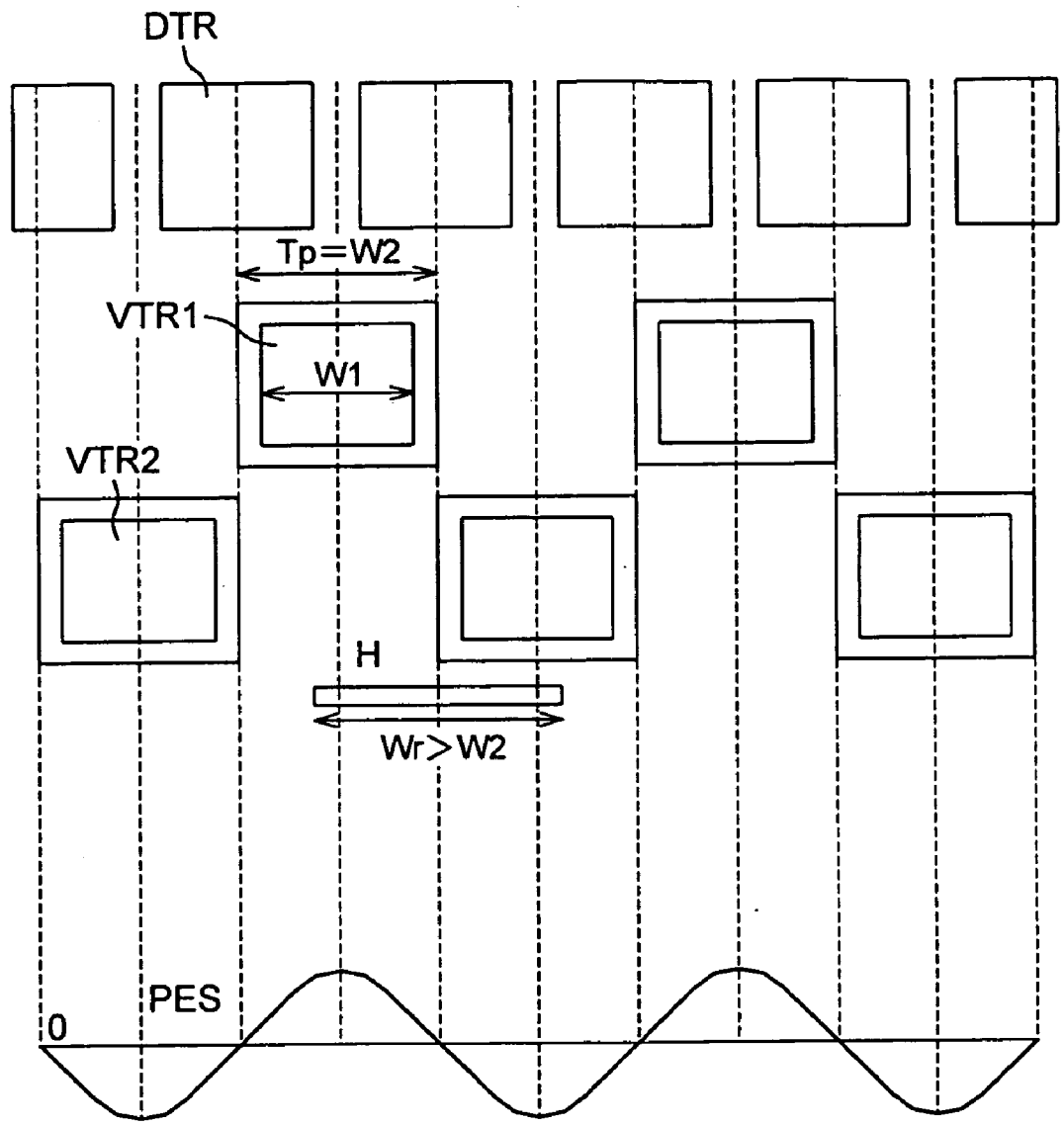
FIG. 35 is a diagram of a specific test mode, exemplarily showing a relationship of W1 and W2 of a burst pattern and a track pitch Tp with respect to a magnetic read width Wr and simultaneously showing a position error signal PES.
Figure 36:
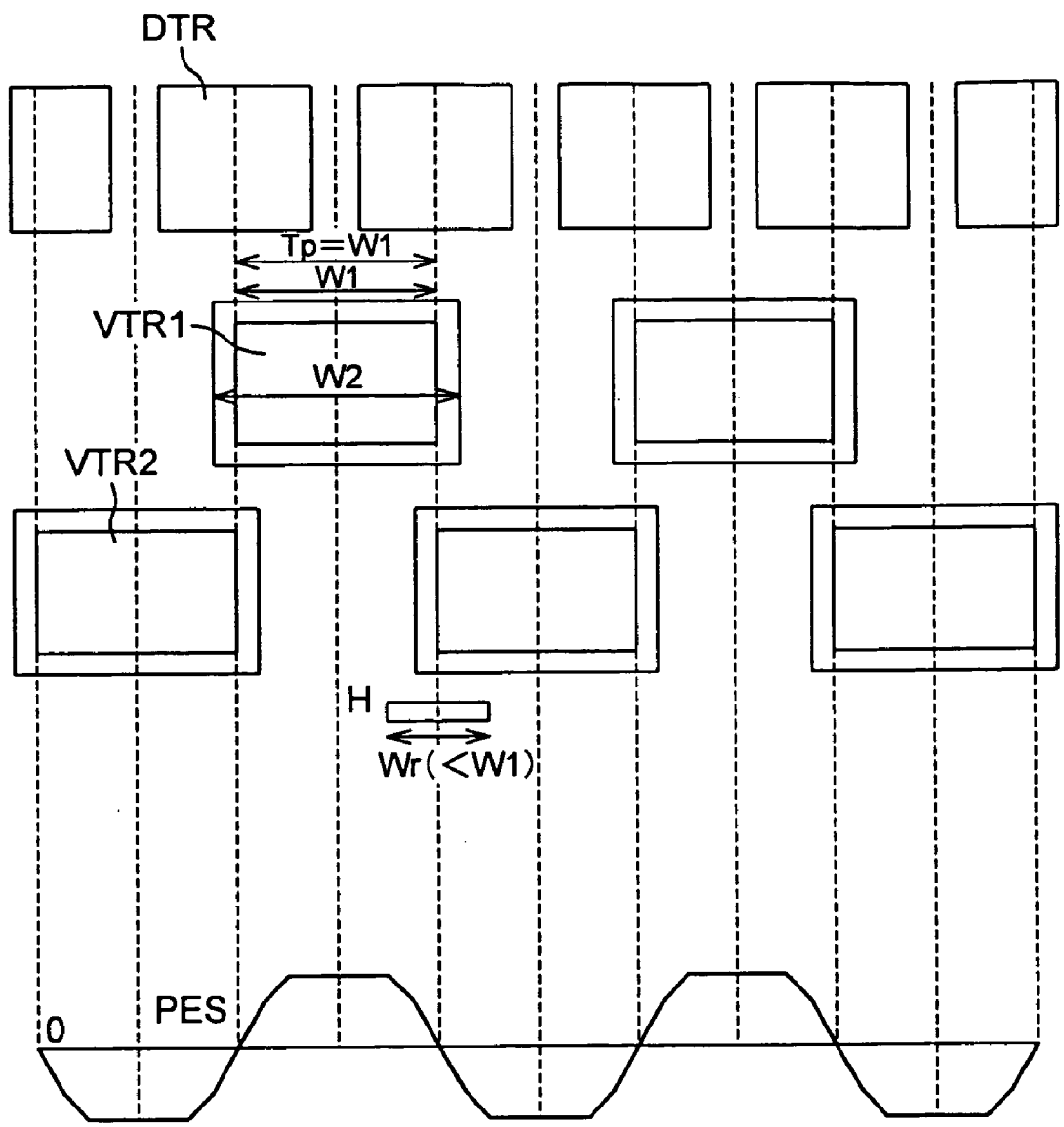
FIG. 36 is a diagram of a specific test mode, exemplarily showing a relationship of W1 and W2 of a burst pattern and a track pitch Tp with respect to a magnetic read width Wr and simultaneously showing a position error signal PES.
Figure 37:
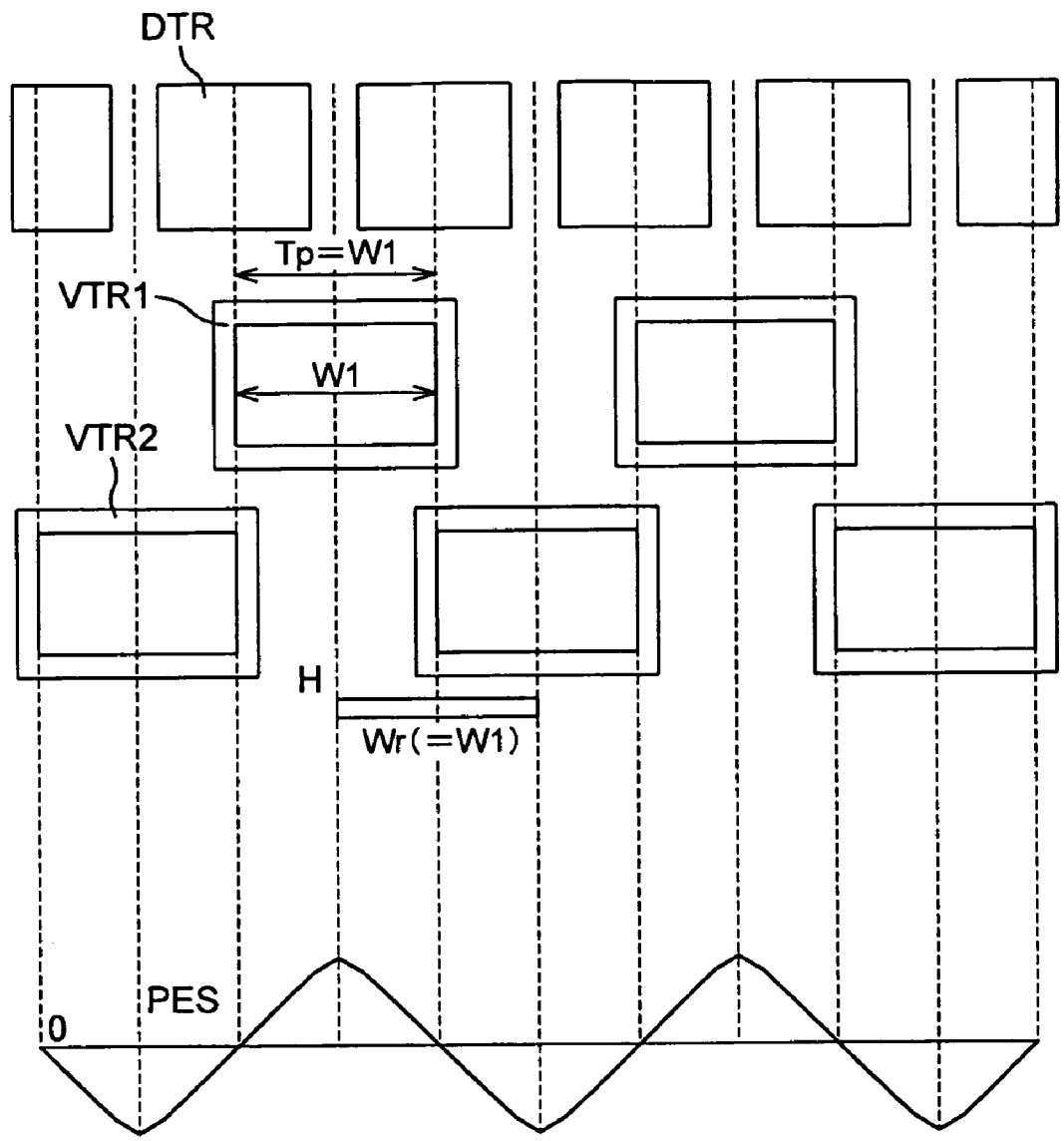
FIG. 37 is a diagram of a specific test mode, exemplarily showing a relationship of W1 and W2 of a burst pattern and a track pitch Tp with respect to a magnetic read width Wr and simultaneously showing a position error signal PES.
Figure 38:
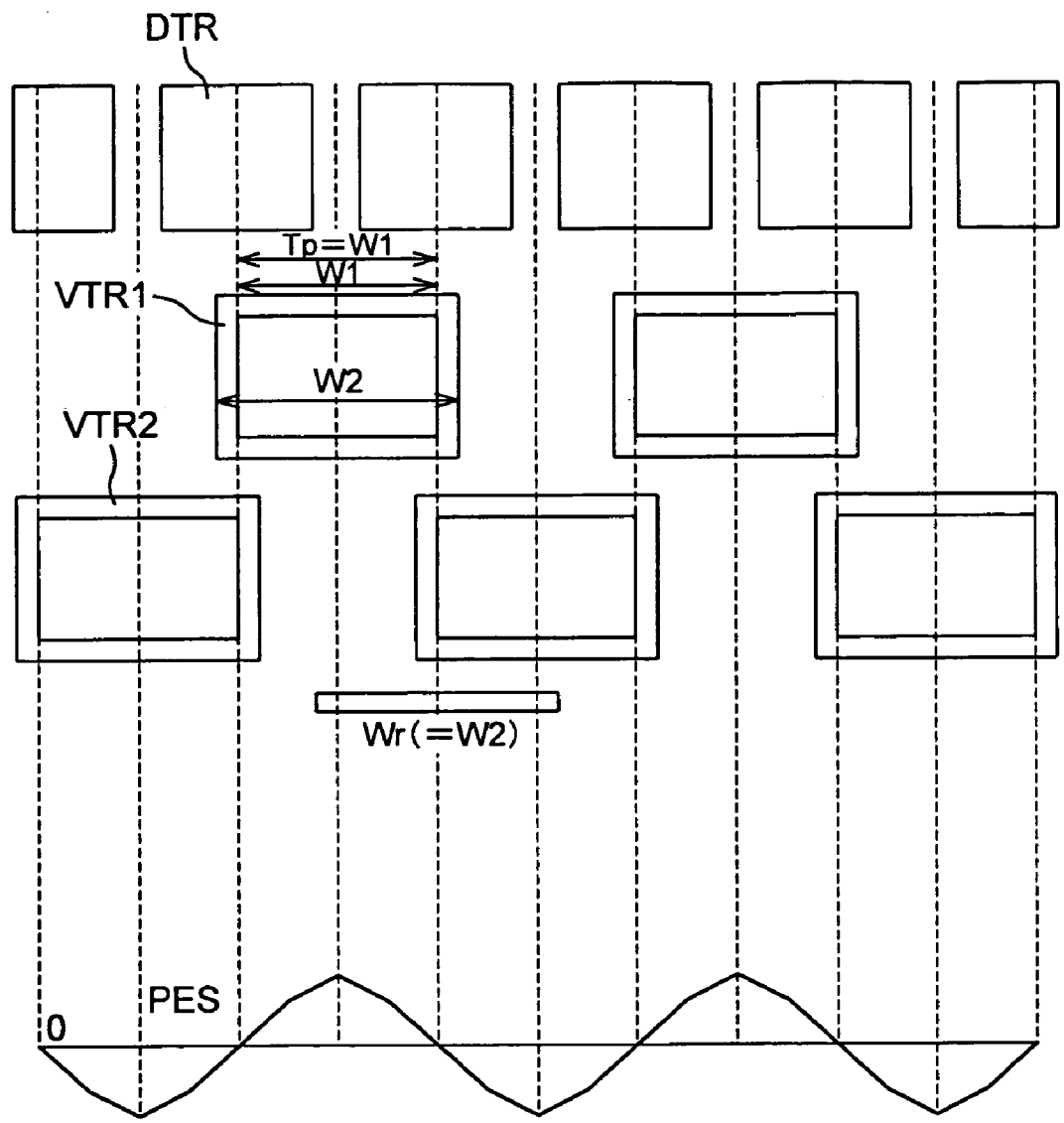
FIG. 38 is a diagram of a specific test mode, exemplarily showing a relationship of W1 and W2 of a burst pattern and a track pitch Tp with respect to a magnetic read width Wr and simultaneously showing a position error signal PES.
Figure 39:
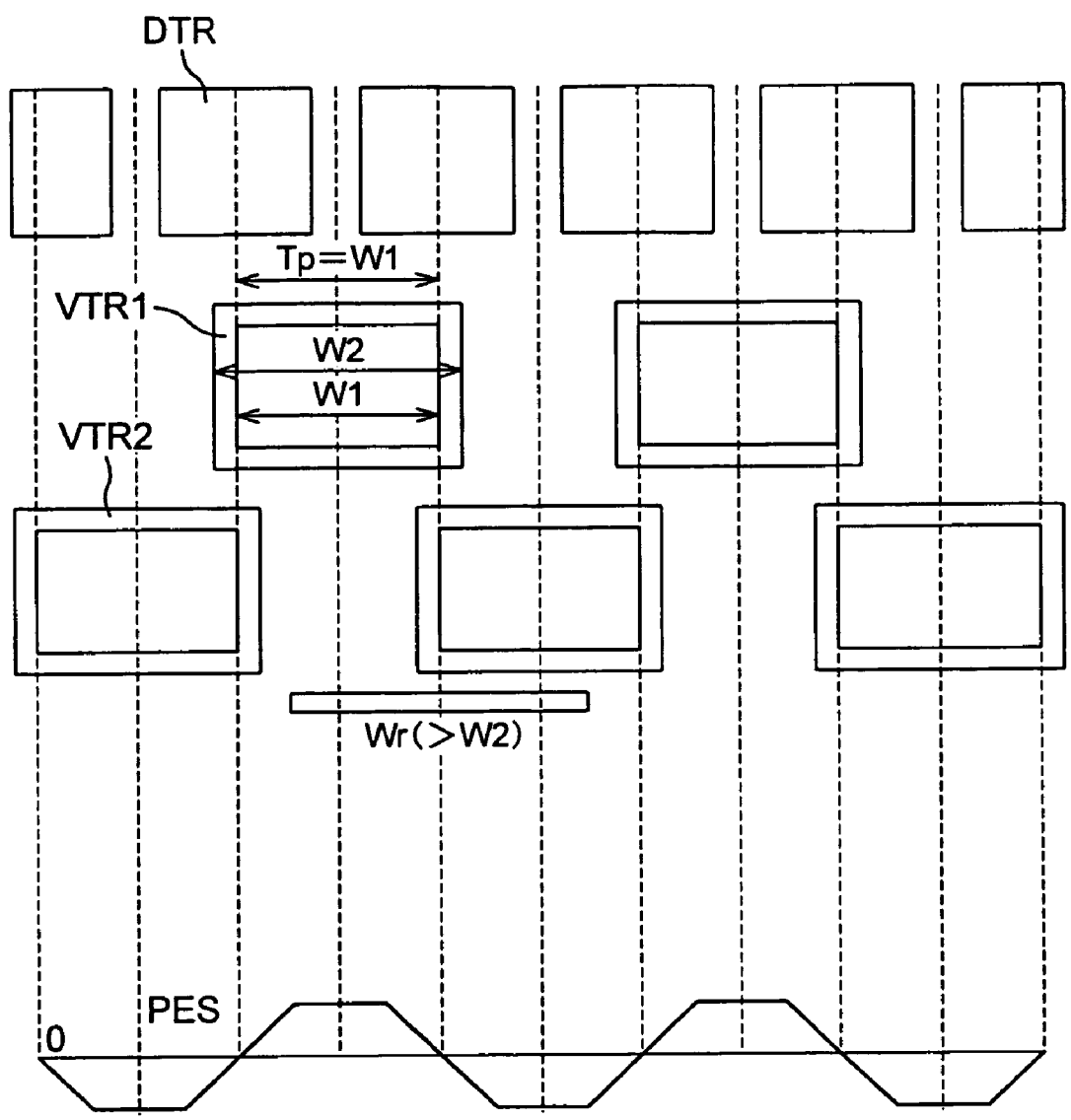
FIG. 39 is a diagram of a specific test mode, exemplarily showing a relationship of W1 and W2 of a burst pattern and a track pitch Tp with respect to a magnetic read width Wr and simultaneously showing a position error signal PES.
Figure 40:
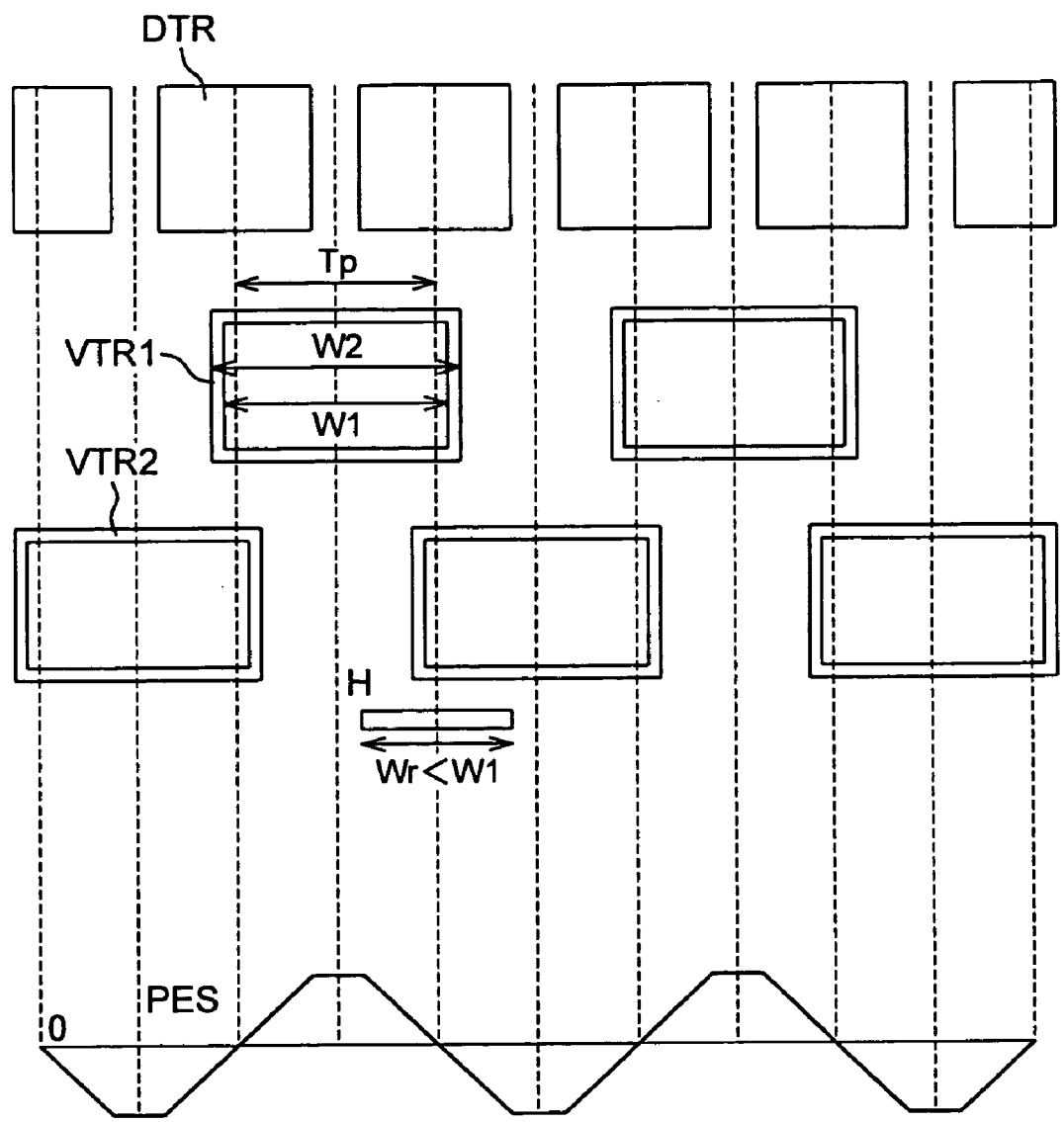
FIG. 40 is a diagram of a specific test mode, exemplarily showing a relationship of W1 and W2 of a burst pattern and a track pitch Tp with respect to a magnetic read width Wr and simultaneously showing a position error signal PES.
Figure 41:
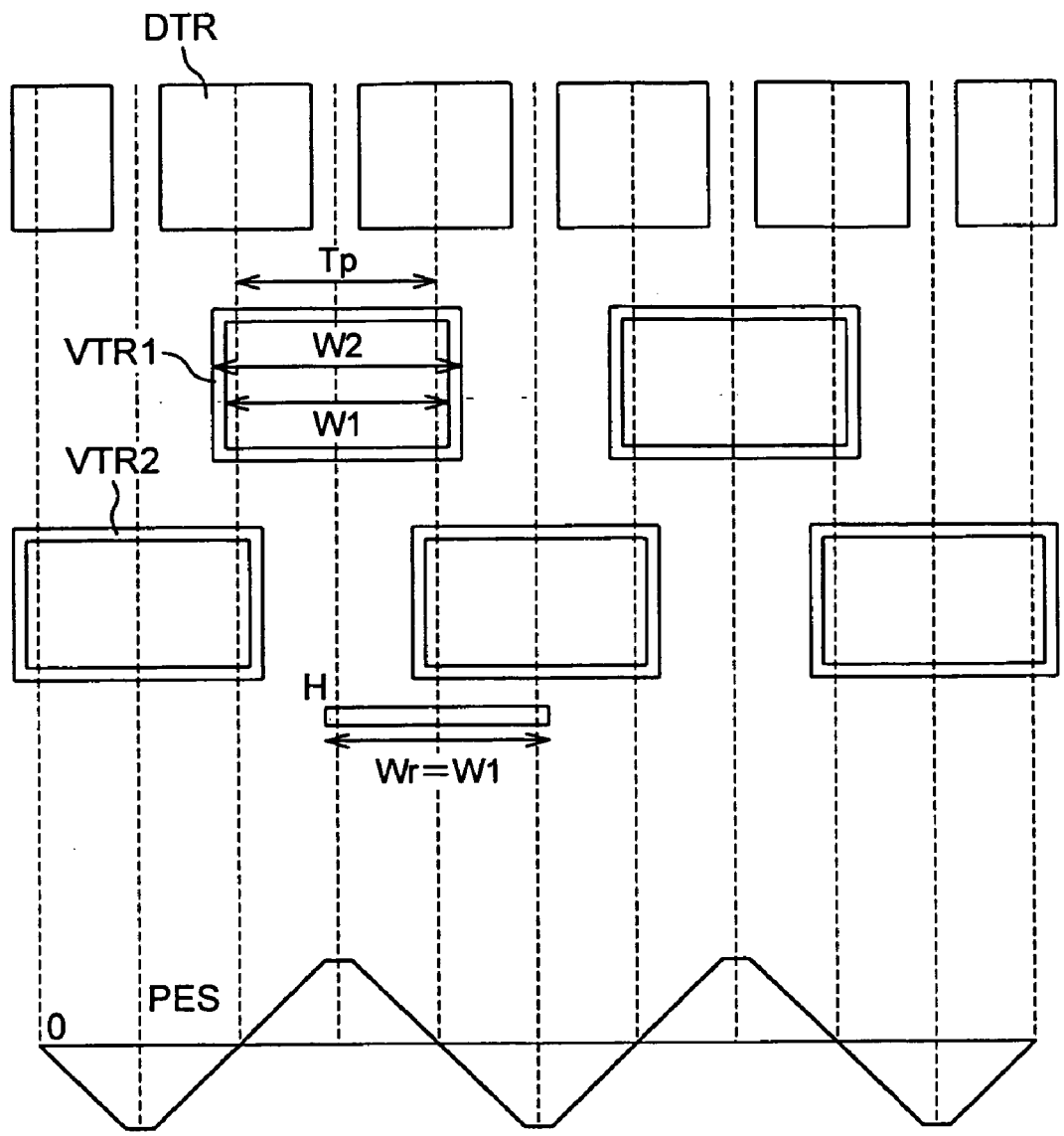
FIG. 41 is a diagram of a specific test mode, exemplarily showing a relationship of W1 and W2 of a burst pattern and a track pitch Tp with respect to a magnetic read width Wr and simultaneously showing a position error signal PES.
Figure 42:
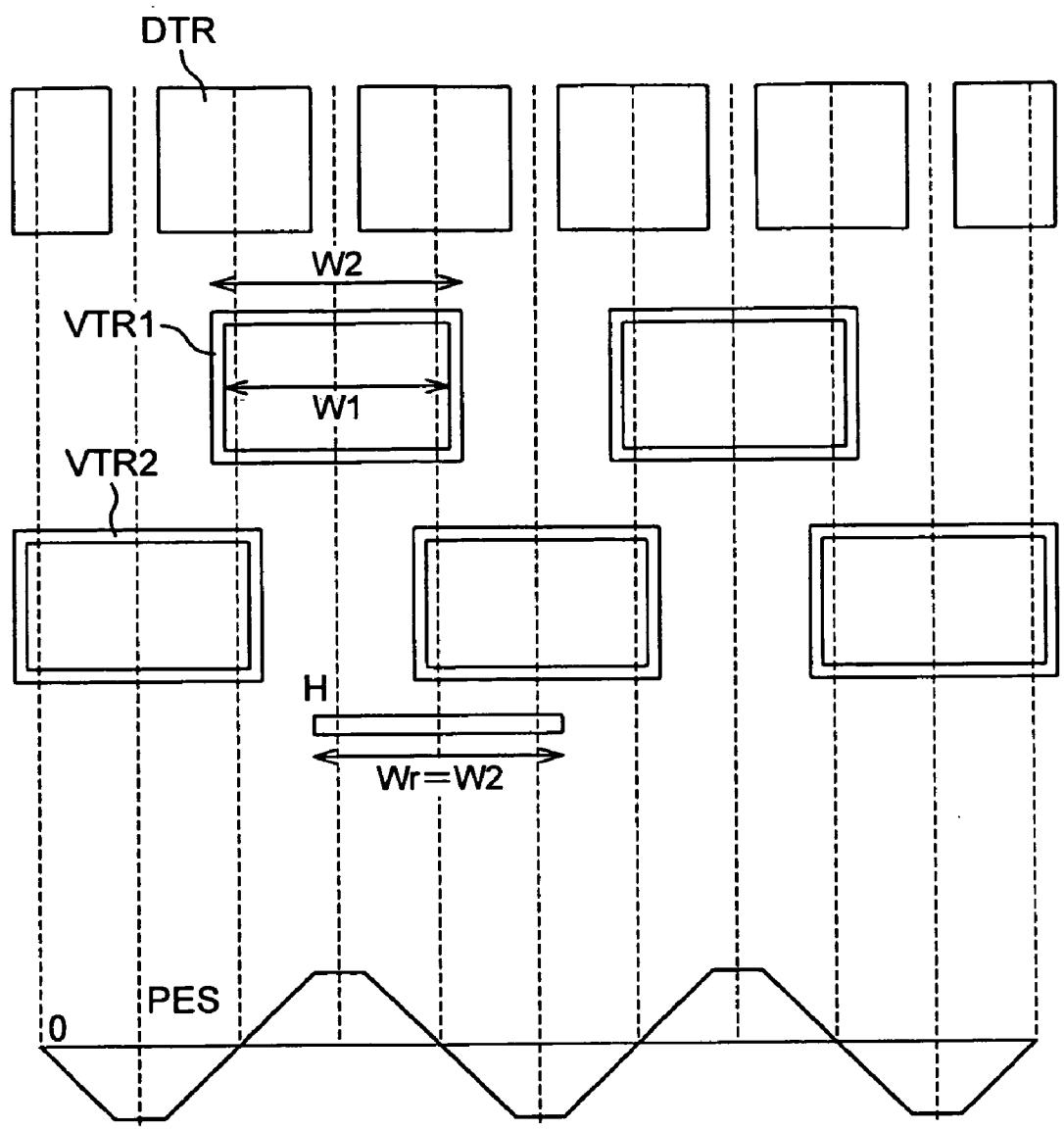
FIG. 42 is a diagram of a specific test mode, exemplarily showing a relationship of W1 and W2 of a burst pattern and a track pitch Tp with respect to a magnetic read width Wr and simultaneously showing a position error signal PES.
Figure 43:
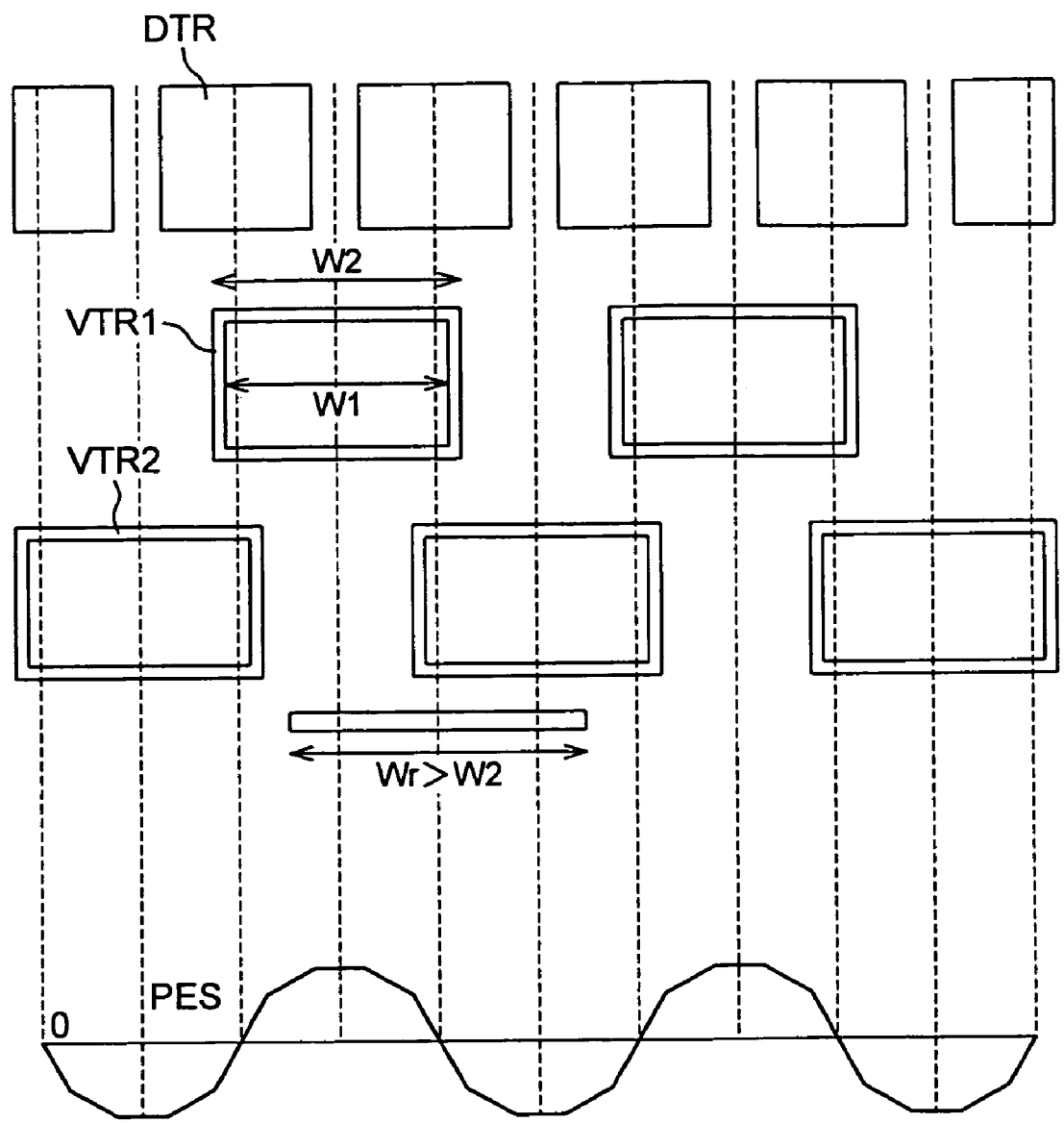
FIG. 43 is a diagram of a specific test mode, exemplarily showing a relationship of W1 and W2 of a burst pattern and a track pitch Tp with respect to a magnetic read width Wr and simultaneously showing a position error signal PES.

| Embodiment | Relation between Tp and W1 or W2 | Relation between Wr and W1, W2, or Tp | Usable Level | Linearity of PES | Corresponding Figure |
|---|---|---|---|---|---|
| II-1 | W2 < Tp | Wr = W1 | No(X) | Linearity Degraded | FIG. 28 |
| | | Wr = W2 | No(X) | Dead Zone Generated and Linearity Degraded | FIG. 29 |
| | | Wr = Tp | No(X) | Dead Zone Generated | FIG. 30 |
| | | Wr > Tp | No(X) | Linearity Degraded | FIG. 31 |
| II-2 | W2 = Tp | Wr < W1 | No(X) | Dead Zone Generated | FIG. 32 |
| | | Wr = W1 | Yes(O) | Linearity on Usable Level | FIG. 33 |
| | | Wr = W2 | Yes(O) | Linearity on Usable Level | FIG. 34 |
| | | Wr > W2 | No(X) | Dead Zone Generated | FIG. 35 |
| II-3 | W1 = Tp | Wr < W1 | No(X) | Dead Zone Generated | FIG. 36 |
| | | Wr = W1 | Yes(O) | Linearity on Usable Level | FIG. 37 |
| | | Wr = W2 | Yes(O) | Linearity on Usable Level | FIG. 38 |
| | | Wr > W2 | No(X) | Dead Zone Generated | FIG. 39 |
| II-4 | W1 > Tp | Wr < W1 | No(X) | Dead Zone Generated | FIG. 40 |
| | | Wr = W1 | No(X) | Dead Zone Generated | FIG. 41 |
| | | Wr = W2 | No(X) | Dead Zone Generated | FIG. 42 |
| | | Wr > W2 | No(X) | Dead Zone Generated | FIG. 43 |

(1) In Embodiment II-1 shown in Table 2, an examination was made as to how the position error signal PES changed when a relationship of W1 and W2 of the burst pattern and the track pitch Tp with respect to the magnetic read width Wr was changed under the condition of Tp>W2. FIGS. 28 to 31 correspond to the cases, respectively.

As understood also from the description about the structure of the magnetic recording medium in Test Examples 2, only the first burst tracks (VTRs1) and the second burst tracks (VTRs2) were disposed relative to the pattern of the data tracks (DTRs) and a difference between outputs from VTR1 and VTR2 relative to the respective positions of the magnetic head is given as a value of the PES signal in each of the figures. As described before, each burst track actually includes a plurality of burst patterns.

The PES signal preferably has the linearity relative to the displacement of the magnetic head. However, the PES signal exhibits a sinusoidal response in FIGS. 28 to 31 and thus its linearity is degraded. Further, in FIGS. 29 and 30, dead zones are generated where the PES value does not change relative to the displacement of the magnetic head. In any of the cases in Embodiment II-1, the dead zones are generated in the PES signal or the linearity of the PES signal is insufficient relative to the position change of the magnetic head. Consequently, in the arrangement of only the first burst tracks (VTRs1) and the second burst tracks (VTRs2) under the condition of W2<Tp, an excellent position error signal cannot be obtained with respect to any magnetic read width Wr.

(2) In Embodiment II-2 shown in Table 2, an examination was made as to how the position error signal PES changed when a relationship of W1 and W2 of the burst pattern and the track pitch Tp with respect to the magnetic read width Wr was changed under the condition of W2=Tp. FIGS. 32 to 35 correspond to the cases, respectively.

As seen from these figures, although not having the so-called geometrically perfect linearity, the linearity is on a usable level and is thus allowable as the PES signal in the range of "W2=Tp and W2≧Wr≧W1" because of the presence of a guard band of the discrete track.

(3) In Embodiment II-3 shown in Table 2, an examination was made as to how the position error signal PES changed when a relationship of W1 and W2 of the burst pattern and the track pitch Tp with respect to the magnetic read width Wr was changed under the condition of W1=Tp. FIGS. 36 to 39 correspond to the cases, respectively.

As seen from these figures, although not having the so-called geometrically perfect linearity, the linearity is on a usable level and is thus allowable as the PES signal in the range of "W1=Tp and W2≧Wr≧W1" because of the presence of a guard band of the discrete track.

(4) In Embodiment II-4 shown in Table 2, an examination was made as to how the position error signal PES changed when a relationship of W1 and W2 of the burst pattern and the track pitch Tp with respect to the magnetic read width Wr was changed under the condition of W1>Tp. FIGS. 40 to 43 correspond to the cases, respectively.

Dead zones are generated under any condition in Embodiment II-4. Consequently, under the condition of W1>Tp, an excellent position error signal cannot be obtained with respect to any magnetic read width Wr.

According to consideration of the test results obtained under the conditions of Embodiments II-1 to II-4, respectively, in the arrangement of only the first burst tracks (VTRs1) and the second burst tracks (VTRs2), the excellent tracking property can be obtained when the convex-portion magnetic recording layer having a burst signal for tracking recorded therein satisfies a relationship of "W2≧Tp≧W1 and W2≧Wr≧W1" where W1 represents the upper side corresponding to the surface (upper surface) of the convex-portion magnetic recording layer and W2 the lower side corresponding to the lower surface of the convex-portion magnetic recording layer in the trapezoidal shape in the track width direction, Tp represents the data track pitch, and Wr represents the read width of the magnetic head.

[III] TEST EXAMPLES 3

Tests were performed with respect to dependency on the angle of the trapezoidal oblique surface of the truncated quadrangular pyramid shape. Specifically, with respect to the lower-limit condition of Wr=W1/2 (FIG. 18) in Embodiment I-3 in Table 1, the dependency on the angle of the trapezoidal oblique surface of the truncated quadrangular pyramid shaped pattern was examined. It can be said that the condition of Wr=W1/2 (FIG. 18) in Embodiment I-3 is the severest for achieving the linearity.

Table 3 below shows results of the tests carried out for examining the dependency on the angle of the trapezoidal oblique surface of the truncated quadrangular pyramid shaped pattern. FIGS. 44 to 48 show PES signals obtained when the angle θ of the oblique surface of the pattern was set to 21°, 31°, 38.7°, 50°, and 85°. In Table 3, "O" is assigned when the usable level is satisfied in terms of linearity, while "X" is assigned when use is difficult in terms of linearity.

TABLE 3

Figure 44:
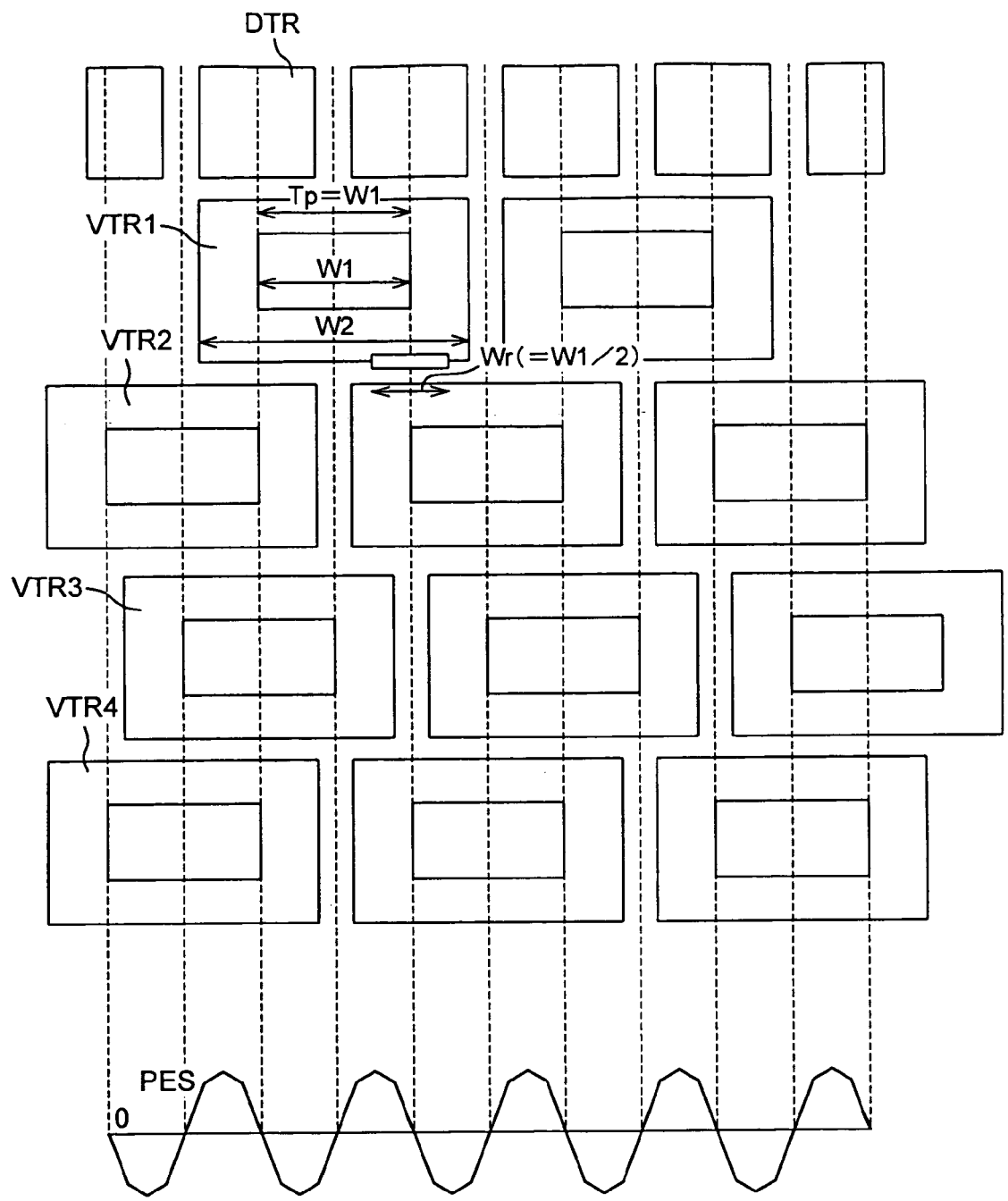
FIG. 44 is a diagram of a test mode carried out for examining dependency on an angle of a trapezoidal oblique surface of a pattern having a truncated quadrangular pyramid shape.
Figure 45:
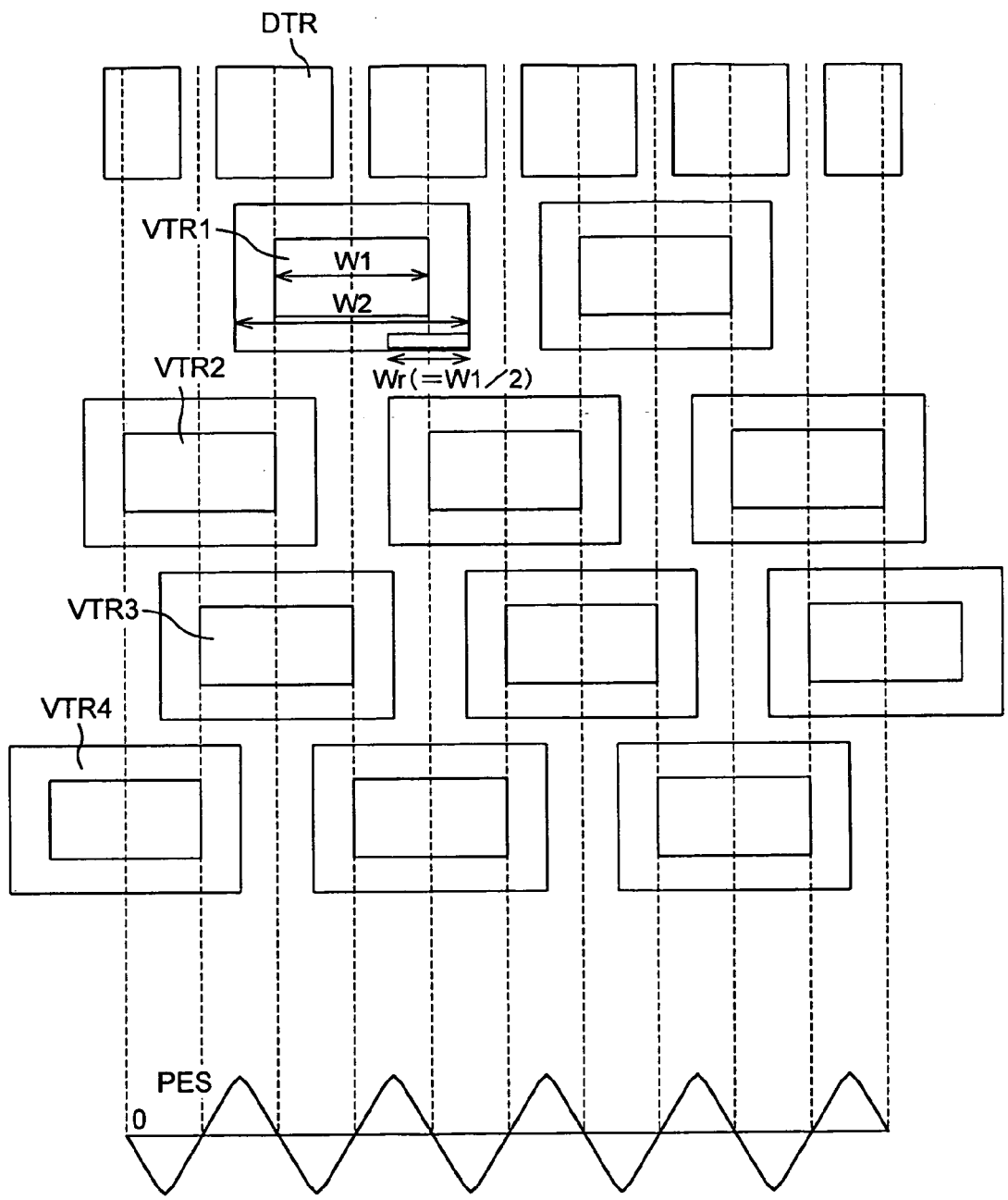
FIG. 45 is a diagram of a test mode carried out for examining dependency on an angle of a trapezoidal oblique surface of a pattern having a truncated quadrangular pyramid shape.
Figure 46:
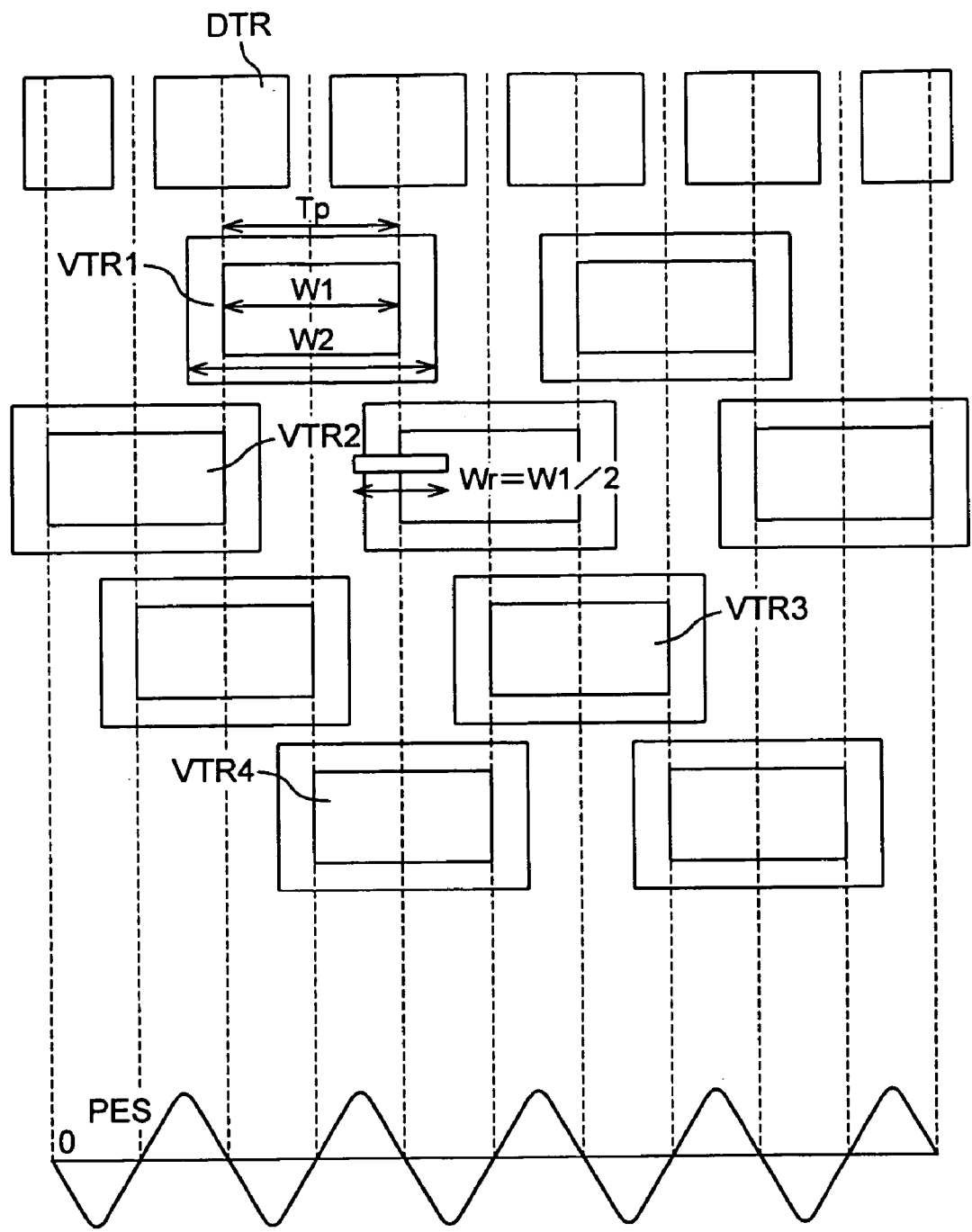
FIG. 46 is a diagram of a test mode carried out for examining dependency on an angle of a trapezoidal oblique surface of a pattern having a truncated quadrangular pyramid shape.
Figure 47:
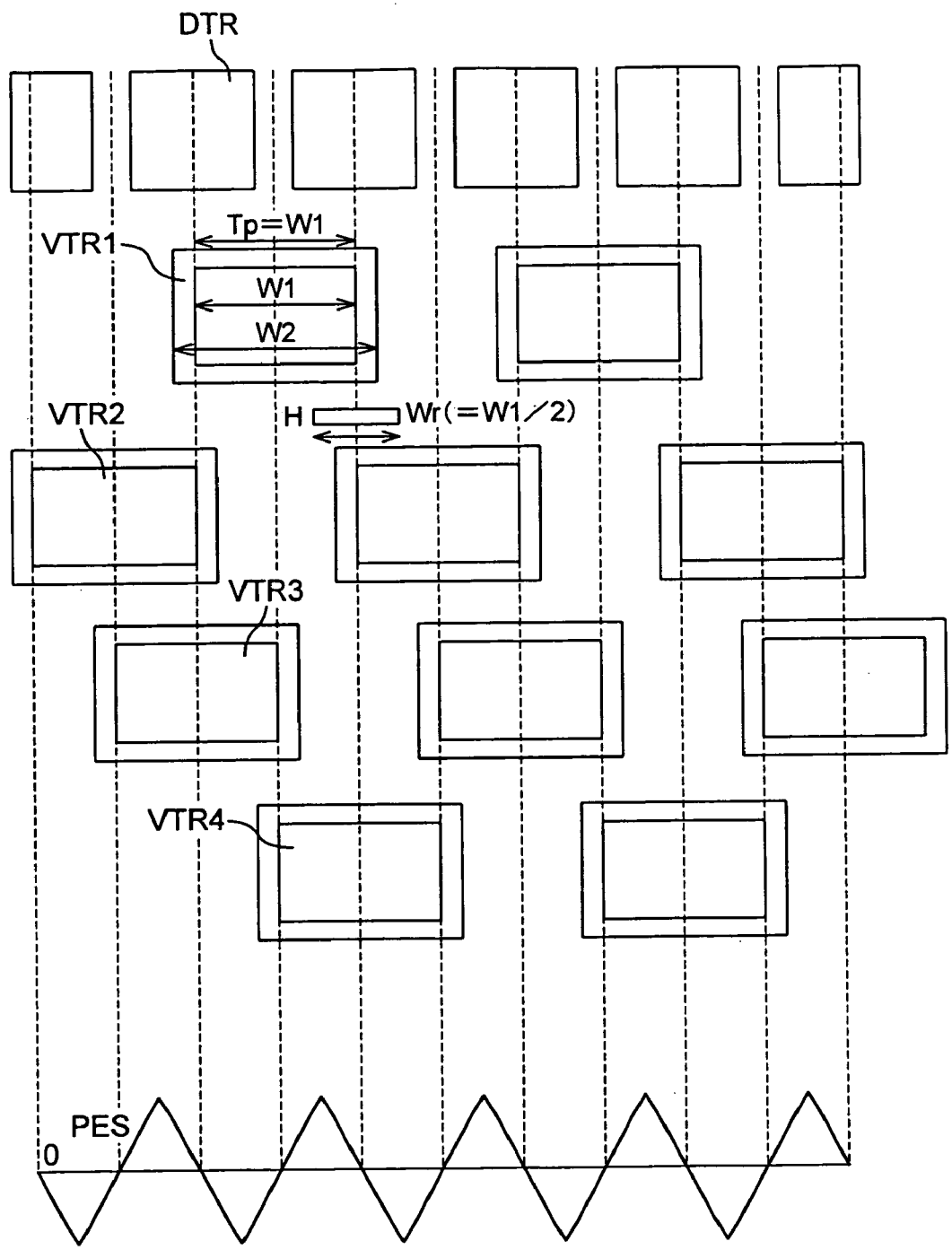
FIG. 47 is a diagram of a test mode carried out for examining dependency on an angle of a trapezoidal oblique surface of a pattern having a truncated quadrangular pyramid shape.
Figure 48:
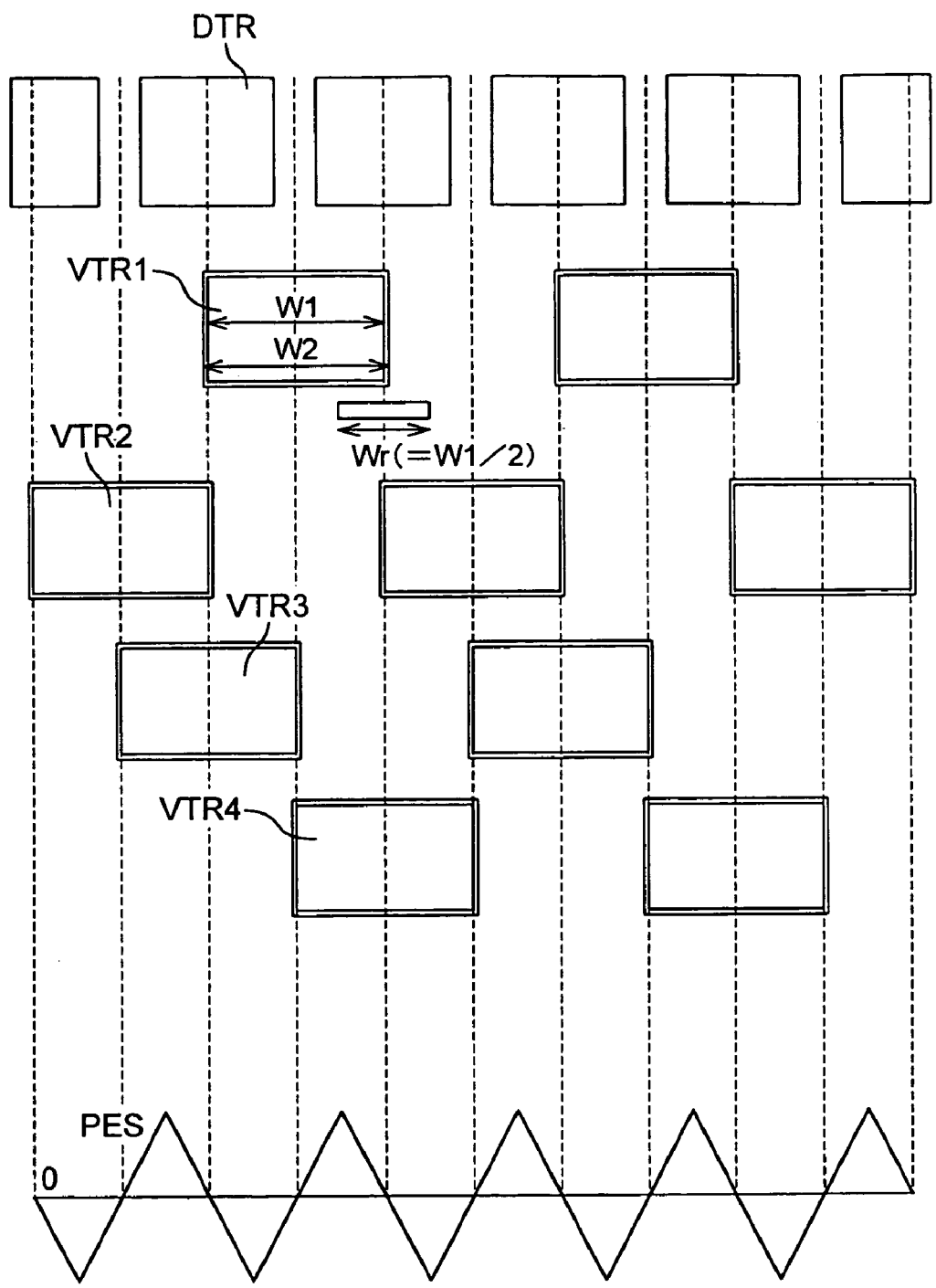
FIG. 48 is a diagram of a test mode carried out for examining dependency on an angle of a trapezoidal oblique surface of a pattern having a truncated quadrangular pyramid shape.

| Oblique Surface Angle | 21° | 31° | 38.7° | 50° | 85° |
|---|---|---|---|---|---|
| Usable Level | No(X) | No(X) | No(X) | Yes(O) | Yes(O) |
| Corresponding Figure | FIG. 44 | FIG. 45 | FIG. 46 | FIG. 47 | FIG. 48 |

From the results shown in Table 3, it is preferable that even in case of the severe condition, the angle between the oblique surface and the base of the truncated quadrangular pyramid shaped structure particularly in the track width direction be set to 50° or more in the truncated quadrangular pyramid shaped pattern. The maximum angle of the oblique surface is preferably 85° or less.

That is, when the height from W2 being the lower side to W1 being the upper side of the convex magnetic recording layer is given as h, tan 85°≧2 h/(W2−W1)≧tan 50°, preferably tan 80°≧2 h/(W2−W1)≧tan 70°.

It is considered that when the width of the burst pattern is equal to the track pitch Tp, the rectangular shape having an angle of 90° is preferable, which, however, is based on a premise that the dimensions completely coincide with each other. Practically, it is quite difficult to completely match the dimensions with each other and maintain the perfect dimensional accuracy. If the dimensions vary, a difference occurs in output in proportional to variation. Particularly, when the burst pattern width becomes smaller than the track pitch Tp both in the first burst track (VTR1) and the second burst track (VTR2), there arises a problem that a gap where no signal is produced at all is formed between both patterns to cause nonlinearity at this portion so that the magnitude of variation is emphasized. In contrast, in the truncated quadrangular pyramid shape of the present invention, when the oblique surfaces of the burst patterns overlap with each other in the arrangement of the first burst track (VTR1) and the second burst track (VTR2), there is no such possibility that no output is produced at all. Therefore, the dimensional accuracy is relaxed, thus being excellent in terms of practicality and processing.

The effects of the present invention are clear from the foregoing results. Specifically, the present invention is configured such that the burst pattern shape in the discrete medium is set to the shape (truncated quadrangular pyramid shape) having the substantially trapezoidal shapes in the track width direction and in the track circumferential direction, respectively, and the predetermined relationship is satisfied among W1, W2, Tp, and Wr where W1 represents the upper side corresponding to the surface (upper surface) of the convex magnetic recording layer and W2 the lower side corresponding to the lower surface of the convex magnetic recording layer in the trapezoidal shape in the track width direction, Tp represents the data track pitch of the data information recording portion, and Wr represents the read width of the magnetic head. Therefore, it is possible to provide the magnetic recording medium having the burst pattern shape that can allow a margin for the dimensional accuracy in processing to a certain degree to thereby reduce the production load and still can obtain the accurate position error signal, and further to provide the magnetic recording and reproducing apparatus using such a magnetic recording medium.

Note that even in the mode shown in FIG. 4 where part of the magnetic layer is left thin at the concave portions, since the remaining thin magnetic layer hardly affects the magnetic property, the present invention can be applied thereto by assuming that W2 represents a lower side corresponding to a lower surface of the convex magnetic recording layer ignoring the remaining thin part.

The magnetic recording apparatus of the present invention is particularly used as a component of a computer and can be utilized in the apparatus industry for information recording.

What is claimed is:

1. A magnetic recording and reproducing apparatus comprising a magnetic recording medium having a data information recording portion and a servo information portion for tracking, and a magnetic head for detecting servo information of said servo information portion and recording and reproducing data information on and from said data information recording portion, wherein
    said servo information portion is composed of a magnetic recording layer formed in a predetermined convex-concave pattern,
    said servo information portion comprises a burst portion where burst signals for tracking are recorded,
    said burst portion comprises a first burst, a second burst, a third burst, and a fourth burst each composed of a plurality of convex-portion magnetic recording layers where the burst signals are recorded,
    said first and second bursts are arranged such that the convex-portion magnetic recording layers are formed so as to have their center lines at positions that are offset from each other by one track pitch in a track width direction, while, said third and fourth bursts are arranged such that the convex-portion magnetic recording layers are formed so as to have their center lines at positions that are offset from the center lines of said first and second bursts by half the track pitch in the track width direction,
    each convex-portion magnetic recording layer of said convex-portion magnetic recording layers has substantially trapezoidal shapes in the track width direction and in a track circumferential direction, respectively, (truncated quadrangular pyramid shape) and
    a condition of $Tp \geq Wr > W2 > W1$ is satisfied where W1 represents an upper side corresponding to an upper surface of the convex-portion magnetic recording layer and W2 a lower side corresponding to a lower surface of the convex-portion magnetic recording layer in the trapezoidal shape in the track width direction, Tp represents a data track pitch of the data information recording portion, and Wr represents a read width of the magnetic head.

2. A magnetic recording and reproducing apparatus according to claim 1, wherein when the height from W2 being the lower side to W1 being the upper side of the convex-portion magnetic recording layer is given as h, a condition of $\tan 85° \geq 2h/(W2-W1) \geq \tan 50°$ is satisfied.

3. A magnetic recording and reproducing apparatus comprising a magnetic recording medium having a data information recording portion and a servo information portion for tracking, and a magnetic head for detecting servo information of said servo information portion and recording and reproducing data information on and from said data information recording portion, wherein
    said servo information portion is composed of a magnetic recording layer formed in a predetermined convex-concave pattern,
    said servo information portion comprises a burst portion where burst signals for tracking are recorded,
    said burst portion comprises a first burst, a second burst, a third burst, and a fourth burst each composed of a plurality of convex-portion magnetic recording layers where the burst signals are recorded,
    said first and second bursts are arranged such that the convex-portion magnetic recording layers are formed so as to have their center lines at positions that are offset from each other by one track pitch in a track width direction, while, said third and fourth bursts are arranged such that the convex-portion magnetic recording layers are formed so as to have their center lines at positions that are offset from the center lines of said first and second bursts by half the track pitch in the track width direction,
    each convex-portion magnetic recording layer of said convex-portion magnetic recording layers has substantially trapezoidal shapes in the track width direction and in a track circumferential direction, respectively, (truncated quadrangular pyramid shape) and
    a condition of $W2=Tp$ and $2W2-W1 \geq Wr \geq W1$ is satisfied where W1 represents an upper side corresponding to an upper surface of the convex-portion magnetic recording layer and W2 a lower side corresponding to a lower surface of the convex-portion magnetic recording layer in the trapezoidal shape in the track width direction, Tp represents a data track pitch of the data information recording portion, and Wr represents a read width of the magnetic head.

4. A magnetic recording and reproducing apparatus according to claim 3, wherein when the height from W2 being the lower side to W1 being the upper side of the convex-portion magnetic recording layer is given as h, a condition of $\tan 85° \geq 2h/(W2-W1) \geq \tan 50°$ is satisfied.

5. A magnetic recording and reproducing apparatus comprising a magnetic recording medium having a data information recording portion and a servo information portion for tracking, and a magnetic head for detecting servo information of said servo information portion and recording and reproducing data information on and from said data information recording portion, wherein
    said servo information portion is composed of a magnetic recording layer formed in a predetermined convex-concave pattern,
    said servo information portion comprises a burst portion where burst signals for tracking are recorded,
    said burst portion comprises a first burst, a second burst, a third burst, and a fourth burst each composed of a plurality of convex-portion magnetic recording layers where the burst signals are recorded, said first and second bursts are arranged such that the convex-portion magnetic recording layers are formed so as to have their center lines at positions that are offset from each other by one track pitch in a track width direction, while, said third and fourth bursts are arranged such that the convex-portion magnetic recording layers are formed so as to have their center lines at positions that are offset from the center lines of said first and second bursts by half the track pitch in the track width direction, each convex-portion magnetic recording layer of said convex-portion magnetic recording layers has substantially trapezoidal shapes in the track width direction and in a track-circumferential direction, respectively, (truncated quadrangular pyramid shape) and a condition of $W1=Tp$ and $2W2-W1 \geq Wr \geq W1/2$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, $Tp$ represents a data track pitch of the data information recording portion, and $Wr$ represents a read width of the magnetic head.

6. A magnetic recording and reproducing apparatus according to claim 5, wherein a condition of $W1=Tp$ and $2W2-W1 \geq Wr \geq W1$ is satisfied.

7. A magnetic recording and reproducing apparatus according to claim 5, wherein when the height from $W2$ being the lower side to $W1$ being the upper side of the convex-portion magnetic recording layer is given as $h$, a condition of $\tan 85° \geq 2h/(W2-W1) \geq \tan 50°$ is satisfied.

8. A magnetic recording and reproducing apparatus comprising a magnetic recording medium having a data information recording portion and a servo information portion for tracking, and a magnetic head for detecting servo information of said servo information portion and recording and reproducing data information on and from said data information recording portion, wherein said servo information portion is composed of a magnetic recording layer formed in a predetermined convex-concave pattern, said servo information portion comprises a burst portion where burst signals for tracking are recorded, said burst portion comprises a first burst, a second burst, a third burst, and a fourth burst each composed of a plurality of convex-portion magnetic recording layers where the burst signals are recorded, said first and second bursts are arranged such that the convex-portion magnetic recording layers are formed so as to have their center lines at positions that are offset from each other by one track pitch in a track width direction, while, said third and fourth bursts are arranged such that the convex-portion magnetic recording layers are formed so as to have their center lines at positions that are offset from the center lines of said first and second bursts by half the track pitch in the track width direction, each convex-portion magnetic recording layer of said convex-portion magnetic recording layers has substantially trapezoidal shapes in the track width direction and in a track circumferential direction, respectively, (truncated quadrangular pyramid shape) and a condition of $W1>Tp$ and $W2 \geq Wr \geq Tp$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, $Tp$ represents a data track pitch of the data information recording portion, and $Wr$ represents a read width of the magnetic head.

9. A magnetic recording and reproducing apparatus according to claim 8, wherein when the height from $W2$ being the lower side to $W1$ being the upper side of the convex-portion magnetic recording layer is given as $h$, a condition of $\tan 85° \geq 2h/(W2-W1) \geq \tan 50°$ is satisfied.

10. A magnetic recording and reproducing apparatus comprising a magnetic recording medium having a data information recording portion and a servo information portion for tracking, and a magnetic head for detecting servo information of said servo information portion and recording and reproducing data information on and from said data information recording portion, wherein said servo information portion is composed of a magnetic recording layer formed in a predetermined convex-concave pattern, said servo information portion comprises a burst portion where burst signals for tracking are recorded, said burst portion comprises a first burst and a second burst each composed of a plurality of convex-portion magnetic recording layers where the burst signals are recorded, said first and second bursts are arranged such that the convex-portion magnetic recording layers are formed so as to have their center lines at positions that are offset from each other by one track pitch in a track width direction, each convex-portion magnetic recording layer of said convex-portion magnetic recording layers has substantially trapezoidal shapes in the track width direction and in a track circumferential direction, respectively, (truncated quadrangular pyramid shape) and a condition of $W2 \geq Tp \geq W1$ and $W2 \geq Wr \geq W1$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, $Tp$ represents a data track pitch of the data information recording portion, and $Wr$ represents a read width of the magnetic head.

11. A magnetic recording and reproducing apparatus according to claim 10, wherein when the height from $W2$ being the lower side to $W1$ being the upper side of the convex-portion magnetic recording layer is given as $h$, a condition of $\tan 85° \geq 2h/(W2-W1) \geq \tan 50°$ is satisfied.

12. A magnetic recording medium having a data information recording portion and a servo information portion for tracking, wherein said servo information portion is composed of a magnetic recording layer formed in a predetermined convex-concave pattern, said servo information portion comprises a burst portion where burst signals for tracking are recorded, said burst portion comprises a first burst, a second burst, a third burst, and a fourth burst each composed of a plurality of convex-portion magnetic recording layers where the burst signals are recorded, said first and second bursts are arranged such that the convex-portion magnetic recording layers are formed so as to have their center lines at positions that are offset from each other by one track pitch in a track width direction, while, said third and fourth bursts are arranged such that the convex-portion magnetic recording layers are formed so as to have their center lines at positions that are offset from the center lines of said first and second bursts by half the track pitch in the track width direction, each convex-portion magnetic recording layer of said convex-portion magnetic recording layers has substantially trapezoidal shapes in the track width direction and in a track circumferential direction, respectively, (truncated quadrangular pyramid shape) and a condition of $Tp>W2>W1$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, and $Tp$ represents a data track pitch of the data information recording portion.

13. A magnetic recording medium according to claim 12, wherein when a read width of a magnetic head used as a recording and reproducing head for the magnetic recording medium is given as Wr, a condition of $Tp \geq Wr > W2 > W1$ is satisfied.

14. A magnetic recording medium according to claim 13, wherein when the height from $W2$ being the lower side to $W1$ being the upper side of the convex-portion magnetic recording layer is given as h, a condition of $\tan 85° \geq 2h/(W2-W1) \geq \tan 50°$ is satisfied.

15. A magnetic recording medium having a data information recording portion and a servo information portion for tracking, wherein said servo information portion is composed of a magnetic recording layer formed in a predetermined convex-concave pattern, said servo information portion comprises a burst portion where burst signals for tracking are recorded, said burst portion comprises a first burst, a second burst, a third burst, and a fourth burst each composed of a plurality of convex-portion magnetic recording layers where the burst signals are recorded, said first and second bursts are arranged such that the convex-portion magnetic recording layers are formed so as to have their center lines at positions that are offset from each other by one track pitch in a track width direction, while, said third and fourth bursts are arranged such that the convex-portion magnetic recording layers are formed so as to have their center lines at positions that are offset from the center lines of said first and second bursts by half the track pitch in the track width direction, each convex-portion magnetic recording layer of said convex-portion magnetic recording layers has substantially trapezoidal shapes in the track width direction and in a track circumferential direction, respectively, (truncated quadrangular pyramid shape) and a condition of $W2=Tp$ and $2W2-W1>W1$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, and $Tp$ represents a data track pitch of the data information recording portion.

16. A magnetic recording medium according to claim 15, wherein when a read width of a magnetic head used as a recording and reproducing head for the magnetic recording medium is given as Wr, a condition of $W2=Tp$ and $2W2-W1 \geq Wr \geq W1$ is satisfied.

17. A magnetic recording medium according to claim 16, wherein when the height from $W2$ being the lower side to $W1$ being the upper side of the convex-portion magnetic recording layer is given as h, a condition of $\tan 85° \geq 2h/(W2-W1) \geq \tan 50°$ is satisfied.

18. A magnetic recording medium having a data information recording portion and a servo information portion for tracking, wherein said servo information portion is composed of a magnetic recording layer formed in a predetermined convex-concave pattern, said servo information portion comprises a burst portion where burst signals for tracking are recorded, said burst portion comprises a first burst, a second burst, a third burst, and a fourth burst each composed of a plurality of convex-portion magnetic recording layers where the burst signals are recorded, said first and second bursts are arranged such that the convex-portion magnetic recording layers are formed so as to have their center lines at positions that are offset from each other by one track pitch in a track width direction, while, said third and fourth bursts are arranged such that the convex-portion magnetic recording layers are formed so as to have their center lines at positions that are offset from the center lines of said first and second bursts by half the track pitch in the track width direction, each convex-portion magnetic recording layer of said convex-portion magnetic recording layers has substantially trapezoidal shapes in the track width direction and in a track circumferential direction, respectively, (truncated quadrangular pyramid shape) and a condition of $W1=Tp$ and $2W2-W1>W1/2$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, and $Tp$ represents a data track pitch of the data information recording portion.

19. A magnetic recording medium according to claim 18, wherein when a read width of a magnetic head used as a recording and reproducing head for the magnetic recording medium is given as Wr, a condition of $W1=Tp$ and $2W2-W1 \geq Wr \geq W1/2$ is satisfied.

20. A magnetic recording medium according to claim 19, wherein when the height from $W2$ being the lower side to $W1$ being the upper side of the convex-portion magnetic recording layer is given as h, a condition of $\tan 85° \geq 2h/(W2-W1) \geq \tan 50°$ is satisfied.

21. A magnetic recording medium according to claim 18, wherein when a read width of a magnetic head used as a recording and reproducing head for the magnetic recording medium is given as Wr, a condition of $W1=Tp$ and $2W2-W1 \geq Wr \geq W1$ is satisfied.

22. A magnetic recording medium having a data information recording portion and a servo information portion for tracking, wherein said servo information portion is composed of a magnetic recording layer formed in a predetermined convex-concave pattern, said servo information portion comprises a burst portion where burst signals for tracking are recorded, said burst portion comprises a first burst, a second burst, a third burst, and a fourth burst each composed of a plurality of convex-portion magnetic recording layers where the burst signals are recorded, said first and second bursts are arranged such that the convex-portion magnetic recording layers are formed so as to have their center lines at positions that are offset from each other by one track pitch in a track width direction, while, said third and fourth bursts are arranged such that the convex-portion magnetic recording layers are formed so as to have their center lines at positions that are offset from the center lines of said first and second bursts by half the track pitch in the track width direction, each convex-portion magnetic recording layer of said convex-portion magnetic recording layers has substantially trapezoidal shapes in the track width direction and in a track circumferential direction, respectively, (truncated quadrangular pyramid shape) and a condition of $W1 > Tp$ and $W2 > Tp$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, and $Tp$ represents a data track pitch of the data information recording portion.

23. A magnetic recording medium according to claim 22, wherein when a read width of a magnetic head used as a recording and reproducing head for the magnetic recording medium is given as Wr, a condition of $W1 > Tp$ and $W2 \geq Wr \geq Tp$ is satisfied.

24. A magnetic recording medium according to claim 23, wherein when the height from W2 being the lower side to W1 being the upper side of the convex-portion magnetic recording layer is given as h, a condition of $\tan 85° \geq 2h/(W2-W1) \geq \tan 50°$ is satisfied.

25. A magnetic recording medium having a data information recording portion and a servo information portion for tracking, wherein said servo information portion is composed of a magnetic recording layer formed in a predetermined convex-concave pattern, said servo information portion comprises a burst portion where burst signals for tracking are recorded, said burst portion comprises a first burst and a second burst each composed of a plurality of convex-portion magnetic recording layers where the burst signals are recorded, said first and second bursts are arranged such that the convex-portion magnetic recording layers are formed so as to have their center lines at positions that are offset from each other by one track pitch in a track width direction, each convex-portion magnetic recording layer of said convex-portion magnetic recording layers has substantially trapezoidal shapes in the track width direction and in a track circumferential direction, respectively, (truncated quadrangular pyramid shape) and a condition of $W2 \geq Tp \geq W1$ is satisfied where $W1$ represents an upper side corresponding to an upper surface of the convex-portion magnetic recording layer and $W2$ a lower side corresponding to a lower surface of the convex-portion magnetic recording layer in the trapezoidal shape in the track width direction, and $Tp$ represents a data track pitch of the data information recording portion.

26. A magnetic recording medium according to claim 25, wherein when a read width of a magnetic head used as a recording and reproducing head for the magnetic recording medium is given as Wr, a condition of $W2 \geq Tp \geq W1$ and $W2 \geq Wr \geq W1$ is satisfied.

27. A magnetic recording medium according to claim 26, wherein when the height from W2 being the lower side to W1 being the upper side of the convex-portion magnetic recording layer is given as h, a condition of $\tan 85° \geq 2h/(W2-W1) \geq \tan 50°$ is satisfied.

* * * * *